(12) United States Patent
Özden et al.

(10) Patent No.: US 12,168,906 B2
(45) Date of Patent: *Dec. 17, 2024

(54) VACUUM INSULATED GLASS UNIT FRAME SOLUTION

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,026

(22) Filed: Oct. 3, 2023

(65) Prior Publication Data

US 2024/0044201 A1    Feb. 8, 2024

Related U.S. Application Data

(63) Continuation of application No. 17/422,479, filed as application No. PCT/DK2020/050009 on Jan. 13, 2020, now Pat. No. 11,834,895.

(30) Foreign Application Priority Data

Jan. 14, 2019 (DK) .............................. PA201970020
Jan. 14, 2019 (DK) .............................. PA201970021
(Continued)

(51) Int. Cl.
*E06B 3/54* (2006.01)
*E04D 13/03* (2006.01)
(Continued)

(52) U.S. Cl.
CPC ............ *E06B 3/6612* (2013.01); *E04D 13/03* (2013.01); *E04D 13/031* (2013.01);
(Continued)

(58) Field of Classification Search
CPC ........ E06B 3/54; E06B 3/5409; E06B 3/5454; E06B 3/5481; E06B 3/62; E06B 3/6608; E06B 3/6612; E06B 3/677
See application file for complete search history.

(56) References Cited

U.S. PATENT DOCUMENTS 2,595,927 A    5/1952  Chapin
2,617,159 A *  11/1952 Leighton ............... E06B 3/5409
                                                    52/204.593
(Continued)

FOREIGN PATENT DOCUMENTS

CN      2835403 Y    11/2006
CN    106760122 A     5/2017
(Continued)

OTHER PUBLICATIONS

International Search Report for corresponding application PCT/DK2020/050008 filed Jan. 13, 2020; Mail date Apr. 3, 2020.
(Continued)

*Primary Examiner* — Ryan D Kwiecinski
(74) *Attorney, Agent, or Firm* — CANTOR COLBURN LLP

(57) ABSTRACT

A vacuum insulated glass unit frame assembly includes a rectangular vacuum insulated glass unit having two glass sheets separated by a sealed gap with a plurality of support structures, and a frame arrangement including a fixation system fixating the vacuum insulated glass unit at the frame arrangement, where the fixation system is arranged so as to allow edges of said vacuum insulated glass unit to thermally deflect in a deflection direction perpendicular to a frame opening plane due to a temperature difference between the two glass sheets, where the fixation system is configured so (Continued)

Figure 2A:
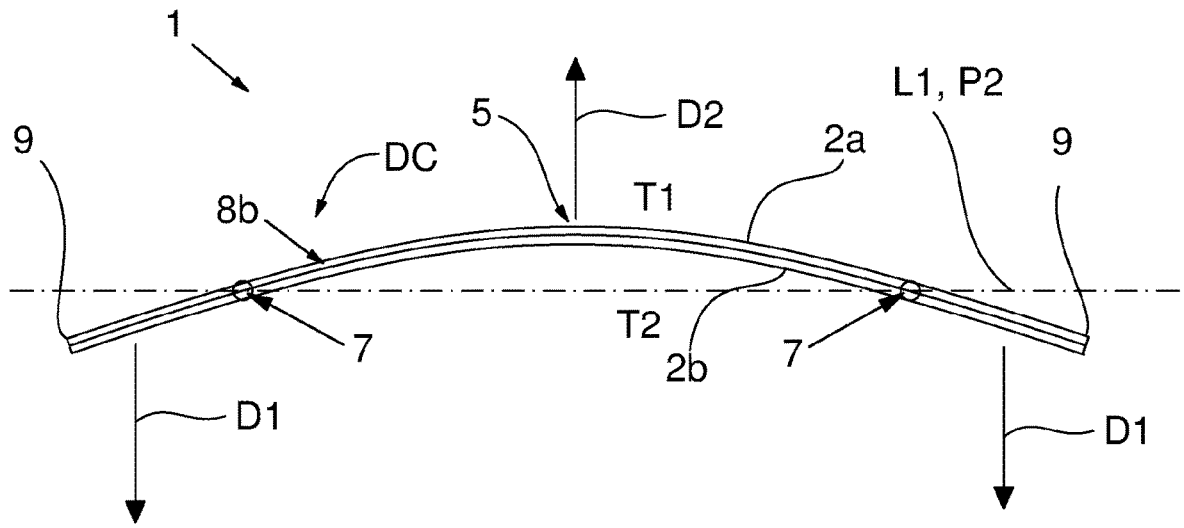

as to allow the magnitude of the thermal deflection to vary along the edge between the corners where the respective edge terminates.

18 Claims, 19 Drawing Sheets

(30) Foreign Application Priority Data

| Jan. 14, 2019 | (DK) | PA201970022 |
|---|---|---|
| Jan. 14, 2019 | (DK) | PA201970023 |
| Jan. 14, 2019 | (DK) | PA201970024 |
| Jan. 14, 2019 | (DK) | PA201970025 |
| Jan. 14, 2019 | (DK) | PA201970026 |

(51) Int. Cl.

| E04D 13/035 | (2006.01) |
|---|---|
| E06B 3/02 | (2006.01) |
| E06B 3/14 | (2006.01) |
| E06B 3/56 | (2006.01) |
| E06B 3/62 | (2006.01) |
| E06B 3/66 | (2006.01) |
| E06B 3/67 | (2006.01) |
| E06B 3/677 | (2006.01) |
| E06B 7/23 | (2006.01) |

(52) U.S. Cl.
CPC ....... *E04D 13/0315* (2013.01); *E04D 13/035* (2013.01); *E04D 13/0351* (2013.01); *E04D 13/0354* (2013.01); *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/62* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(56) References Cited

U.S. PATENT DOCUMENTS

| 2,781,561 | A | | 2/1957 | Gifford | |
|---|---|---|---|---|---|
| 3,686,795 | A | | 8/1972 | La Barge | |
| 3,861,085 | A | | 1/1975 | Jacob | |
| 4,134,234 | A | | 1/1979 | Auger | |
| 4,134,238 | A | * | 1/1979 | Auger | E06B 3/5409 |
| | | | | | 52/656.5 |
| 4,193,236 | A | * | 3/1980 | Mazzoni | E06B 3/66342 |
| | | | | | 52/204.593 |
| 5,216,855 | A | * | 6/1993 | Richter | E06B 3/5821 |
| | | | | | 52/204.593 |
| 5,373,672 | A | | 12/1994 | Schulz | |
| 5,657,607 | A | * | 8/1997 | Collins | E06B 3/66304 |
| | | | | | 52/786.13 |
| 5,891,536 | A | * | 4/1999 | Collins | E06B 3/66304 |
| | | | | | 52/786.13 |
| 6,263,623 | B1 | | 7/2001 | Weiss | |
| 6,295,774 | B1 | * | 10/2001 | Lindgren | E04D 13/031 |
| | | | | | 52/204.1 |
| 6,435,360 | B1 | | 8/2002 | Anin | |
| 6,676,786 | B1 | * | 1/2004 | Collins | E06B 3/6775 |
| | | | | | 156/286 |
| 7,588,653 | B2 | | 9/2009 | Crandell | E06B 3/24 |
| | | | | | 52/204.5 |
| 7,845,142 | B2 | * | 12/2010 | Theios | E06B 3/64 |
| | | | | | 52/204.6 |
| 7,950,192 | B2 | * | 5/2011 | Glover | B29C 66/72523 |
| | | | | | 52/204.593 |
| 8,181,405 | B2 | * | 5/2012 | Nash | E04F 11/1851 |
| | | | | | 52/800.18 |
| 9,447,627 | B2 | * | 9/2016 | Thompson | E06B 3/221 |
| 10,415,302 | B2 | * | 9/2019 | Vander Bent, Jr. | E06B 3/5409 |
| 10,597,933 | B2 | * | 3/2020 | Abe | E06B 3/6612 |
| 10,704,320 | B2 | * | 7/2020 | Sønderkær | C03C 27/06 |
| 10,919,236 | B2 | * | 2/2021 | Vaccari | E06B 3/5454 |
| 11,060,341 | B1 | * | 7/2021 | Sprague | E06B 3/549 |
| 11,187,027 | B2 | * | 11/2021 | Hasegawa | E06B 3/663 |
| 11,285,703 | B2 | * | 3/2022 | Jørgensen | B32B 41/00 |
| 11,802,435 | B2 | * | 10/2023 | Özden | E04D 13/0315 |
| 11,834,895 | B2 | * | 12/2023 | Özden | E06B 3/6612 |
| 2003/0037493 | A1 | * | 2/2003 | Guhl | E06B 3/24 |
| | | | | | 52/786.13 |
| 2005/0126093 | A1 | * | 6/2005 | Wagner | E04D 13/0305 |
| | | | | | 52/200 |
| 2007/0032972 | A1 | * | 2/2007 | Glover | B29C 65/7841 |
| | | | | | 702/77 |
| 2009/0324858 | A1 | * | 12/2009 | Jaeger | E06B 3/6612 |
| | | | | | 156/107 |
| 2012/0137607 | A1 | | 6/2012 | Kristensen | |
| 2013/0101759 | A1 | * | 4/2013 | Jones | E06B 3/6612 |
| | | | | | 428/34 |
| 2014/0007396 | A1 | | 1/2014 | Jones | |
| 2014/0069034 | A1 | * | 3/2014 | Jones | E06B 3/585 |
| | | | | | 52/204.593 |
| 2015/0345207 | A1 | * | 12/2015 | Thompson | E06B 3/677 |
| | | | | | 52/204.6 |
| 2017/0002599 | A1 | * | 1/2017 | Thompson | E06B 3/5454 |
| 2017/0268285 | A1 | * | 9/2017 | Abe | C03C 27/10 |
| 2022/0065026 | A1 | * | 3/2022 | Özden | E06B 3/62 |

FOREIGN PATENT DOCUMENTS

| DE | 3202639 | A1 | | 8/1983 | |
|---|---|---|---|---|---|
| DE | 102006020455 | A1 | | 6/2007 | |
| DE | 202009016113 | U1 | | 5/2011 | |
| DE | 202012006687 | U1 | * | 12/2013 | E05C 1/04 |
| DE | 10201400186 | A1 | | 2/2016 | |
| EP | 0418461 | A1 | | 3/1991 | |
| EP | 0421239 | A2 | | 4/1991 | |
| EP | 0472109 | A2 | | 2/1992 | |
| EP | 1298100 | A1 | | 4/2003 | |
| EP | 1908914 | A1 | | 4/2008 | |
| EP | 2169172 | A2 | * | 3/2010 | E04D 13/0354 |
| EP | 2921632 | A1 | | 9/2015 | |
| EP | 3101195 | A1 | | 12/2016 | |
| EP | 3124733 | A1 | | 2/2017 | |
| EP | 3170799 | A1 | * | 5/2017 | C03C 27/10 |
| ES | 2169172 | T3 | * | 7/2002 | A47L 15/4229 |
| FR | 2514057 | A1 | | 4/1983 | |
| FR | 2823789 | A1 | | 10/2002 | |
| FR | 2942843 | A1 | | 9/2010 | |
| FR | 3075245 | A1 | * | 6/2019 | E06B 3/5454 |
| GB | 2264742 | A | * | 9/1993 | E06B 3/5481 |
| GB | 2492380 | A | | 1/2013 | |
| GB | 2521419 | A | | 6/2015 | |
| JP | 2000064732 | A | * | 2/2000 | E06B 3/6205 |
| JP | 2001031449 | A | * | 2/2001 | E06B 3/6775 |
| JP | 2001146881 | A | | 5/2001 | |
| JP | 2002021437 | A | | 1/2002 | |
| JP | 2002255593 | A | * | 9/2002 | |
| JP | 2007132637 | A | | 5/2007 | |
| KR | 20180128659 | A | | 12/2018 | |
| WO | WO-9914169 | A1 | * | 3/1999 | C03C 27/06 |
| WO | WO-2011048559 | A1 | * | 4/2011 | E04B 2/7401 |
| WO | 2014039642 | A1 | | 3/2014 | |
| WO | WO-2014183606 | A1 | * | 11/2014 | E06B 3/6621 |
| WO | 2015183863 | A1 | | 12/2015 | |
| WO | 2017210701 | A1 | | 12/2017 | |
| WO | WO-2020147903 | A1 | * | 7/2020 | E04D 13/0351 |
| WO | WO-2020147906 | A1 | * | 7/2020 | E04D 13/0351 |

(56) References Cited

FOREIGN PATENT DOCUMENTS

| WO | WO-2020147907 A1 | * | 7/2020 | ......... E04D 13/0351 |
| WO | WO-2021228713 A1 | * | 11/2021 | ............. E04D 13/03 |

OTHER PUBLICATIONS

International Search Report for corresponding application PCT/DK2020/050009 filed Jan. 13, 2020; Mail date Mar. 30, 2020.
International Search Report for corresponding application PCT/DK2020/050010 filed Jan. 13, 2020; Mail date Mar. 25, 2020.
International Search Report for corresponding application PCT/DK2020/050011 filed Jan. 13, 2020; Mail date Apr. 7, 2020.
International Search Report for corresponding application PCT/DK2020/050012 filed Jan. 13, 2020; Mail date Apr. 9, 2020.
International Search Report for corresponding application PCT/DK2020/050013 filed Jan. 13, 2020; Mail date Mar. 19, 2020.
International Search Report for corresponding application PCT/DK2020/050014 filed Jan. 13, 2020; Mail date Apr. 14, 2020.
International Search Report for corresponding application PCT/DK2020/050015 filed Jan. 13, 2020; Report dated Mar. 27, 2020.
International Search Report for corresponding application PCT/DK2020/050016 filed Jan. 13, 2020; Mail date Apr. 1, 2020.
International Search Report for corresponding application PCT/DK2020/050017 filed Jan. 13, 2020; Mail date Feb. 18, 2020.
International Search Report for corresponding application PCT/DK2020/050018 filed Jan. 13, 2020; Mail date Feb. 18, 2020.
Written Opinion for corresponding application PCT/DK2020/050008 filed Jan. 13, 2020; Mail date Apr. 3, 2020.
Written Opinion for corresponding application PCT/DK2020/050009 filed Jan. 13, 2020; Mail date Mar. 30, 2020.
Written Opinion for corresponding application PCT/DK2020/050010 filed Jan. 13, 2020; Mail date Mar. 25, 2020.
Written Opinion for corresponding application PCT/DK2020/050011 filed Jan. 13, 2020; Mail date Apr. 7, 2020.
Written Opinion for corresponding application PCT/DK2020/050012 filed Jan. 13, 2020; Mail date Apr. 9, 2020.
Written Opinion for corresponding application PCT/DK2020/050013 filed Jan. 13, 2020; Mail date Mar. 19, 2020.
Written Opinion for corresponding application PCT/DK2020/050014 filed Jan. 13, 2020; Mail date Apr. 14, 2020.
Written Opinion for corresponding application PCT/DK2020/050015 filed Jan. 13, 2020; Report dated Mar. 27, 2020.
Written Opinion for corresponding application PCT/DK2020/050016 filed Jan. 13, 2020; Mail date Apr. 1, 2020.
Written Opinion for corresponding application PCT/DK2020/050017 filed Jan. 13, 2020; Mail date Feb. 18, 2020.
Written Opinion for corresponding application PCT/DK2020/050018 filed Jan. 13, 2020; Mail date Feb. 18, 2020.

* cited by examiner

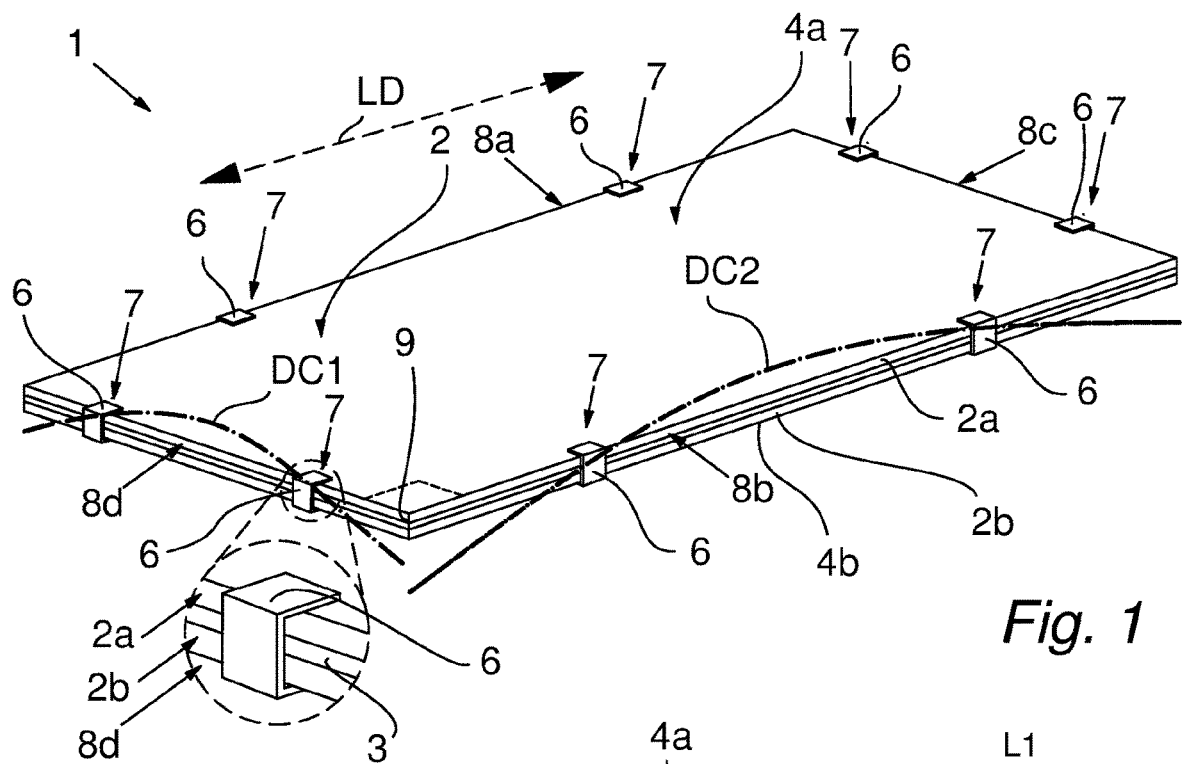
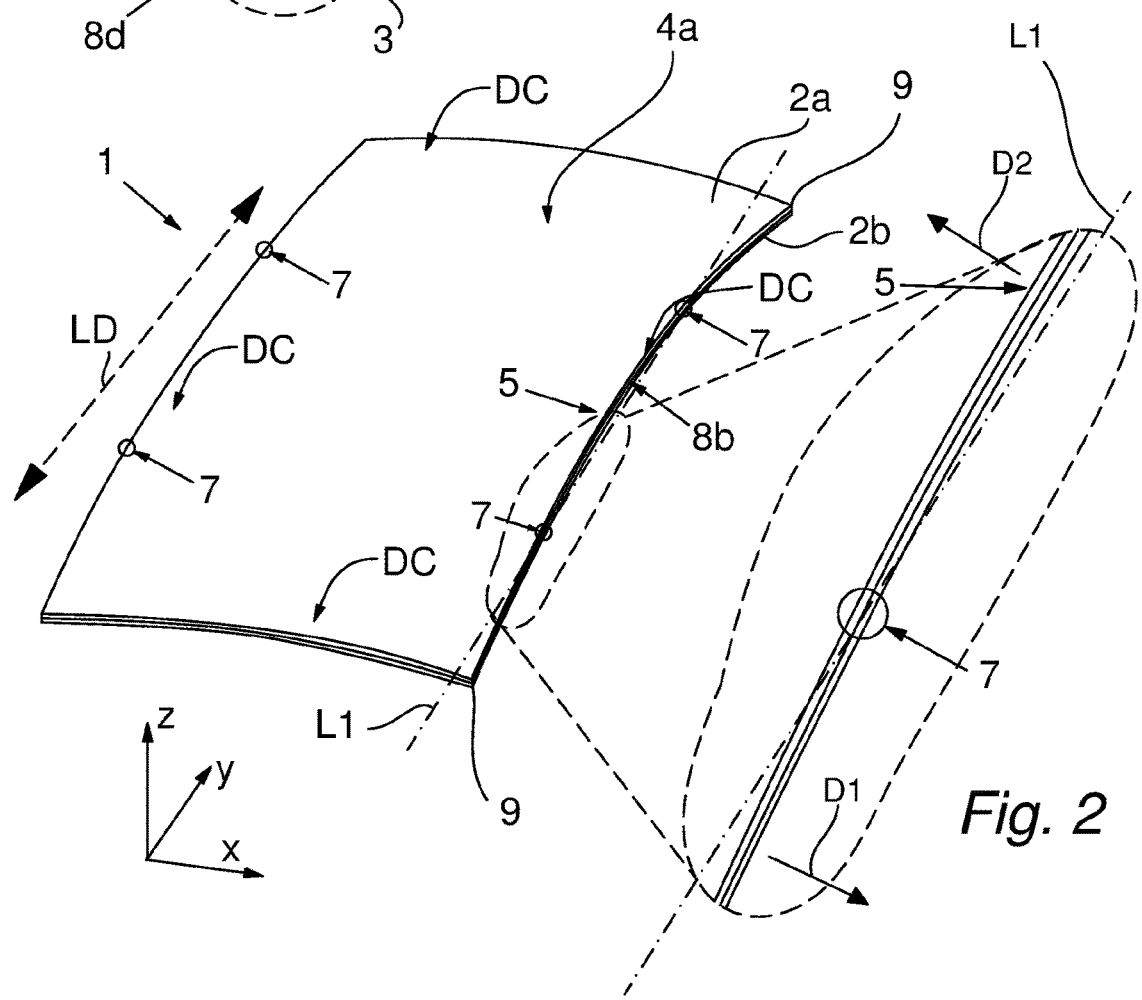

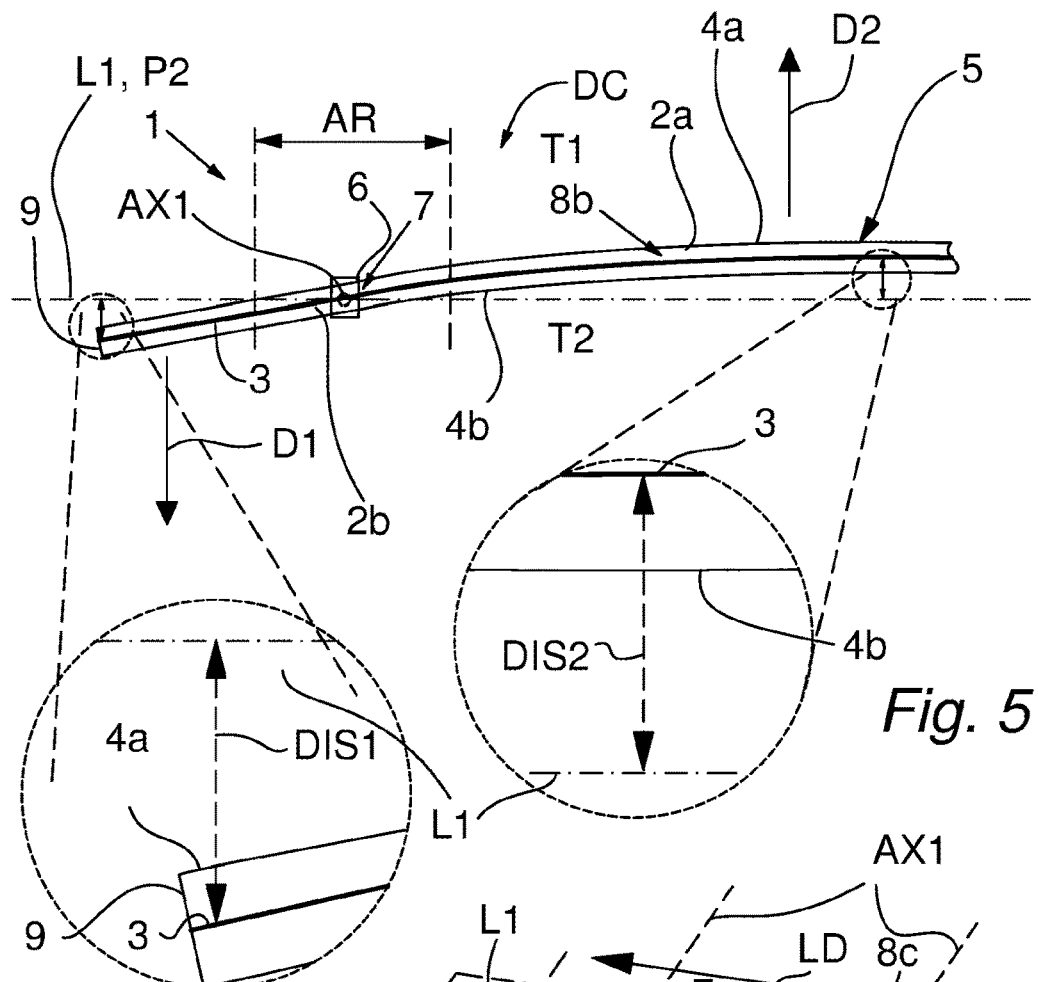
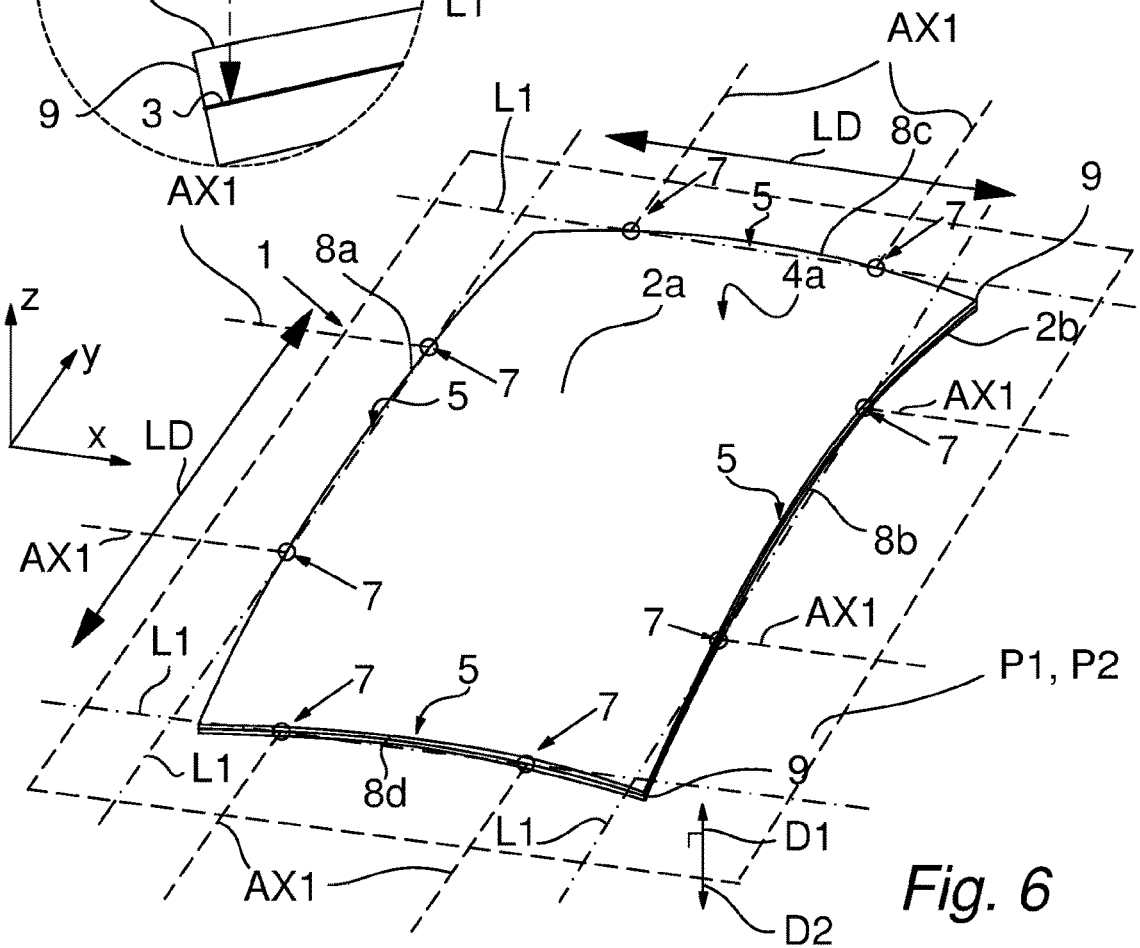
Fig. 5
Fig. 6

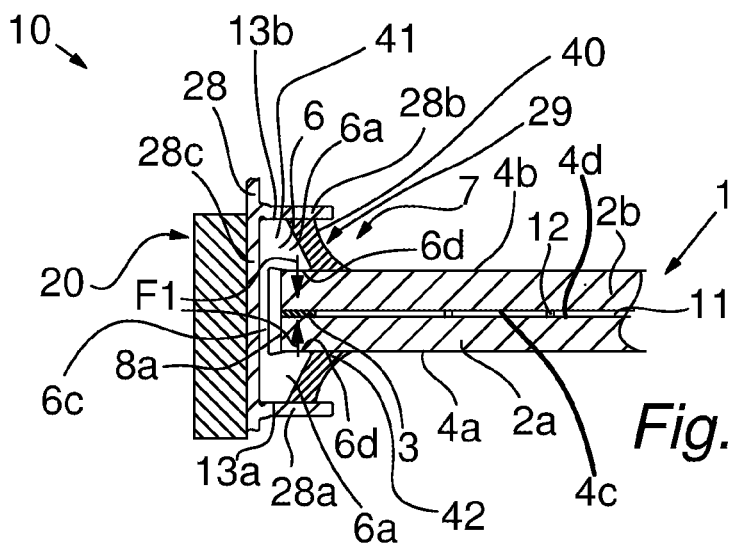
*Fig. 12*
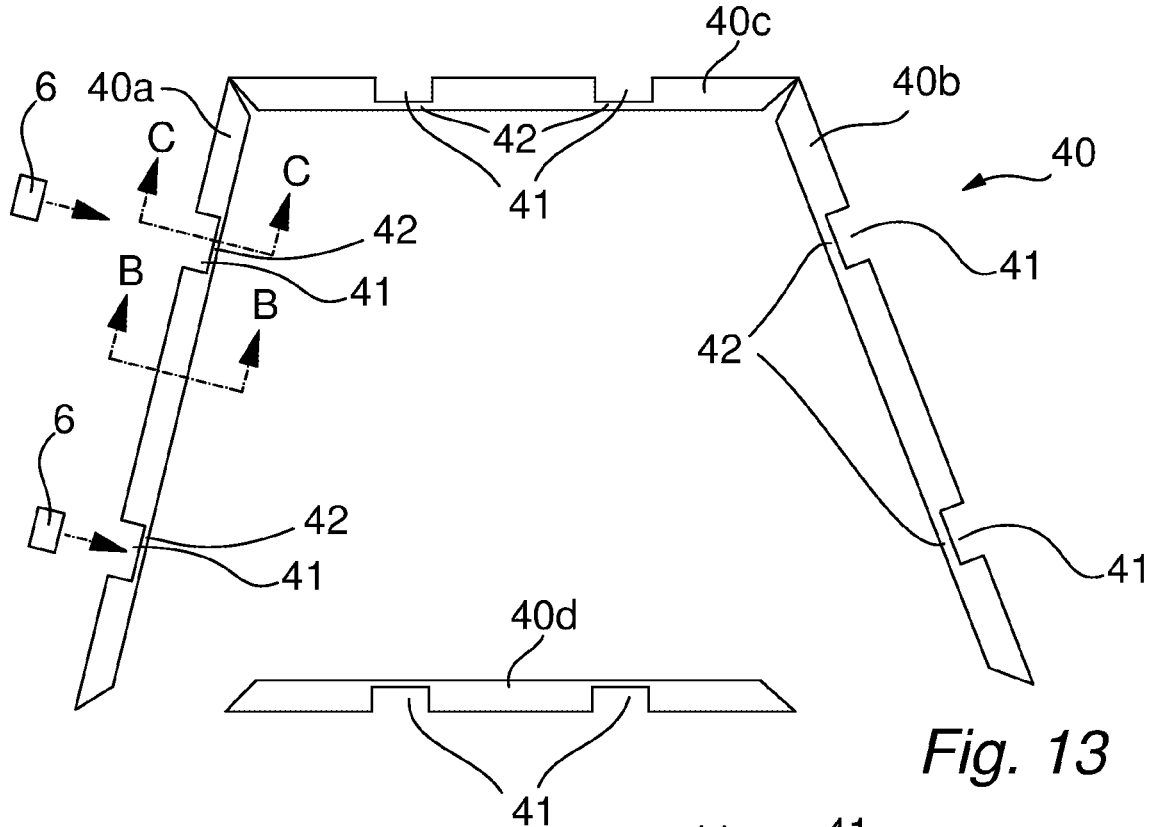
*Fig. 13*
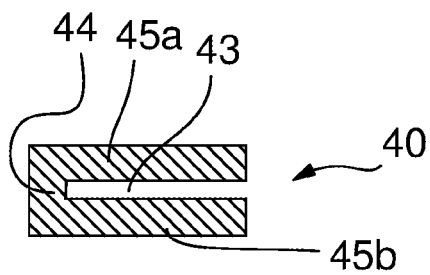
*Fig. 13B-B*
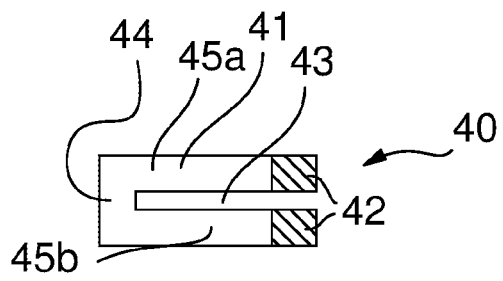
*Fig. 13C-C*

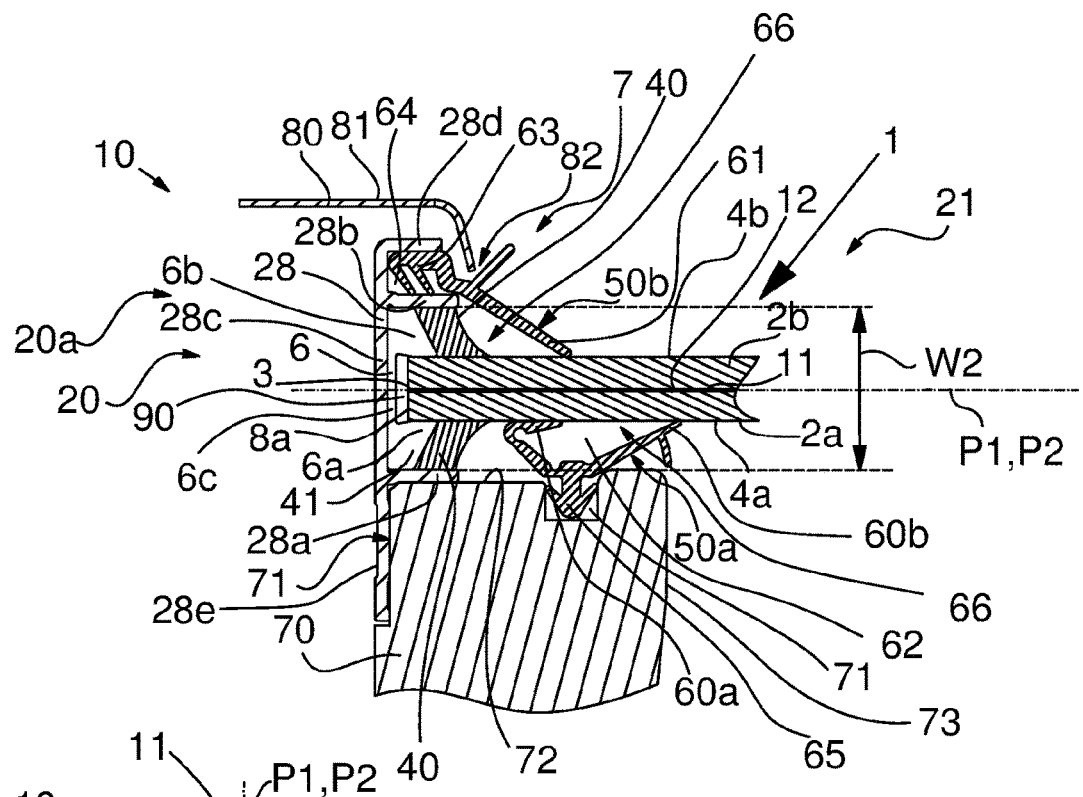
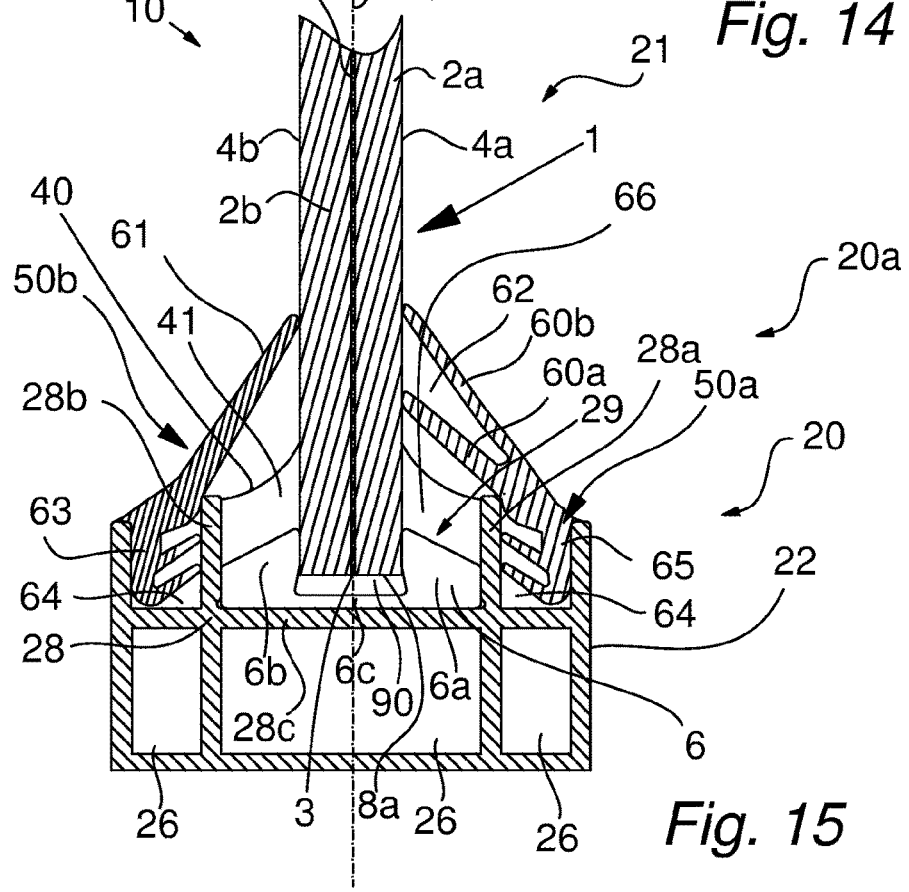
Fig. 14
Fig. 15

VACUUM INSULATED GLASS UNIT FRAME SOLUTION

CROSS REFERENCE TO RELATED APPLICATION

This is a continuation of U.S. patent application Ser. No. 17/422,479 filed on Jul. 13, 2021, where the entire contents of said application are herein incorporated by reference.

The present disclosure relates to a vacuum insulated glass unit frame assembly, a retrofitting frame system for retrofitting a vacuum insulated glass unit to a frame and a method of retrofitting a vacuum insulated glass unit to a frame.

BACKGROUND

Vacuum insulated glass (VIG) units provides several advantages such as good insulated properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by one or more resiliently flexible tabs of a glazing member that is/are snapped into engagement with a base member of the frame, so that the tabs may allow the glazing member to pivot to accommodate distortion of the VIG unit.

Patent documents U.S. Pat. No. 6,435,630 B1 and JP2007132637 discloses other solutions for holding a VIG unit.

Patent document EP2169172 B1 discloses a further solution where a frame holds a VIG unit by means of an adhesive at a surface facing a part of the frame.

It however appears that problems still exists when arranging a VIG unit in a frame to provide a window or door for e.g. covering building apertures.

The present disclosure provides one or more solutions where a VIG unit is arranged in a frame, which may e.g. help to improve or ensure the lifetime, such as the estimated lifetime, of the VIG unit, provide a more simple and/or mechanical solution for holding a VIG unit in/at a frame, provide a solution that may be used under varying climatic conditions, provide a solution with satisfactory optical distortions and/or provide a solution which is advantageous from a manufacturing point of view.

SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is normally subjected to significant temperature differences $\Delta T$ between the VIG unit glass sheets due to the good insulation capabilities of the VIG unit. As the edge seal for sealing the gap between the VIG unit glass sheets is normally very stiff in nature, the temperature difference $\Delta T$ between the glass sheets causes the VIG unit to deflect (also known as thermal bending, thermal deflection or thermal distortion), as the hotter glass sheet of the VIG unit will expand compared to the colder of the glass sheets.

Especially VIG units according to the present disclosure having a $U_g$-value below 0.7 W/(m²K), such as below 0.6 W/(m²K), e.g. below 0.5 W/(m²K) such as below 0.4 W/(m²K) may suffer from thermal deflection due to the good insulation provided by means of the VIG unit. This low $U_g$-value may be obtained by means of the evacuation of the gap between the VIG glass sheets, e.g. in combination with one or more one or more of

- One or more low-e coatings such as thin tin dioxide or thin silver layers or any other suitable low e-coating layers at e.g. the inner surface(s) of the glass sheets of the VIG unit facing the VIG unit gap,
- a larger/increased support structure distance, such as above 3 or above 4 centimetres between neighbouring support structures in the VIG unit gap to reduce the number of potential "cold-bridges" provided by the support structures,
- by using support structures of a material having a low thermal conductivity and/or a small size,
- By providing a 3-layer VIG unit (i.e. with two evacuated gaps)
- By providing a Hybrid VIG unit.

The present disclosure relates to a vacuum insulated glass (VIG) unit frame assembly, wherein said vacuum insulated glass unit frame assembly comprises: a rectangular vacuum insulated glass unit comprising two glass sheets separated by a gap between said glass sheets, wherein a plurality of support structures are distributed in said gap and wherein said gap is sealed, and

- a frame arrangement comprising elongated frame profile arrangements which frames said vacuum insulated glass unit in a frame opening extending in a frame opening plane defined between the elongated frame profile arrangements, and wherein said frame arrangement comprises a fixation system fixating the vacuum insulated glass unit at the frame arrangement,
- wherein said fixation system is arranged so as to allow edges of said vacuum insulated glass unit to thermally deflect in a deflection direction perpendicular to said frame opening plane due to a temperature difference between the two glass sheets,
- wherein said fixation system is configured so as to allow the magnitude of said thermal deflection is configured to vary along the edge between the corners where the respective edge terminates.

The VIG unit will thermally deflect due to a temperature difference between the outer major surfaces of the VIG glass sheets. This temperature difference may change over time, such as over 24 hours and over the course of a year, and may induce varying stresses in the VIG unit.

It is generally understood that a temperature difference between the outer, major surfaces of the VIG glass sheets may provide the thermal deflection of the VIG unit edges, and the amount of thermal deflection is dependent on the size of the temperature difference $\Delta T=T1-T2$, where T1 is the temperature at one outer major/main surface of the VIG, and the temperature T2 is the temperature at the other outer major/main surface of the VIG. The operational sign of the resulting temperature difference $\Delta T$ determines to which side of the VIG unit assembly, the VIG unit's edges deflects relative to the frame opening plane due to the temperature difference.

The present inventors have in steady state simulations of a rectangular VIG unit's thermal deflection seen that that the VIG edges tend to describe an "edge deflection curve" when the VIG unit is subjected to temperature differences, and this may be caused by the properties of the VIG unit such as the rigidity of the edge sealing solution for sealing the VIG gap along the edges of the VIG unit. Tests confirmed that such edge deflection curves occur. This edge deflection curve provides that the magnitude of the thermal deflection of the VIG unit varies along the edge between the corners where the respective VIG unit edge terminates.

The simulations indicate that an inappropriate constraining of the VIG unit's thermal deflection along/at the VIG unit edges by the frame assembly may induce a larger stress at the VIG unit edges or corner areas, such as in an edge sealing the VIG unit gap of the VIG unit at the glass sheet edges, when the VIG unit is exposed to larger temperature differences. This may increase the risk that the VIG unit is damaged over time, so that the vacuum in the gap of the VIG unit is reduced to be closer to the atmospheric pressure and thus reducing the thermal insulating effect of the VIG unit.

At the same time, the VIG unit should be fixated sufficiently in the frame assembly so that it does not permanently displace to an undesired position due to gravity or outer forces such as wind gusts (in case it is e.g. used for a door or a window), hails or other objects such as birds, balls or the like provides impacts such as sudden impacts on the VIG unit surface.

As the fixation system is configured so as to allow the narrow edges of the VIG unit to thermally deflect at least to a certain extent, the thermally induced stresses in the VIG unit are reduced as compared to a fully constrained FIG unit and hence help to improve the lifetime of the VIG unit frame assembly, and/or help to provide a solution that may be used in varying conditions such as in varying climatic conditions.

The largest total edge deflection in said deflection direction of any of the edges of the vacuum insulated glass unit at a temperature difference between the two glass sheets of 65° C. as compared to the vacuum insulated glass unit at a temperature difference of 0° C. is in an embodiment of the present invention at least 2 mm, such as in the range of 2 to 40 mm, such as in the range of 5 to 35, mm, preferably in the range of 8 to 20 mm.

The total edge deflection is the sum of the largest distances of positions of the VIG unit edge in question from the frame opening plane in each their direction D1, D2 from that plane, typically the deflection in one direction of one or both of the corners of the edge in question and the deflection in the opposite direction of a centre part of the edge between the two corners of the edge.

It is advantageous to allow a certain degree of edge deflection (DIS1+DIS2), as reduces the stress in the VIG unit over time. The magnitude of edge deflection is preferably limited so as to provide for a limited physical extent of the frame solution.

In particular, the largest total edge deflection in said deflection direction of any of the edges of the vacuum insulated glass unit at a temperature difference between the two glass sheets of 40° C. as compared to the vacuum insulated glass unit at a temperature difference of 0° C. should in one embodiment of the present invention be at least 1 mm, such as in the range of 1 to 25 mm, such as in the range of 3 to 15 mm, preferably in the range of 4 to 12 mm.

The largest total edge deflection in said deflection direction of any of the edges of the vacuum insulated glass unit at a temperature difference between the two glass sheets of 65° C. as compared to the vacuum insulated glass unit at a temperature difference of 0° C. is in a different aspect at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge.

According to another aspect, the largest total edge deflection in said deflection direction of any of the edges of the vacuum insulated glass unit at a to a temperature difference between the two glass sheets of 40° C. as compared to the vacuum insulated glass unit at a temperature difference of 0° C. is at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

The above mentioned thermal deflections may in aspects be relative to the state of the VIG unit edge position/deflection when the VIG unit glass sheets have an identical/the same temperature such as 20° C.

In a preferred embodiment, all four edges of said vacuum insulated glass unit are allowed to thermally deflect in a deflection direction perpendicular to said frame opening plane due to a temperature difference between the two glass sheets. Alternatively, two opposing edges, typically the shorter edges of the VIG unit, may generally be restricted by the fixation of the VIG unit to the frame.

The frame arrangement, such as one or more gasket arrangements of the frame arrangement, may be configured to restrict the edge deflection in said deflection direction compared to free bending of the edge deflection.

Restricting the VIG unit edge completely from thermal deflection may cause the VIG unit to break and the pressure in the evacuated gap to equalize to the ambient pressure. However, by restricting the VIG unit edge deflection to a certain amount compared to free deflection and no deflection, this may provide a solution where the VIG unit may be less likely to break over time due to thermal deflections.

In other embodiments of the present disclosure, the gasket for restricting the VIG unit's thermal deflection may be omitted, and the VIG unit frame profiles may e.g. comprise other structural parts such as protrusions or the like for at least partly restrict the thermal bending. In further embodiments of the present disclosure, the VIG unit may be arranged to thermally deflect substantially freely while affixed to the frame by means of discrete fixation arrangements.

The fixation system may comprise a plurality of fixation arrangements, wherein said plurality of fixation arrangements fixates said vacuum insulated glass unit at discrete fixation points distributed along the edges of the vacuum insulated glass unit, and wherein said plurality of fixation arrangements are attached to or between one or more frame members of said frame assembly, whereby the thermal deflection of the edges is substantially at its minimum at the discreet fixation points.

The present inventors have seen indications in steady state VIG unit deflection computer simulations that a thermal deflection at the edges of the VIG unit may seems to follow a pattern where discrete, so to say "neutral", deflection points may be estimated/selected as fixation points for an edge. The VIG unit corners and centre portion of the edge deflects in opposite directions relative to these points, and the amount of stress subjected to fixation arrangements placed at these points due to thermal deflection may tend to be lower than if the fixation arrangements are placed at other points along the same VIG unit edge, when the VIG unit is placed in a frame assembly.

By the term "discreet fixation points" is understood fixation areas or zones with a relatively short extent in the longitudinal direction of the edge as compared to the full extent of the edge, such as 0.2% to 1%, or less, of the full extent of the edge or from 4 mm to 70 mm, preferably in the range of 12 mm to 35 mm. The fixation arrangements may be configured so that they have a greater width than the actual discreet fixation points, which constitute an area where the thermal deflexion is minimal or negligible.

This may help to provide a solution where the VIG unit is sufficiently fixed in the frame assembly, where forces acting on the VIG unit is transferred to the frame assembly such as to frame profiles, and where the VIG unit's edges are at the same time allowed to thermally deflect relative to the frame opening plane when subjected to varying temperature differences between the outer major surfaces of the VIG unit so that the forces/stresses may be at least partly reduced.

Alternatively or additionally, it may help to provide an improved solution from a water tightening point of view and/or help to provide a more space-saving solution.

Also or alternatively, by selecting discrete pane fixation points distributed along the narrow edges of the vacuum insulated glass unit, and providing fixation arrangements at these points which fixates/holds the vacuum insulated glass unit in the frame, this may help to reduce the stresses in the VIG unit such as in the VIG unit edge seal when the VIG unit is subjected to temperature differences between the outer major surfaces of the VIG unit.

The fixation arrangements may at the same time hold the VIG unit in the frame so that the entire VIG unit will not e.g. displace significantly relative to the frame opening plane due to gravity or will not be displaced (without returning to substantially the same position again due to the frame assembly design) when outer forces such as wind loads or sudden impacts act on the VIG unit in the frame assembly.

The VIG unit edges, such as in particular the centre portion of the edge and the corners where the respective edge terminates may thus deflect relative to the fixation arrangements.

Additionally, the fixation arrangements may in aspects of the present disclosure help to spare sealing's or gaskets of the frame assembly from a substantial amount of the weight provided by the VIG unit, which may help to provide a longer lasting sealing solution.

In one or more aspects of the present disclosure, one or more of said fixation arrangements may be made from one or more of a plastic material, a composite material, a glue and/or an adhesive material, a soldering material, and/or A metal such as steel, e.g. one or more metal plates.

The fixation points are more preferred placed so that the corners of the vacuum insulated glass unit, where the respective edge terminates, are configured to deflect in a first direction relative to a straight, common line extending through two of said discrete fixation points of the respective edge, and so that a centre portion of the same edge, is configured so deflect in an opposite direction than said first direction, relative to the straight, common line, when the vacuum insulated glass unit thermally deflects.

This may help to provide a more narrow frame solution since the magnitude of the thermal deflection of the VIG unit will be substantially the same in both directions of deflection, and/or help to spare sealings or gaskets placed to provide water and/or air tightening functions between the VIG unit and one or more parts of the frame assembly.

In particular, the maximum difference in the amount of said edge deflection in said first direction and said edge deflection in said second direction may be less than 30% such as less than 20%, e.g. less than 10% at a temperature difference between the two glass sheets of 65° C.

Each of at least two parallel edges of the vacuum insulated glass unit may in a particular embodiment be attached to said frame assembly by two, and no more, of said discreet fixation arrangements distributed in the longitudinal direction of each of said edges. Each of said two discreet fixation arrangements of an edge may advantageously be placed between 8% and 25% of the length of the respective edge from the respective corner of the vacuum insulated glass unit where the edge terminates, preferably between 10% and 20%.

Arranging two fixation points for an edge may be sufficient to allow a sufficient thermal edge deflection and at the same time provide a fixation of the VIG unit relative to the frame.

In a preferred embodiment of the present invention, from four to eight fixation arrangements, such as four, five or six fixation arrangements, are distributed between the edges of the vacuum insulated glass unit.

In aspects of the present disclosure, neither of the edges of the VIG unit may be held by more than two of the fixation arrangements, and/or in one or more further aspects, at least two edges may be held by two and not more of said fixation arrangements, whereas the other edges of the VIG unit are held by less than two, such as either one or none of said fixation arrangements placed at a fixation point.

In one embodiment, at least four, such as six or eight of said discrete fixation points define a common holding plane extending in or parallel to said frame opening plane.

One or more of said fixation arrangements are clamping devices may preferably be configured so as to provide a clamping force onto oppositely directed, outer major surfaces of said vacuum insulated glass unit.

This may provide a sufficient fixation of the VIG unit to the frame assembly. The clamping devices may in aspects of the present disclosure be releasable connected, such as by a friction due to a clamping force, to the VIG unit and/or the frame assembly.

In an aspect of the present disclosure, one or more of said fixation arrangements may comprise a glue or soldering material, a holding device providing a holding onto oppositely directed, outwardly facing surfaces of said vacuum insulated glass unit substantially without providing a clamping force onto oppositely directed, outwardly facing surfaces of said vacuum insulated glass unit.

In further aspects of the present disclosure, a frame profile may provide discretely arranged protrusions that provides a fixation device, such as a clamping functionality.

The clamping force provided by said clamping devices may be provided by an inherent resiliency of the clamping device, and/or is transferred from a part of the frame arrangement, through the clamping device and to the vacuum insulated glass unit.

The fixation arrangements may provide fixation at the discrete fixation points of the vacuum insulated glass unit at opposite, outer surfaces of the vacuum insulated glass unit at a location substantially opposite to an edge seal of said vacuum insulated glass unit which seals the gap between the vacuum insulated glass unit glass sheets.

At least a part of the edge seal is thus provided between the locations where the fixation arrangement provides the fixation of the VIG unit. This fixation may e.g. be provided by a clamping force, by a structural adhesive connection and/or the like.

Hence, when outer forces strikes the VIG unit, the forces are transferred to the frame assembly at a location where the edge seal of the VIG unit is placed. Also or alternatively, if the VIG unit is subjected to forces/stress due to the fixation by the fixation arrangements when the VIG unit thermally deflect, a main part of this forces or stresses is transferred to the VIG edge sealing.

This may e.g. help to reduce or avoid a compression force caused by the fixation arrangements and subjected to support structures in the gap of the VIG unit, and/or help to provide a VIG unit frame assembly which is less likely to break.

One or more fixation arrangements may be realisably connected to said frame assembly and/or said vacuum insulated glass unit.

This may e.g. be advantageous in case the VIG unit should be replaced in the frame assembly later on, e.g. in case the VIG unit is damaged/shattered. This may e.g. be obtained by a part of the frame unit being able to be released from another part of the frame unit, and by releasing this/these parts of the frame, this may provide a sufficient access to the fixation arrangements, and/or may hereby release the fixation arrangements from the rest of the frame. The releasing of the part/parts of the frame may e.g. be obtained by manipulating a mechanical fastening system comprising e.g. nails, screws, one or more snap connections and/or the like)

Each of said fixation arrangements may be configured to allow a rotational movement of the edges of the vacuum insulated glass unit at the discrete fixation point at each of said fixation devices around an axis, wherein said axis extends towards said frame opening, and is substantially perpendicular to the longitudinal direction of the respective edge of the vacuum insulated glass unit subjected to said rotational movement.

The VIG unit may in aspects of the present disclosure be able to provide a rotational movement at the fixation points around the mentioned axis, so as to e.g. reduce the risk of inducing too much stress conditions to the VIG unit at these fixation points by the fixation arrangements when the VIG unit edges tries to thermally deflect as the temperature difference varies.

In one or more aspects of the present disclosure, said rotational movement of the edges of the vacuum insulated glass unit at one or more of said discrete fixation point at the fixation arrangements around the axis may be between 0.10 and 4°, such as between 0.3° and 2°, e.g. between 0.4° and 1°.

The above mentioned range of rotational movement may e.g. apply within a temperature difference ΔT variation that is between 5° C. and 65° C., such as between 10° C. and 45° C. over time.

This rotation may in one or more embodiments of the present disclosure be measure by determining the rotation at a first ΔT=which is substantially 0° C., and at a further ΔT, which is between 50° C. and 100° C., such as between 60° C. and 65° C.

The fixation arrangements may be rotatably connected to the frame assembly in aspects of the present disclosure.

The frame assembly may comprise substantially parallel top and bottom frame profile arrangements, and substantially parallel side profile frame arrangements, wherein two, three or all of said top, bottom and/or side profile frame arrangements at least partly, such as fully, encloses said edges, such as encloses said fixation arrangements.

The bottom frame profile arrangement may be of a different design/constitution than the side and top profile frame arrangements, as it may e.g. comprise a water drainage system for draining water from the surface of the vacuum insulated glass (VIG) unit away from the vacuum insulated glass unit frame assembly which is not present at the side and top profile frame arrangements.

In one or more aspects of the present disclosure, at least one of said top, bottom or side frame profile arrangements encloses at least one fixation arrangement, and may be of a different constitution or type than the remaining fixation arrangements enclosed by the other of said frame profile arrangements. For example, in aspects, said one or more fixation arrangements of a different constitution or type may be located in/at said bottom frame profile arrangements.

It is advantageous if one or more of said edges of the vacuum insulated glass unit extends into a recess provided by support members, such as elongated support members, and wherein said fixation system, such as said fixation arrangements, is/are placed in said recess.

These frame profile members may in aspects of the present disclosure either be integrated parts of a moulded, extruded or pultruded profile, they may be provided by a glazing member and base member assembly where the glazing member may in further aspects be releasably/dismountably connected to the base member, either directly or indirectly. Said fixation system, such as said fixation arrangements, may in particular be clamped or wedged between said elongated frame profile members.

In one or more aspects of the present disclosure, said support members may be configured to be substantially rigid at the location where the frame profile members wedges or clamps the fixation members.

In one or more aspects of the present disclosure, the fixation arrangements may suspend the VIG unit in the recess between the frame profile arrangements, hence providing a space between the VIG unit's surfaces in the recess, and the holding members.

The vacuum insulated glass unit edges may in particular be allowed to thermally deflect relatively to said recess. This may e.g. help to provide a more cost efficient and/or mechanically simple frame solution allowing the above mentioned edge deflection relative to the frame opening plane.

The frame profile members may in an aspect of the present disclosure comprise:

elongated walls integrated in and part of a frame profile connecting said walls by means of a connection wall extending between the walls to provide a U-shape forming said recess, and/or a base member and a glazing profile member which is releasably connected to said base member, and wherein said base member and glazing member when connected provide U-shape forming said recess.

These profiles such as the profile with the integrated walls, and/or the base member and glazing member may in embodiments of the present disclosure either be moulded, extruded or pultruded.

This may e.g. provide a cost efficient solution and/or help to provide a solution where a fast and/or reliable manufacturing may be obtained.

The material of the profile(s) may e.g. be a plastic material such as a PVC material, it may be composite material such as a glass or carbon fibre material, and the profiles may be made from a plastic material with fibres embedded to obtain a more strong/rigid profile and/or the like. Also, in one or more aspects the profiles of the frame may be made from a metal such as aluminium.

These profiles may in aspects of the present disclosure extend continuously between the corners of the frame in the longitudinal direction of the VIG edge.

The distance between the frame profile members, and thus the width of said recess provided by the frame profile members may preferably be substantially fixed during said thermal deflection when the temperature difference is less than 40° C., preferably less than 65° C.

This may e.g. help to provide a good fixation of the VIG unit in the frame assembly, and/or provide a good control thermal deflection of the VIG unit edges.

A first gasket arrangement, such as parts of a C-profile gasket, may advantageously be placed in said recess between said frame profile members and the outer surfaces of the vacuum insulated glass unit.

This gasket arrangement may help to provide a water tightening, and/or may help to reduce the amount of deflection of the VIG unit compared to if it was allowed to thermally deflect freely.

The first gasket arrangement may e.g. be a rubber or silicone gasket, or a plastic gasket.

In one or more aspects of the present disclosure, said first gasket arrangement may provide at least a part of said fixation system.

The first gasket arrangement may e.g. be pre-compressed between the frame profile members and the VIG unit, thus providing a clamping force at the VIG unit, but also allowing a compression of the first gasket arrangement when thermal bending occur.

In aspects of the present disclosure, said first gasket arrangement may comprise a recess or cut-out, at the location of discrete fixation points. This may help to allow a good fixation connection between the VIG unit and discretely arranged fixation arrangements placed at these fixation points. A part of the first gasket arrangement may in further aspects of the present disclosure be remained/maintained between said cut-out and the frame opening or a further gasket member, thereby providing a water tightening functionality.

The cut-outs may in aspects of the present disclosure provide an exposed edge area of the vacuum insulated glass unit in/at the gasket for the fixation arrangements.

A further resilient gasket or seal member may arranged between said frame opening and said first gasket arrangement. This may e.g. help to improve water and/or air tightening between the vacuum insulating glass unit and said frame assembly.

In one or more aspects of the present disclosure, said resilient gasket or seal member may have a thickness above 4 mm, such as above 5 mm, for example above 6 mm at a temperature difference between the VIG unit glass sheets of substantially 0° C. This thickness may in aspects be between 4 mm and 30 mm, for example between 4 mm and 13 mm, such as between 4 mm and 10 mm, for example between 5 and 10 mm, at a temperature difference between the two glass sheets of the vacuum insulated glass unit of substantially 0° C. The thickness is measured in a direction perpendicular to the outer major surface of the VIG unit.

One or more resilient tightening seals or gasket arrangements, such as comprising resilient, deflectable lips, may furthermore be configured to follow said deflection of the vacuum insulated glass unit when it is subjected to a temperature difference between outer major surfaces of the vacuum insulated glass unit, so as to provide a substantially watertight and/or airtight tightening between one or more elongated frame profiles and the vacuum insulated glass unit surfaces.

This seal or gasket preferably provides a seal so that at least the discretely arranged fixation arrangements are not exposed to e.g. the weather, and are preferably not visible at the final, framed VIG unit unless it is taken apart. The seal moreover provides a watertight seal irrespectively of the variation in or amount of thermal deflection of the VIG unit in the frame, as it has a resiliency that causes it to fill out a gap/space between the VIG unit and a part of the frame assembly.

The seal/gasket or seals/gaskets may in one or more aspects of the present disclosure follow the deflection of the vacuum insulated glass unit due to thermal deflection by being arranged in a pre-compressed state at the frame assembly. Thus, the seal will be either further compressed or decompressed/expand as the VIG unit edge thermally deflect due to a temperature difference variation. The pre-compressed gasket/seal may e.g. be a foam, rubber or silicone seal/gasket which in an uncompressed state has a larger volume, width and/or height than in the pre-compressed state. The pre-compression is in one or more aspects of the present disclosure provided by means of the VIG unit and a part of the frame assembly.

The seal/gasket or seals/gaskets may in one or more other or additional aspects of the present disclosure follow the deflection of the VIG unit by being arranged at the frame assembly to be initially deflected by the VIG unit surface. Hence, the amount of deflection may vary along the gasket/seal(s) as the VIG unit thermally deflect and changes due to the temperature difference variation. The deflected portion of the gasket/seal may e.g. be one or more elongated, resilient flaps or lips made from e.g. rubber, silicone or another suitable, resilient material, extending along an outer surface of the VIG unit arranged in the frame assembly.

One or more of said tightening seals or gasket arrangements, may be pre-compressed or pre-deflected by means of said vacuum insulated glass unit, such as by an outer glass sheet surface of said vacuum insulated glass unit.

Tightening seals or gasket arrangement will thus expand or be further compressed when the thermal deflection of the VIG unit changes due to a temperature difference variation.

The one or more resilient tightening seals or gasket arrangements, may be configured to seal a predefined space provided between an outer surface of a glass sheet of the vacuum insulated glass unit, and a frame profile member, wherein said fixation system is placed in said predefined space.

One or more of said resilient tightening seals or gasket arrangements may be arranged to seal said predefined space, and a surface of said one or more resilient seals or gasket arrangements may face the exterior of said frame arrangement, e.g. by having a surface facing the frame opening.

The vacuum insulated glass (VIG) unit may in according to a preferred aspect of the present disclosure be a laminated vacuum insulated glass unit, where a lamination glass sheet, such as an annealed glass sheet, is laminated to an outer major surface of a glass sheet of the vacuum insulated glass unit by means of a lamination layer.

Simulation results have indicated that even though a lamination glass sheet may restrict the thermal deflection of the VIG unit edges with between 30% to 60% compared to free bending where the lamination glass sheet is not present, it may still be relevant to allow said edge deflection in the frame, as stresses in the VIG unit glass sheets and/or the edge sealing may still become significant during thermal deflection.

The vacuum insulated glass unit frame assembly discussed herein is preferably a building aperture cover such as a door or a window, such as a roof window.

VIG units may generally provide good heat insulation and/or other advantages when compared to windows or doors comprising gas insulated glass units.

The present inventors have found that computer simulations revealed that in certain situations when a VIG unit is arranged in a roof window so that the major outer surfaces are not completely vertical, gravity acts on the VIG unit and may (try to) cause a further deflection of the edges of the VIG unit. This may in some situations add on to the already present thermal deflection of the VIG unit edges due to a temperature difference between the VIG units. Hence a "worse case" scenario may be if the hotter surface of the VIG unit is the interior VIG unit glass sheet surface (often a surface of a lamination glass sheet in roof windows), as both gravity and thermal deflection acts in the same deflection direction. The present solution may be advantageous in order to also cope such scenarios in roof window applications.

In aspects of the present disclosure, the VIG unit frame assembly may be a window or door sash.

The fixation system may in particular be arranged so as to allow a shift in the direction of the thermal deflection of the corners and/or centre parts of the edges of the vacuum insulated glass unit in response to a change in the temperature difference between the two glass sheets of the vacuum insulated glass unit.

It is here understood that said change in the temperature difference ΔT=T1−T2 between the two glass sheets of the vacuum insulated glass unit provides a switch between which of the glass sheets that is the hotter glass sheet and the colder glass sheet respectively.

This may e.g. help to provide a more cost efficient solution may be obtained and/or a solution where the VIG unit frame assembly can be used in a larger range of climatic conditions and/or applications.

The length of the longer opposing edges is in the range of 500 to 3000 millimetres, preferably in the range of 600 to 1300 millimetres, whereas the length ratio between the shorter opposing edges and the longer opposing edges in preferred embodiments of the disclosure are in the range of 0.3 to 0.9, preferably in the range of 0.35 to 0.85.

In a particular aspect of the disclosure, each of the two opposing longer edges are attached to said frame assembly by two and no more of said fixation arrangements distributed in the longitudinal direction of said longer edges and none of said fixation arrangements fixates the shorter opposing edges to the frame assembly. According to this aspect, it is particularly preferred that the length ratio between the shorter opposing edges and the longer opposing edges is in the range of 0.3 to 0.7, preferably in the range of 0.35 to 0.6.

In one or more aspects of the present disclosure, a minimum distance may be provided in a space between an outer major surface of the vacuum insulated glass unit and walls of said frame, where said minimum distance is at least 4 mm such at least 5 mm, for example at least 6 mm at a temperature difference between the two glass sheets of the vacuum insulated glass unit of substantially 0° C. Said minimum distance is measured in a direction perpendicular to the outer major surface of the vacuum insulated glass unit and the frame, such as a frame wall surface facing the major VIG unit surface. This may e.g. provide more space and/or deflection freedom in order to allow the VIG unit to thermally deflect relative to the frame. The minimum distance may provide a space in which a fixation system and/or a resilient tightening gasket is placed.

The present disclosure also relates to a retrofitting frame system for retrofitting a vacuum insulated glass unit to a frame originally designed for insulated glass panes, such as windows, of greater thickness than the thickness of the vacuum insulated glass unit, wherein said retro-fitting frame system at least comprises:

- a vacuum insulated glass unit comprising at least two glass sheets separated by a gap between said glass sheets, wherein a plurality of support structures are distributed in said gap and wherein said gap is sealed, and
- a plurality of elongated frame profiles each comprising a recess defined between walls of the frame profile for receiving an edge of the vacuum insulated glass unit, wherein said recess extends the longitudinal direction of the frame profile, and wherein said plurality of elongated frame profiles are configured to be attached to said frame,
- one or more resilient, elongated tightening seals/gasket arrangements configured to follow a deflection of the vacuum insulated glass unit when it thermally deflect, so as to provide a water tightening and/or air tightening of a space provided between one or more frame profiles members and an outer surface of the vacuum insulated glass unit when installed at said frame,
- a fixation system configured to fixate the vacuum insulated glass unit in/at said recess of the frame profiles,
- wherein said vacuum insulated glass unit is configured to extend in a frame opening extending in a frame opening plane defined between the plurality of frame profiles, wherein said fixation system is arranged so as to allow edges of said vacuum insulated glass unit to thermally deflect in a deflection direction perpendicular to said frame opening plane due to a temperature difference between the two glass sheets, and wherein said fixation system is configured so as to allow the magnitude of said thermal deflection varies along the edge between the corners where the respective edge terminates.

This may e.g. provide a retrofitting solution providing one or more of the previously mentioned effects or advantages.

The elongated frame profiles of the retro fitting system may in aspects be configured to be placed in the frame opening extending between base members of the existing frame, and attached/fixed to these base members.

In the retrofitting frame system, said thermal deflection of the edge may be configured to be provided between and relative to said walls defining said recess.

The fixation system of the retrofitting frame system may comprise a plurality of fixation arrangements, wherein said plurality of fixation arrangements fixates said vacuum insulated glass unit at discrete fixation points distributed along the edges of the vacuum insulated glass unit,
  wherein said plurality of fixation arrangements are attached to said frame profiles, and whereby the thermal deflection of the edges is configured to be substantially at its minimum at the discreet fixation points,
  such as wherein said fixation arrangements are clamping devices configured so as to provide a clamping force onto oppositely directed, outer major surfaces of said vacuum insulated glass unit.

Preferably at least two of said frame profiles comprises two, and no more of said fixation arrangements.

Also, said fixation system and one or more, such as all, of said elongated frame profiles may preferably be pre-mounted at said vacuum insulated glass unit.

The fixation system may comprise a pre-compressed gasket arrangement, such as a C-shaped gasket, configured be arranged in a space between the vacuum insulated glass unit surfaces and said walls of said frame profiles defining said recess, and wherein said gasket is configured to be compressed or expand to allow said thermal deflection of the respective vacuum insulated glass unit edge.

The retrofitting frame system disclosed herein is preferably configured so as to provide a vacuum insulated glass unit frame assembly according to the disclosure made herein.

Furthermore, the present disclosure includes a method of retrofitting a vacuum insulated glass unit to a frame originally designed for gas insulated glass panes such as windows of greater thickness than the vacuum insulated glass unit, wherein said method comprises the steps of: removing an existing glass pane in said frame if present, providing a retrofitting frame system, fixating said frame profiles to the existing frame, so that the vacuum insulated glass unit of the vacuum insulated glass unit extends in the frame opening plane while fixated by said fixation system, optionally providing and arranging one or more water tightening and/or air tightening gaskets or seals so as to provide a water and/or air tightening of a space between the existing frame profile and the vacuum insulated glass unit, such as a water and/or air tightening of a space between a wall of the frame profiles and the vacuum insulated glass unit.

The method may furthermore comprise removing a glazing member of the existing frame from a base member of the existing frame during removal of the existing glass pane, and either
  re-attaching the glazing member of the existing frame to a base member of the existing frame, or
  replacing said glazing member of the existing frame with another glazing member having the same or other dimensions than the glazing member of the existing frame.

According to a yet further aspect, the present disclosure relates to a vacuum insulated glazing comprising a linear edge with an edge seal, wherein the vacuum insulated glazing is structurally affixed to a frame by means of two discrete fixation arrangements arranged at two intercepts, wherein said intercepts are configured to be virtual parabolic intercepts at said linear edge when said vacuum insulated glass unit thermally deflect due to a temperature difference.

Said vacuum insulated glazing may be provided in a vacuum insulated glass unit frame assembly as disclosed herein by means of a retro fitting system and/or a method of retrofitting as disclosed previously.

FIGURES

Figure 3:
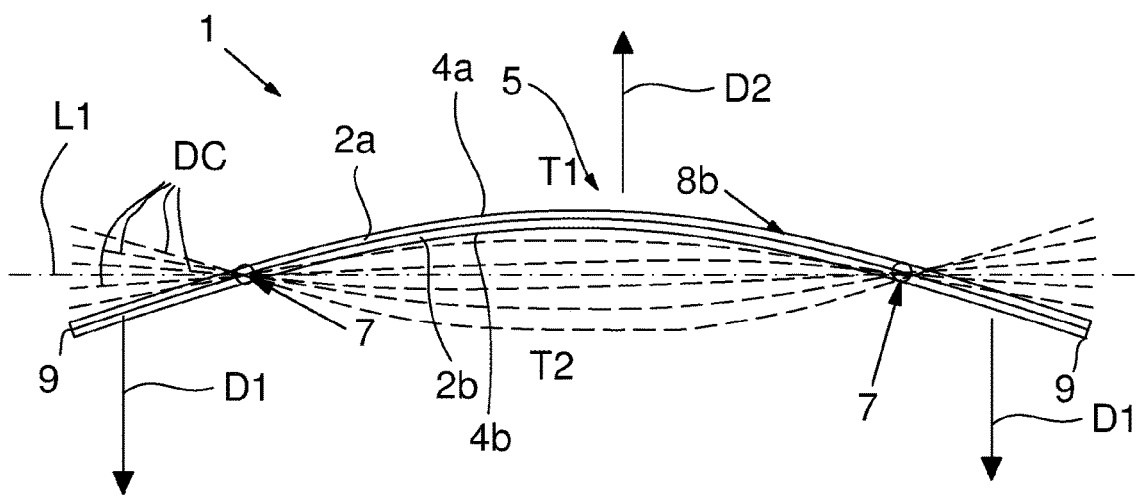
Figure 4:
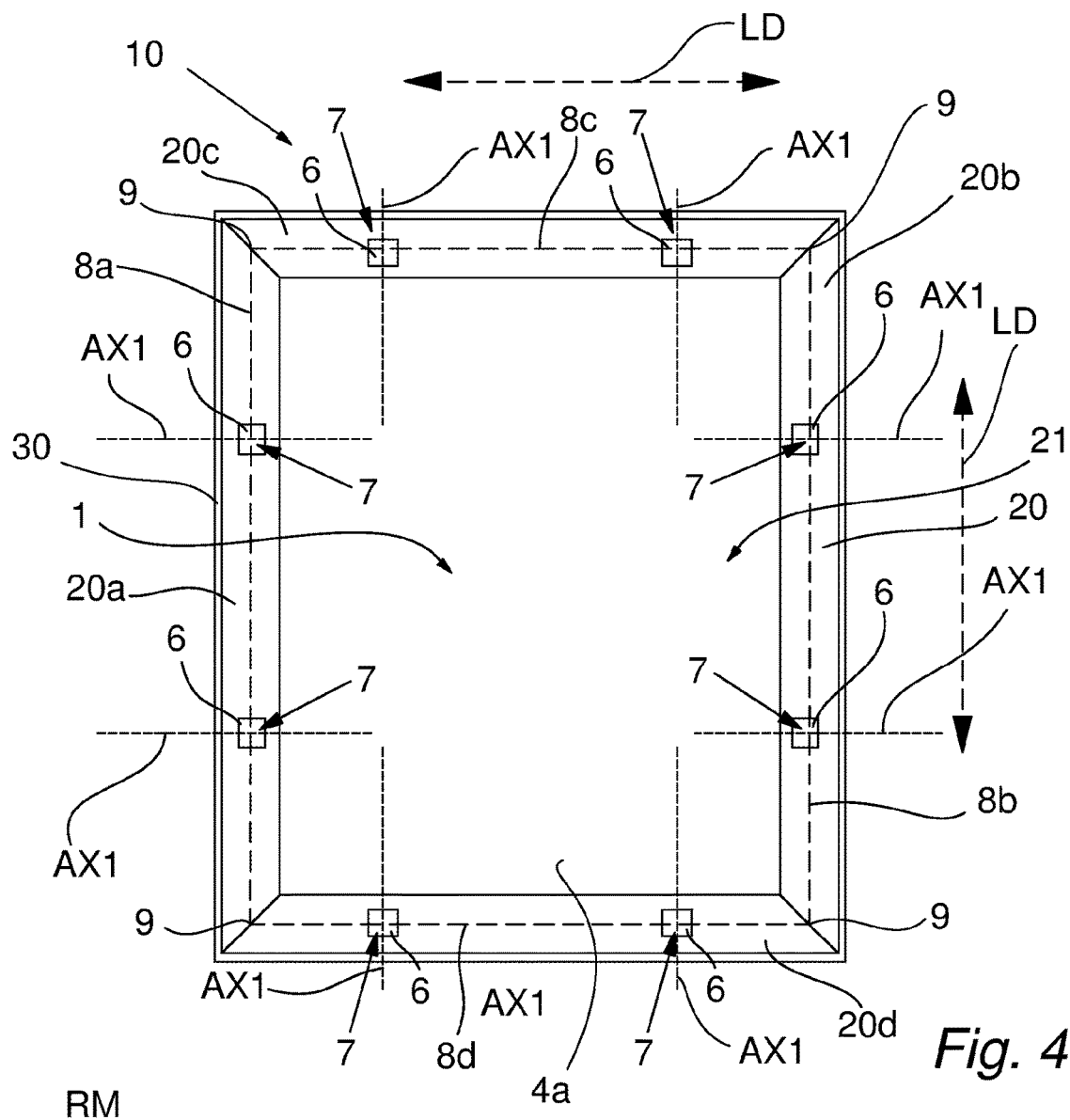
Figure 4A:
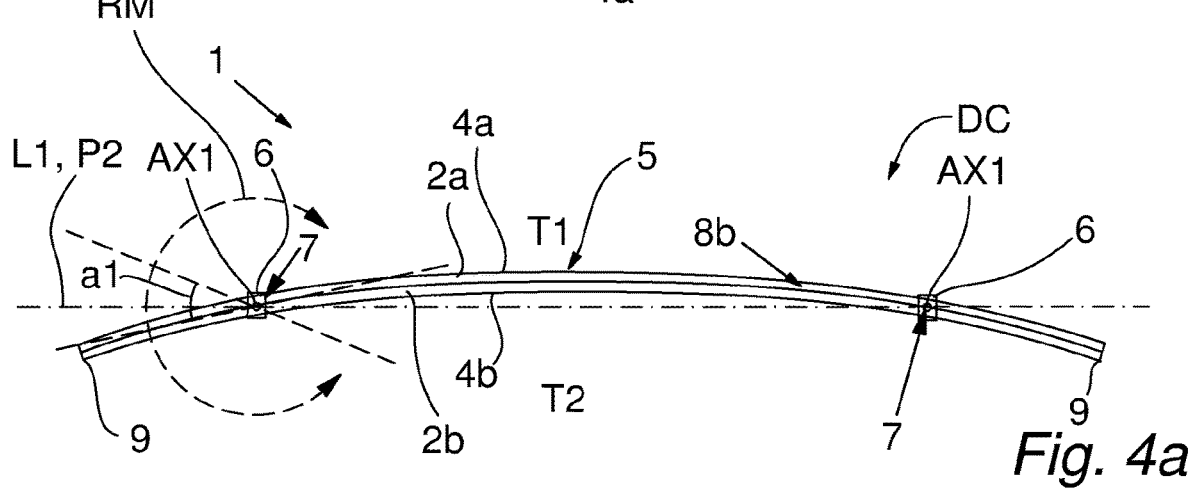
Figure 19:
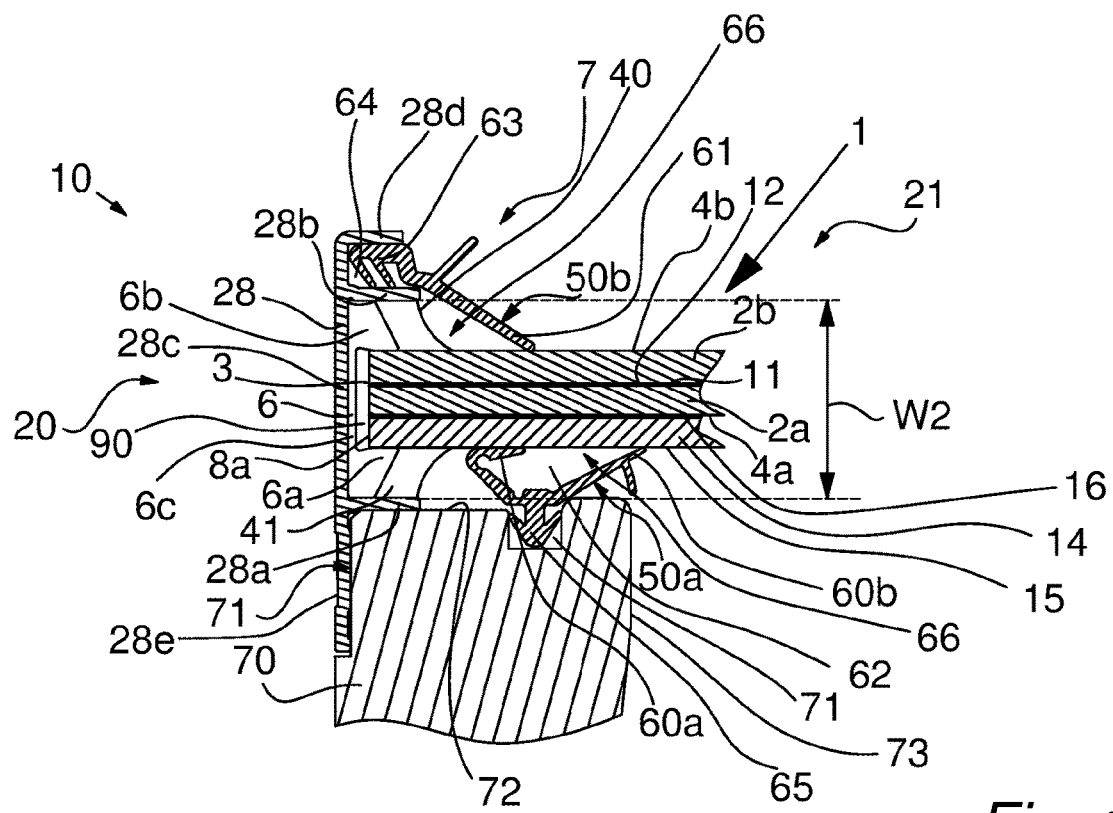
Figure 20:
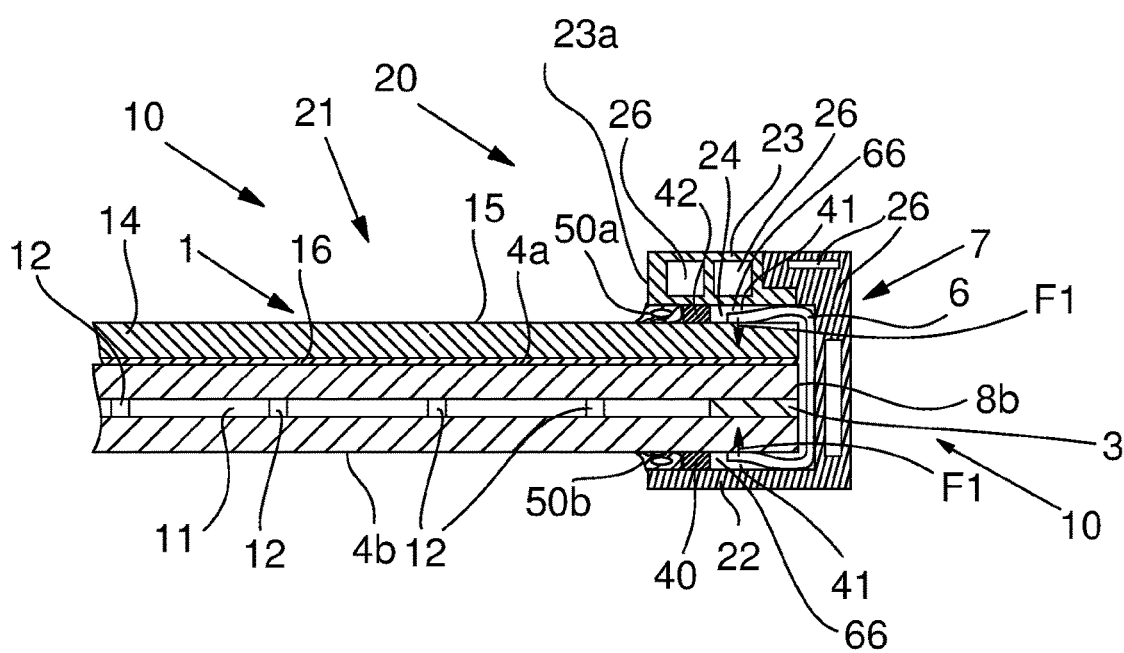
Figure 21:
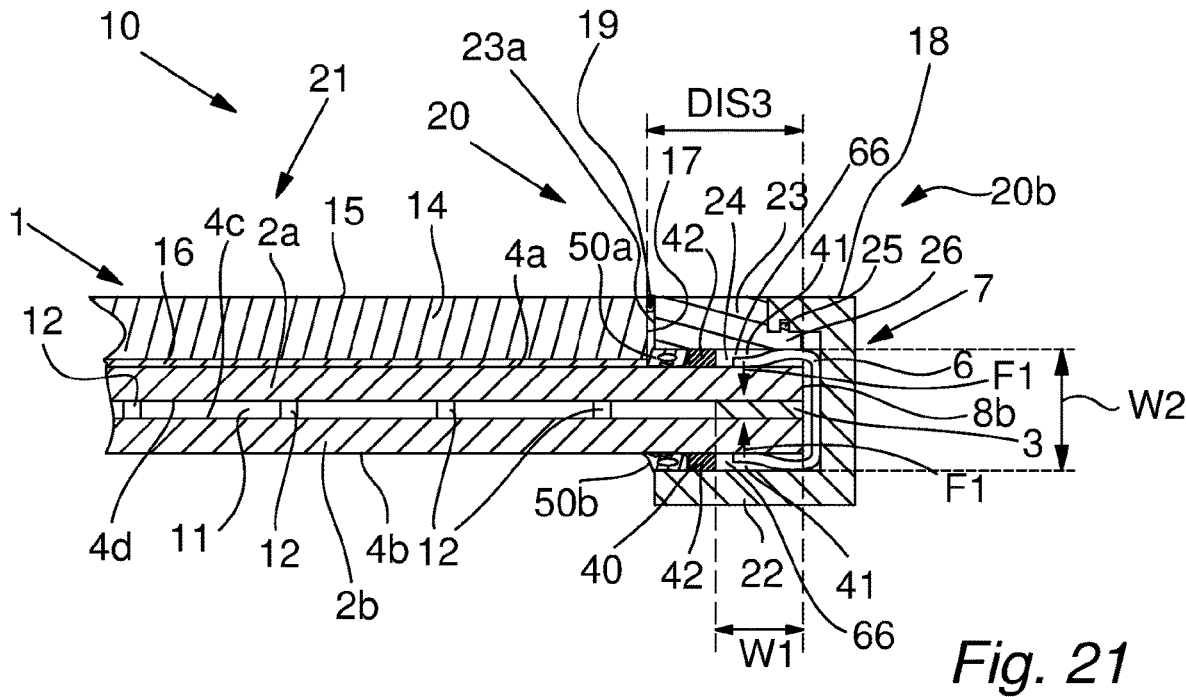
Figure 22:
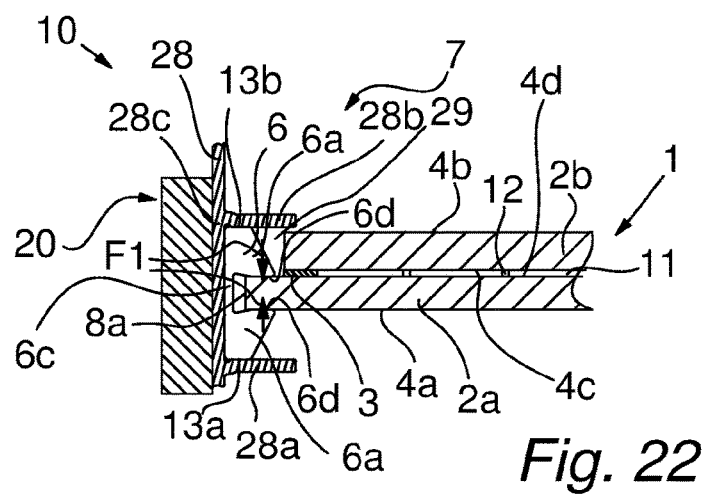

Aspects of the present disclosure will be described in the following with reference to the figures in which:

FIG. 1: illustrates a vacuum insulated glass (VIG) unit where a plurality of fixation arrangements are placed at discrete pane fixation points according to embodiments of the present disclosure, FIG. 2: illustrates a VIG unit according to embodiments of the present disclosure subjected to thermal deflection FIGS. 2a and 3: illustrates a VIG unit thermally deflecting relative to a straight common line extending between discrete fixation points according to aspects of the embodiments of the present disclosure, FIG. 4: illustrates a VIG unit frame assembly according to embodiments of the present disclosure, FIG. 4a: illustrates a rotational movement of a VIG edge in fixation points according to embodiments of the present disclosure, FIG. 5: Illustrates the magnitude of a thermal deflection of a VIG edge according to embodiments of the present disclosure, FIG. 6: FIG. 6 Illustrates a VIG unit deflecting relative to a common holding plane according to aspects of the present disclosure, FIG. 7: illustrates a VIG unit frame assembly according to further embodiments of the present disclosure, FIGS. 7a-9 illustrates VIG unit frame assembly comprising a glazing profile member and a base member according to embodiments of the present disclosure, FIG. 10: illustrates VIG unit thermally deflecting relative to a VIG unit frame assembly according to embodiments of the present disclosure, FIGS. 11a-11f: Illustrate fixation arrangements according to various embodiments of the present disclosure, FIG. 12: illustrates a gasket member is placed in the space between fixation device support members according to aspects of the present disclosure, FIGS. 13-13C-C: illustrates a gasket arrangement according to embodiments of the present disclosure, FIGS. 14-15: Illustrates further embodiment of a frame assembly according to embodiments of the present disclosure, FIGS. 16-17: Illustrates retrofitting solutions according to embodiments of the present disclosure, FIGS. 18a-18b: illustrates a vacuum insulated glass (VIG) unit where a plurality of fixation arrangements are placed at discrete pane fixation points according to further embodiments of the present disclosure, FIGS. 19-21 illustrates a laminated vacuum insulated glass units arranged in a frame assembly/frame according to various embodiments of the present disclosure, FIG. 22 Illustrates an embodiment of the present disclosure where one VIG unit glass sheet is larger than the other and used for fixation in a frame, according to embodiments of the present disclosure FIGS. 23-24: illustrates a hybrid VIG unit and a part of a frame according to embodiments of the present disclosure, FIGS. 25-26: illustrates embodiments of the present disclosure, wherein a frame assembly is configured to overlap one outer major surface of a the VIG more than the other outer surface, and where the VIG unit is attached to the frame by means of fixation arrangements at discrete fixation points, FIG. 27: illustrates the width of a fixation arrangement according to embodiments of the present disclosure.

Figure 28:
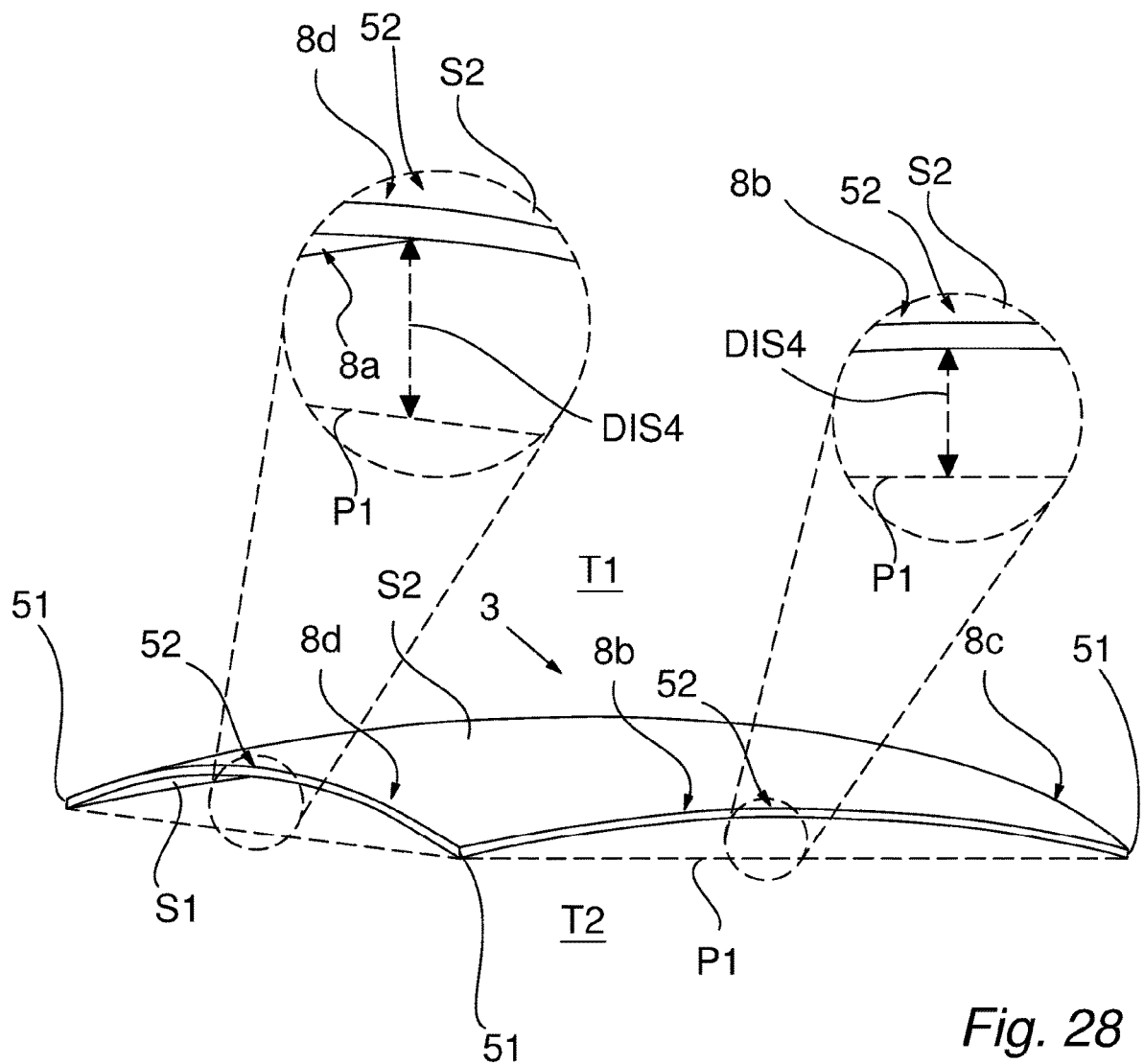
Figure 29:
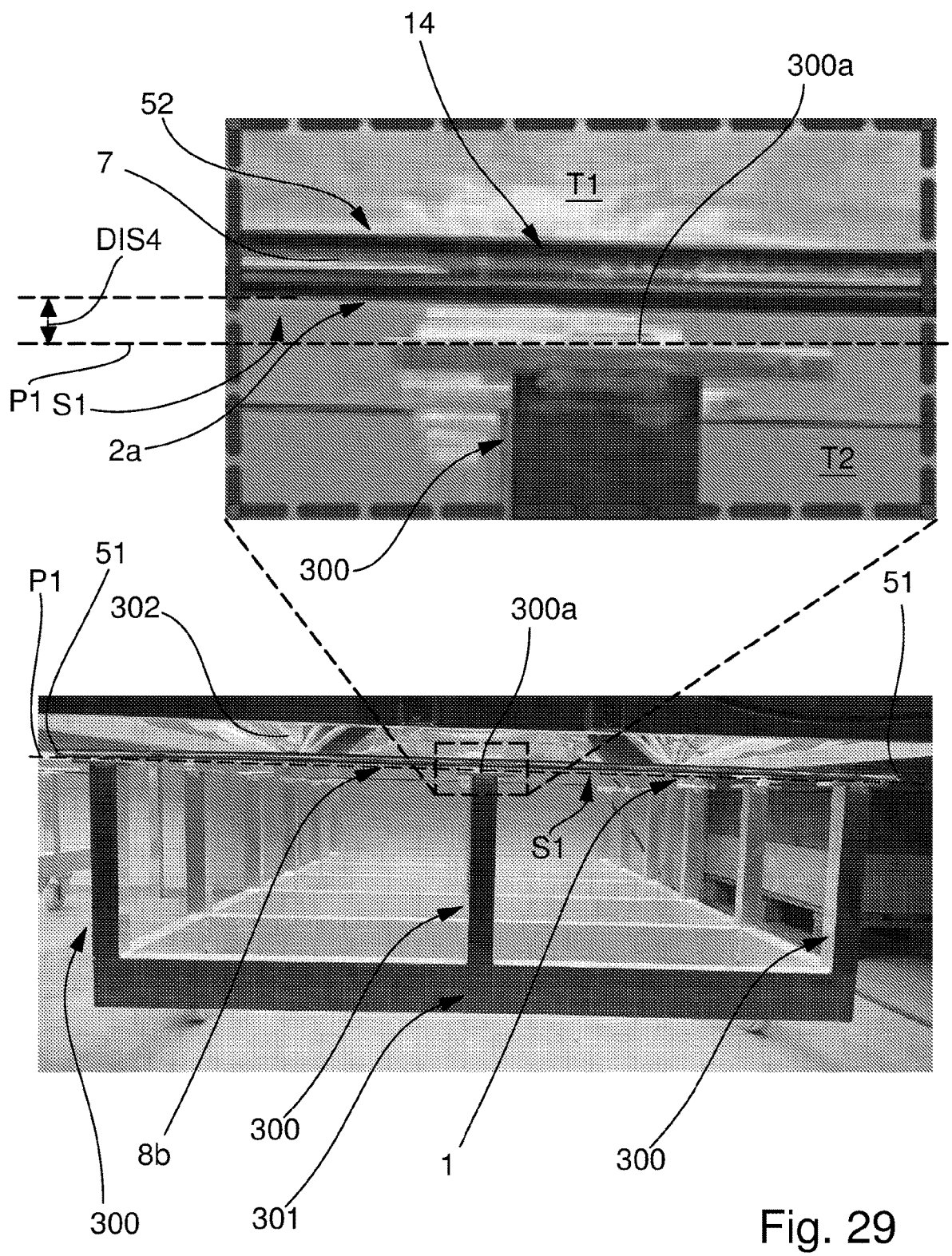
Figure 30:
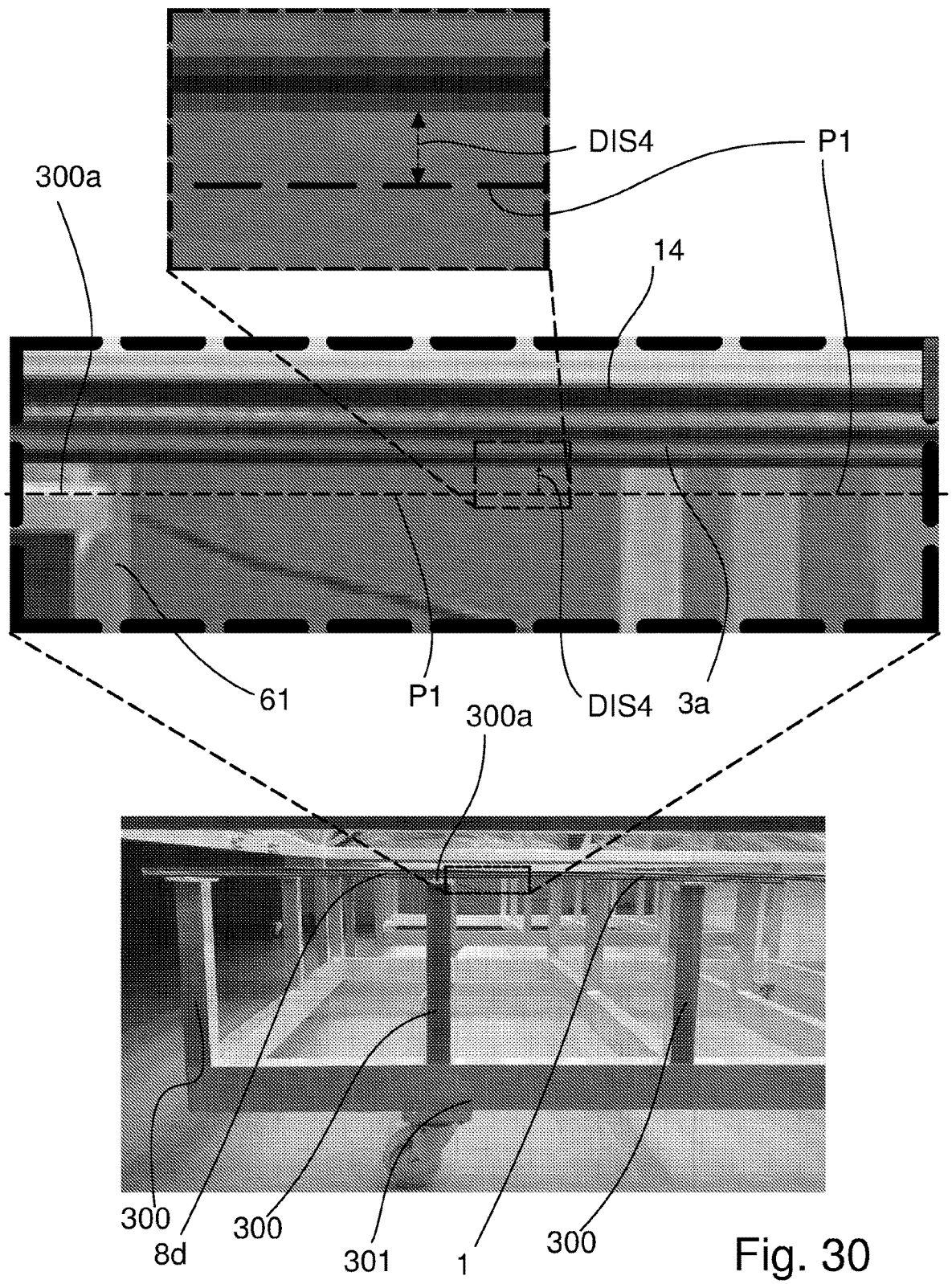

FIG. 28: illustrates a visualized computer simulation of a thermal deflection of a VIG unit, and FIGS. 29-30: illustrates a thermal deflection test of a laminated VIG unit.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically and in perspective a vacuum insulated glass (VIG) unit 1, where a plurality of fixation arrangements 6 are placed at discrete pane fixation points 7 distributed along the edges 8a-8d of the VIG unit 1.

The edges 8a, 8b, also referred to as narrow edges in the present disclosure, extend between the outer major surfaces 4a, 4b of the VIG unit, and comprises the end edges of the glass sheets 2a, 2b defining the height (between 8c and 8d) and width (between 8a and 8b) of the VIG unit respectively.

The VIG unit comprises multiple paired/mated glass sheets 2a, 2b. These glass sheets may e.g. be tempered, e.g. thermally tempered, glass sheets in embodiments of the present disclosure, but it may also be annealed glass sheets in other embodiments of the present disclosure. Support structures such as pillars are placed in a gap (not illustrated in FIG. 1) provided between the glass sheets 2a, 2b, and an edge sealing 3 seals the gap. The edge sealing may be made from low melting point solder glass material, or it may be made from e.g. a metal edge seal material. The gap between the inwardly major surfaces of the glass sheets of the VIG unit is evacuated to a reduced pressure such as to below $10^{-3}$ bar, such as below $10^{-4}$ bar, e.g. to about or below $10^{-3}$ mbar.

The VIG unit glass sheets 2a, 2b comprises outwardly facing, major surfaces encircled by the narrow edges 8a-8d of the VIG unit glass sheets. The VIG unit is rectangular in shape, and may thus either be substantially quadratic or alternatively have narrow edges 8a-8d of different lengths. However, opposite, narrow edges 8c 8d, and 8a, 8b are preferably parallel and of the similar length, and provides right angles at corners of the VIG unit 1 where the edges 8a-8d meet as illustrated by the dashed lines at the corner 9 indicated in FIG. 1.

When the VIG unit is subjected to a temperature difference at the glass sheets 2a, 2b, this causes the VIG unit to bend and the edges to deflect due to thermal deflection/ bending. This is indicated in FIG. 1 by means of dash/dotted edge "deflection curves" DC1, DC2. The deflection curves illustrated in FIG. 1 indicate a situation where the VIG unit edges deflect "upwards" indicating that the outer major surface 4a is subjected to a higher temperature than the outer major surface 4b, and at least a part of outer major surface 4a of glass sheet 2a of the VIG unit will thus have a convex shape, at least near the edges 8a-8d, whereas outer major surface 4b of glass sheet 2b will have a concave shape.

The edge may in embodiments of the present disclosure provide a so to say parabolic shape due to the temperature difference, see also e.g. FIGS. 2-3.

As can be seen in FIG. 1, the fixation arrangements 6 are placed at discrete pane fixation points 7 distributed along the narrow edges 8a-8d of the vacuum insulated glass unit, and these points 7 are placed where the dash/dotted "deflection curves" BC1, BC2 "crosses" the respective edge 8a-8d of the VIG unit. The VIG unit edge will accordingly flex/ deflect to both sides when compared to a straight, common line L1 (see e.g. FIG. 2) extending through the two pane fixation points 7 of the respective edge 8a-8d when the VIG unit thermally deflects.

FIGS. 2 and 2a illustrates schematically and seen in perspective (FIG. 2) and from the side onto the long edge 8b (FIG. 2a), respectively, narrow edges 8a-8d of the VIG unit VIG unit 1 subjected to thermal deflection according to one or more embodiments of the present disclosure. In FIG. 2, all the edges 8a-8d curves due to the thermal bending, and FIG. 2 illustrates the curve due to thermal deflection of edge 8b in more detail.

Here, the glass sheet 2a of the VIG unit is subjected to, and thus has, a larger temperature than the temperature of the other glass sheet 2b. This causes the surface 4a to obtain a convex shape s explained above.

As can be seen in FIG. 2a, the edge 8b of the VIG thus exhibits a deflection curve, where the outer surface 4a at the edge of the upper glass sheet 2a of the VIG unit at the location of the edge 8a has a convex shape, and correspondingly, the outer surface 4b of the other (lower) glass sheet 2b exhibits a concave shape. This causes the VIG unit edge 8b to describe a deflection curve DC relative to the line L1 and the frame opening plane P2.

The pane fixation points 7 of e.g. the edge 8b are placed so that the corners 9 of the VIG unit where the edge 8b terminates moves in a first direction D1 relative to the envisaged straight, common line L1 (dash-dotted line) extending through the pane fixation points 7 of the edge 8b when the VIG unit thermally deflect. On the other hand, a centre portion 5 of the edge 8b, is configured so move in the opposite direction D2 than the first direction D1, relative to the straight, common line L1, when the VIG unit edge thermally deflects.

When the glass sheet 2b gets hotter than glass sheet 2a, the corners 9 VIG unit moves in the second direction D2 relative to the line L1, and the centre portion 5 of the edge 8b, move in the first direction D1, relative to the line L1. The position of the fixation points 7 may however be kept substantially at the same position by the fixation arrangements 6 in the frame assembly, see e.g. FIG. 1 and/or one or more other figures and/or description thereto, of the present disclosure.

The deflection directions D1, D2 are relative to and perpendicular to a frame opening plane P2, and as indicated in FIG. 2a, also to the line L1. It is understood that the line L1 in embodiments of the present disclosure is substantially parallel to the frame opening plane.

As can be seen from various figures of the present disclosure, the line L1 and the frame opening plane P2 may coincide. In other embodiments of the present disclosure however, the Line L1 may be parallel to the frame opening plane P2, but may not coincide with the plane.

FIG. 3 illustrates a situation where a VIG unit 1 is subjected to a varying temperature difference ΔT=T1−T2 over time according to embodiments of the present disclosure.

For example, it is common for e.g. building aperture covers such as windows or doors arranged in outer walls, roofs or the like of a building, that these are subjected to varying temperature differences over time after they have been installed. Similar temperature differences also apply to refrigerator and cooler covers or doors.

For example, with a room temperature T1 of e.g. about 20° C. in the building, the temperature T2 at the other side (outside a building) of the VIG unit 1 may vary significantly, such as between e.g. 15° C. and 30° C. or even more, over 24 hours.

Even, the temperature difference may so to say switch "operational sign" so that the hotter side of the VIG unit may shift one or more times over e.g. 24 hours, many times over a calendar year, or even in the mere case that a hail, rain or snow shower occurs for a short period of time. This may e.g. largely depend on the geographical area where the VIG unit frame assembly is installed, and causes the rate and even direction of the thermal deflection to change over time.

For example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours. This causes the temperature difference ΔT to switch operational sign: The temperature T1 is 20° C. at the inside, and T2 (outside) is 10° C. at 8 PM. Thus, the VIG unit edge 8b corners 9 deflect in a first direction D1 as illustrated in FIG. 3. Then the thermal deflection of the VIG unit edge 8b gradually changes (illustrated by dashed deflection curves DC) as the Temperature T2 changes to be 35° C. at 3 AM at surface 4b, and thus 15° C. higher than T1. Thus, the VIG unit thermal deflection changes so that it deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant by means of a room heating system or cooling system (e.g. air-conditioning). These systems may also be known as HVAC (Heating, ventilation, and/or air conditioning).

Accordingly, the thermal deflection of the VIG unit 1 may vary significantly over 24 hours and even more over a longer period such as a calendar year and may depend on different weather conditions. A similar temperature difference may occur when a refrigerator or freezer door is opened or if the cooling device is turned on/off. This causes varying stress condition on the VIG unit over time, such as at the edges 8a-8d near the location where the VIG unit glass sheets are connected to seal the gap by e.g. an edge sealing 3. The stress conditions are complex. Examples of these stresses may be shear stresses at the VIG edge, differential stresses where tensile stress occurs at the deflecting glasses and/or stress concentrations at the corners.

The fixations points 7 allows the centre portion 5 and the corners 9 to provide the above mentioned thermal deflection, but provides a controlled and substantially fixed, common line L1 extending through the pane fixation points 7 for the edge 7b relative to which the corners 9 and centre portion 5 can deflect/displace relative to parts of the frame (not illustrated in FIG. 3), as the temperature difference varies.

FIG. 4 illustrates schematically a vacuum insulated glass (VIG) unit frame assembly 10 such as a building aperture cover, according to embodiments of the present disclosure, with a view seen towards a major outer surface 4a of the VIG unit. The vacuum insulated glass unit frame assembly 10 may e.g. be, a door or a window.

The VIG unit frame assembly 10 may in embodiments of the present disclosure be or be part of a frame assembly comprising a sash or frame 20 that can be opened relative to a fixed frame 30. Usually by hinges or sliding support. However, the sash or frame 20 may also be fixed in an un-openable manner to the fixed frame or directly to a building structure.

The VIG unit frame assembly 10 comprises a VIG unit 1 as e.g. described above. This VIG unit frame assembly 10 comprises frame/frame assembly 20 holding and framing the vacuum insulated glass unit 1 in a frame opening 21 enclosed by frame profile arrangements 20a-20d of the frame assembly. The frame assembly 20 comprises four frame profile arrangements 20a-20d, but may in embodiments comprise fewer, such as three or two frame profile arrangements.

As illustrated, a plurality of fixation arrangements 6 are each connected or attached to one or more frame members of the frame 20, and fixates the vacuum insulated glass unit 1 relative to the frame 20 at the discrete pane fixation points 7 distributed along the edges 8a-8d of the VIG unit 1. By fixation is understood fixation relative to the deflection direction (D1, D2) perpendicular to the common line L1.

FIG. 4a illustrates schematically a rotational movement RM around an axis AX1 according to embodiments of the present disclosure around an axis AX1.

As illustrated in FIGS. 4 and 4a, the fixation arrangements 6 may in embodiments of the present disclosure be configured to allow a rotational movement RM of the narrow edges 8a-8d of the vacuum insulated glass unit 1 at the discrete fixation point 7 at each of the fixation devices 6. This rotation is allowed around an axis Ax1, extending into the frame opening 21, and is substantially perpendicular to the longitudinal direction LD of the respective edge of the vacuum insulated glass unit subjected to the rotational movement.

The fixation arrangements 6 are enclosed in the frame 20. In embodiments of the present disclosure, the fixation arrangements 6 are enclosed fully in the frame 20, but it may also be enclosed partly in the frame and be at least partly visible in the final VIG unit frame assembly 10.

The rotation axes Ax1 at the fixation points 7 of parallel, narrow VIG unit edges such as the narrow, long edges 8a and 8b in FIG. 4 are substantially parallel to each other and substantially perpendicular to further rotation axes AX1 at fixation points 7 of other shorter, narrow edges 8c, 8d of the VIG unit 1. The shorter (if the VIG unit is not quadratic), narrow edges 8c, 8d are substantially perpendicular to the long edges 8a, 8b, and meet with these at VIG unit corners 9.

The rotational movement RM of the edges of the vacuum insulated glass unit 1 at the discrete fixation point 7 of the fixation devices 6 around the axis Ax1 may in embodiments of the present disclosure be within an angle a1 of between 0.10 and 4°, such as between 0.3° and 2°, e.g. between 0.4° and 10 (a larger angle a1 is illustrated in FIG. 4a for the purpose of improving understanding). This may in embodiments of the present disclosure apply for a VIG unit subjected to a temperature variation between 20° C. and 80° C.

at one side of the VIG unit, and e.g. with a substantially fixed temperature, such as 20° C., at the other side of the VIG unit 1.

In embodiments of the present disclosure, the angle a1 may be at least 1 degree, such as at least 2.3 degrees. This may in embodiments of the present disclosure apply for a VIG unit subjected to a temperature variation between 20° C. and 80° C. at one side of the VIG unit, and e.g. with a substantially fixed temperature, such as 20° C., at the other side of the VIG unit 1. For example, the above mentioned rotational movement RM may be provided by the VIG unit due to thermal deflection in a situation where one of the glass sheets are kept at a temperature T2 of 20° C. and the other glass sheet temperature T1 is set to −20° C. and +50° C. respectively (i.e. a 70° C. temperature variation), or between −10° C. to +40° C. providing a 50° C. temperature variation.

The rotational movement RM may e.g. be measured by means of an optical, (e.g. a laser measurement arrangement) or a mechanical scanning/measurement arrangement (not illustrated) where the area of the fixation point 7 is determined as vertex. This scanning arrangement may be configured to determine the amount of rotation RM relative to the in the fixation point around the axis AX1 during the above mentioned temperature variation. This may e.g. be determined by measuring a distance change relative to a predetermined line or plane at one or a plurality of points of/for one or both outer surfaces of the VIG unit. This may be done at determined end point temperatures for the temperature variation at a surface of the VIG unit, such as for example at −20° C. and +50° C. respectively, where the temperature at the other side of the VIG unit is kept at e.g. 20° C. The amount of rotational movement in/at the point(s) 7 may thus be extrapolated based on the measurement data.

FIG. 5 illustrates schematically a location of the discrete fixation points 7 for the fixation arrangements 6 according embodiments of the present disclosure.

A fixation point 7 at an edge 8b of the VIG unit 1 is placed so that the corners 9 of the VIG unit moves in a first direction D1 relative to the straight, common line L1 (dash-dotted line) extending through the pane fixation points 7 of the edge 8b when the VIG unit thermally deflects (—Only one fixation point is illustrated in FIG. 5, see e.g. FIG. 4c). A centre portion 5 of the edge 8b (i.e. midways between the corners 9 where the edge terminates) is configured so as to move in the opposite direction D2 than the first direction D1, relative to the straight, common line L1, when the VIG unit thermally deflects.

The (envisaged) line L1 may be drawn between positions at the centre of the fixation arrangements 6 and the middle of the edge 8b extending between the outer major surfaces 4a, 4b of the VIG unit (such as at the edge sealing 3) of the VIG unit 1 edge.

The Line L1 may substantially coincide (as illustrated in FIG. 5) or be displaced from but be parallel to a frame opening plane P2 defined between elongated frame profile arrangements (see FIG. 7) 20a-20d.

The VIG corners 9 are displaced in the first direction D1 with the displacement distance DIS1, and the centre area 5 of the edge 8b is displaced in the opposite direction D2 with the second displacement distance DIS2 due to the thermal deflection, hence describing an edge deflection curve DC. In embodiments of the present disclosure the fixation points 7 are selected so that the size of the displacements DIS1, DIS2 are substantially similar (|DIS1|≈|DIS2|).

For example, on embodiments of the present disclosure, the maximum difference in the amount/magnitude of the edge deflection DIS1 in the first direction D1 and the edge deflection DIS2 in the second direction D2 may be less than 30% such as less than 20%, e.g. less than 10% or less than 5%. This may e.g. be at a temperature difference (ΔT=T1−T2) between the two glass sheets (2a, 2b) of 40° C. or 65° C.

Simulation results have indicated that the increment of the magnitude of the thermal deflection of the edges 8b (when allowed to thermally deflect freely) may be increase more at the ¼ or ⅕, such as the ⅙ of the edge 8b nearest the corners 9, compared to the increment of the magnitude of deflection at the half of the edge 8b length distributed around the centre portion 5 of the edge. This may e.g. apply for a temperature difference (ΔT=T1−T2) between the two glass sheets 2a, 2b of 40° C. or 65° C.

Generally, the area AR of a fixation point's location 7 along an edge 8b of the VIG unit may be within 10 to 40 cm from the nearest corner of the VIG edge 8a, and this may be common for a plurality of VIG sizes having different widths and heights. And this may apply for edges 8b longer than 1 meter, such as longer than 1.5 meters.

For example, in embodiments of the present disclosure, the area AR of a fixation point's location 7 along an edge 8b of the VIG unit may be between ⅑ to ⅓, such as between ⅛ to ¼, such as between ⅐ to ⅕ of the length of the respective VIG unit edge 8a-8d, measured from the nearest corner 9 where the edge terminates.

This may e.g. be selected by identifying the straight, common line L1 substantially at a middle position of the VIG unit edge 8b between the outer surfaces 4a, 4b (for example at the position of the edge seal 3), when subjecting a window of a certain size to one or more temperature differences, and determine the line L1 and thus the fixation points 7 based thereon.

The fixation arrangements 6 are arranged so as to allow the edge 8b of the VIG unit 1 to thermally deflect DIS1, DIS2 in a deflection direction D1, D2 perpendicular to the frame opening plane P2 and the line L1 due to a temperature difference ΔT=T1−T2 between the two glass sheets. The magnitude of the thermal deflection DIS1, DIS2 varies along the edge 8a-8d between the corners 9 where the respective edge 8a-8d terminates. As can be seen, the magnitude of the edge deflection from the line L1 or plane P2 at the centre portion 5 of the edge 8b is larger than the magnitude of the deflection closer to the fixation point, between the centre portion 5 and the fixation point 7.

The same applies for the corners 9; as can be seen, the magnitude of the deflection at the corners 9 from the Line L1 or plane P2 relative to the fixation point 7, is larger than at a position of the edge 8b closer to the fixation point 7, between the corner 9 where the edge terminate and the fixation point.

The displacement DIS1, and DIS2 from the Line L1 may in embodiments of the present disclosure each be between 3 to 9 mm, such as between 4 mm to 8 mm when subjected to a temperature difference between 40° C. and 65° C.

FIG. 6 illustrates schematically and seen in perspective, straight common lines L1 for the fixation points at each of the narrow edges 8a-8d of a VIG unit 1, according to embodiments of the present disclosure. The VIG unit 1 is subjected to thermal deflection, thus providing the curved edges 8a-8d. As can be seen, eight discrete fixation points 7 are selected for the VIG unit—two at each edge 8a-8d side of the VIG unit 1. These points 7 define a common holding plane P1 for the VIG unit.

The plane P1 extends in the x-y direction, and the thermal deflection of the VIG unit edges 8a-8d is provided in the z direction relative to the plane PL.

This holding plane P1 extend through the common, straight lines L1 defined by the fixation points 7 at the respective edges 8a-8d, and the axes AX1 extend in the plane PL1.

It is understood that the plane P1 in embodiments of the present disclosure may be parallel to the frame opening plane P2 and may in further embodiments either be arranged at a distance from the frame opening plane P2 or coincide with the frame opening plane P2.

The holding plane P1 extend into or parallel to the frame opening 21 defined by the frame (not shown in FIG. 6) in which the vacuum insulated glass unit is arranged and fixated. In embodiments, the plane may extend from a frame recess provided by the frame into which the VIG unit extends (see e.g. one or more of FIGS. 7a-9 and/or FIG. 14 or 15 explained later on).

The thermal deflection of the VIG unit 1 will thus be provided relative to the common holding plane P1 and the frame opening plane in opposite directions D1, D2 that are directed in the z direction.

In further embodiments of the present disclosure, fewer fixation points 7 than eight may define the common holding plane P1, for example alone the fixation points arranged at the longer edges 8a, 8b of the VIG unit 1.

It is generally understood that in embodiments of the present disclosure, one or more edges 8a-8d of the VIG unit 1 may not be held by a fixation arrangement 6 at a fixation point 6. In further embodiments of the present disclosure, just one fixation point 7 may be selected for one or two of the edges 8a, 8b. For example, in other embodiments of the present disclosure, two fixation arrangements 6 may be arranged discretely at fixation points 7 at each of two opposite, parallel edges only, such as either the long, narrow edges 8a, 8b or the short narrow edges 8c, 8d. The other two edges may not be held by discretely arranged holding arrangements 6 at discrete points 7.

In embodiments of the present disclosure, the largest, total edge deflection DIS1+DIS2 of the edge 8b, such as of any of the edges 8a-8d of the VIG unit 1 may at a temperature difference ΔT=T1− T2 between the two glass sheets 2a, 2b of 65° C. be configured to be at least 2 mm, such as in the range of 2 mm to 40 mm, such as in the range of 5 mm to 35 mm, preferably in the range of 8 mm to 20 mm, as compared to a temperature difference of 0° C. This may apply when the VIG unit is arranged in a frame assembly as described in more details later on. In other embodiments of the present disclosure, the largest, total edge deflection DIS1+DIS2 of the edge 8b, such as of any of the edges 8a-8d of the VIG unit 1 may at a temperature difference ΔT=T1− T2 between the two glass sheets 2a, 2b of 40° C. be configured to be at least 1 mm, such as in the range of 1 mm to 25 mm, such as in the range of 3 to 15 mm, preferably in the range of 4 to 12 mm, as compared to a temperature difference of 0° C.

In embodiments of the present disclosure, the largest, total edge deflection DIS1+DIS2 of the edge 8b, such as of any of the edges 8a-8d of the VIG unit 1 may at a temperature difference ΔT=T1− T2 between the two glass sheets 2a, 2b of 650 be configured to be at least 0.3% of the length of the deflecting edge (8a-8d), such as in the range of 0.3% to 3.5% of the length of the deflecting edge 8a-8d, such as in the range of 0.4% to 2% of the length of the deflecting edge (8a-8d), such as in the range of 0.6% to 1.5% of the length of the deflecting edge (8a-8d), as compared to a temperature difference of 0° C.

It is understood that in aspects, the edge may be configured to deflect (total edge deflection DIS1+DIS2) at least 3 mm such as at least 5 mm such as at least 8 mm at a 40° C. or 65° C. Temperature difference, compared to a temperature difference of substantially 0° C.

In other embodiments of the present disclosure, the largest, total edge deflection DIS1+DIS2 of the edge 8b, such as of any of the edges 8a-8d of the VIG unit 1 may at a temperature difference ΔT=T1− T2 between the two glass sheets 2a, 2b of 40° C. may be configured to be in the range of 0.15% to 3% of the length of the deflecting edge (8a-8d), such as in the range of 0.25% to 1.8% of the length of the deflecting edge (8a-8d), such as in the range of 0.35% to 1.2% of the length of the deflecting edge (8a-8d), as compared to a temperature difference of 0° C.

In FIG. 5, the deflection of the edge 8b is illustrated but it is naturally to be understood that in embodiments of the present disclosure, all edges 8a-8d of the VIG unit 1 may be allowed to thermally deflect DIS1, DIS2 in one or more deflection directions D1, D2 perpendicular to the frame opening plane P2 due to a temperature difference ΔT=T1− T2 between the two glass sheets 2a, 2b.

In one or more embodiments of the present disclosure, the frame arrangement 20, such as one or more gasket arrangements 40 as described in more details later on, may be configured to restrict the edge deflection DIS1, DIS2 in one or both of the deflection directions D1, D2 compared to free bending of the edge deflection. This may e.g., in embodiments of the present disclosure, help to keep the edge deflection within one or more of the above mentioned deflection ranges.

Figure 7:
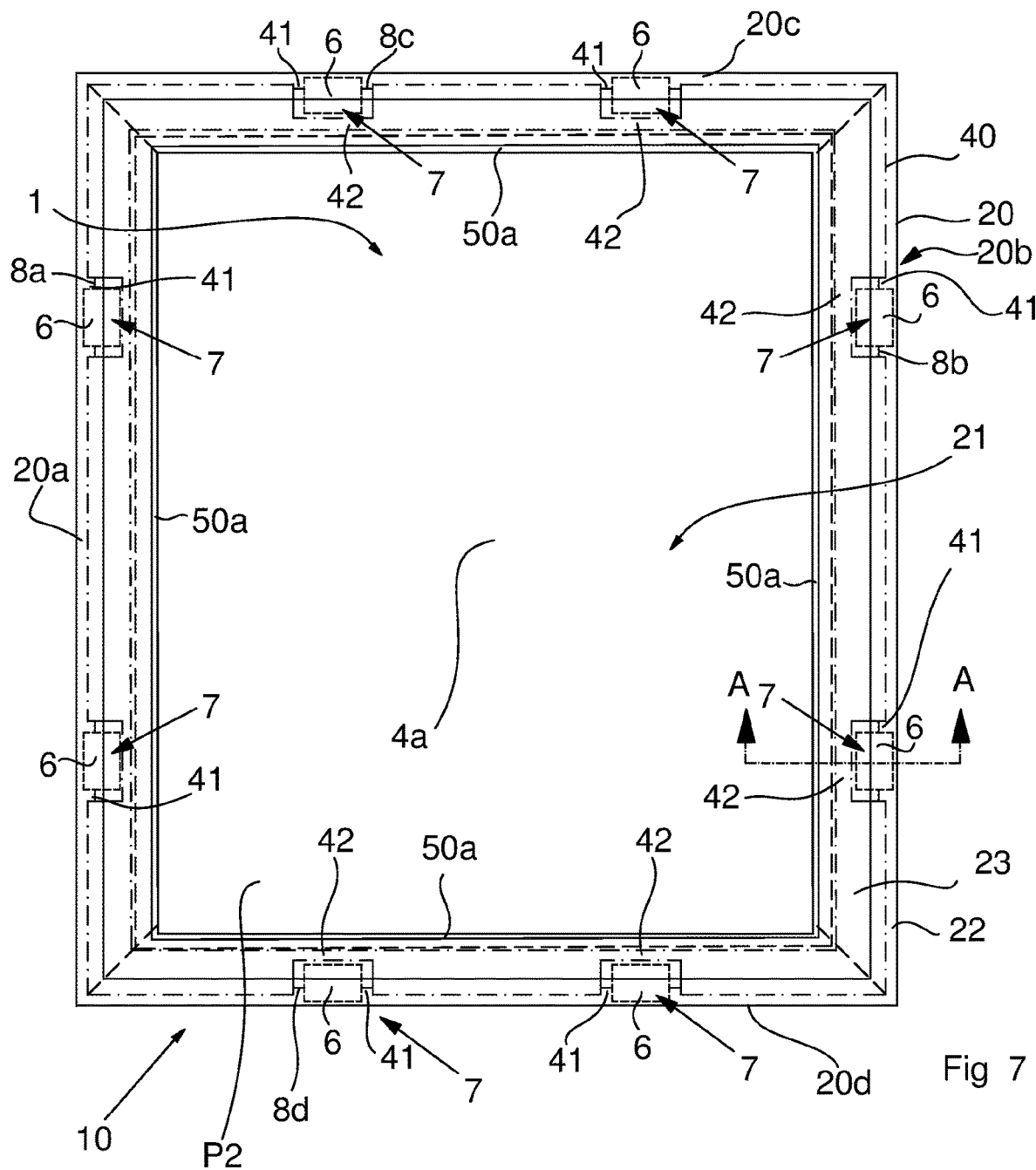

FIG. 7 illustrates schematically a VIG unit frame assembly 10 according to embodiments of the present disclosure, seen with a view perpendicular to and onto the frame opening plane provided by the frame 20.

As can be seen in FIG. 7, the frame arrangement/frame 20 may comprise substantially parallel top and bottom frame profile arrangements 20c, 20d, and substantially parallel side profile frame arrangements 20a, 20b. Two, two, three or all (as illustrated) of said top, bottom and/or side profile frame arrangements 20a-20d at least partly, such as fully, encloses the VIG edges 8a-8d, and also the said fixation arrangements (6a-6d).

In embodiments of the present disclosure, the frame may be provided from four elongated profiles. The frame may be provided from 2 half shells (interior and exterior side) sandwiched together. The frame may also be moulded as one unit.

The VIG unit frame assembly 10 comprises a resilient gasket 40 (indicated by dash-dotted line FIG. 7). The gasket 40 may in embodiments of the present disclosure be a rubber gasket, e.g. an ethylene propylene diene monomer rubber (EDPM) gasket, it may be a foam gasket, a neoprene or silicone gasket, it may be a TPE (Thermoplastic elastomers) gasket and/or the like provided between frame members 22, 23 of the frame, and the outer surfaces of the VIG unit glass sheets 2a, 2b.

The resilient gasket 40 comprises cut outs 41 at the fixation points 7 where fixation surface parts of the outer major surfaces 4a, 4b of the glass sheets are exposed to allow the fixation arrangements 6 to fixate the VIG unit at these points, relative to parts of the frame.

The resilient gasket 40 may in embodiments of the present disclosure, beyond a tightening property so that water from the VIG surface(s) 4a, 4b is prevented from flowing in between the VIG unit and the frame 20, also provide heat insulation between the VIG unit and the elongated frame profile arrangements 20a-20d, 22, 23.

The resilient gasket 40 comprises a gasket part 42 arranged in the frame recess 34 between the gasket cut-out 41 and the frame opening 21. This gasket part 42 provides a water tightening and/or a heat insulation at the area of the holding arrangement 6 between the holding arrangement 6 and the frame opening 21.

Further sealing or gaskets 50a, 50b such as a resilient rubber, plastic and/or foam gasket in embodiments of the present disclosure arranged to seal a frame recess 24 between the frame 20 and the VIG surfaces 4a, 4b to prevent or reduce water from the VIG surfaces moving into the frame recess 24. These further sealings or gaskets 50a, 50b encloses the frame opening 21 and are arranged at least partly between a frame member 22, 23 such as the base member 22 or the glazing member 23 of the frame assembly 20, and the outer glass sheet surfaces 4a, 4b of the VIG unit 1.

The further sealings/gaskets 50a, 50b are in embodiments of the present disclosure pre-compressed and resilient so that it will expand and compress between the outer VIG unit surfaces 4a, 4b and the frame members in the longitudinal direction of the edge 8b in response to the thermal deflection of the VIG unit 1 edges 8a-8d. Hence the gasket 50a, 50b will follow the movement of the VIG unit when it thermally deflects, so as to seal the gap between the VIG unit and the frame, and thus provide a water tightening of the recess 24 to reduce the amount of water, or avoid water, flowing into the recess 24.

It is generally understood that the further sealings/gaskets 50a, 50b may in embodiments of the present disclosure comprise a rubber gasket, e.g. an ethylene propylene diene monomer rubber (EDPM) gasket, it may be a foam gasket, a neoprene or silicone gasket, it may be a TPE (Thermoplastic elastomers) gasket and/or the like. It/they 50a. 50b may comprise internal chambers which are reduced in cross sectional size/area as the further sealings/gasket(s) 50a, 50b are compressed, and which increases in cross sectional size as the further sealing's/gaskets 50a, 50b is/are less compressed. This may help to provide a shape-memory effect for the gasket/seal 50a, 50b.

The further sealings/gaskets 50a, 50b and/or gasket 40 may either be of the hollow type where a space between gasket walls is reduced in size upon placement of the gasket and/or during a thermal deflection of the VIG unit. In other embodiments, the further sealings/gaskets 50a, 50b and/or gasket 40 may be substantially massive and comprise no extruded space.

In other embodiments of the present disclosure, the seals or gaskets 50a, 50b may be arranged so as to be deflected or compressed by the VIG unit and thus follow the VIG unit movement when it thermally deflects/bends as e.g. disclosed later on in the present disclosure.

The gasket 40 is also in embodiments of the present disclosure pre-compressed and is resilient so that it will either expand or be compressed in the longitudinal direction of the edge 8b in response to the thermal deflection of the VIG unit edge, and hence follow the movement of the VIG unit when it thermally deflects, so as to seal the recess.

The gasket 40 comprises parts that are placed between the frame and the VIG unit surfaces 4a, 4b, in the present example at both sides of the glass sheets.

The gasket 40 may however also in embodiments of the present disclosure be configured to provide a certain resistance towards thermal bending/deflection of the VIG unit 1 so that the VIG unit does not thermally deflect as much as if the gasket 40 was not present. For example, the VIG unit may be allowed to thermally deflect a certain amount when subjected to a temperature difference $\Delta T$ between the glass sheets 2a, 2b, but the amount of thermal deflection may also be restricted by the gasket 40 during the thermal deflection, for example at more extreme temperature differences between the VIG glass sheets 2a, 2b so that the gasket 40 will prevent the VIG unit 1 from being subjected to the full thermal deflection compared to if the frame 20 and/or gasket has been removed, and can thus provide a full thermal deflection in response to the temperature difference between the glass sheets 2a, 2b.

The gasket 40 may thus also be considered a part of the system for fixating the VIG unit in the frame 20.

One or more members of the frame 20, such as the base member 22 and glazing member 23, or the base member alone, may in embodiments of the present disclosure help to provide a counter force when the VIG unit thermally deflects, and thus help to provide a restriction towards the thermal deflection of the VIG unit. This may e.g. be provided within one or more temperature ranges of the temperature difference $\Delta T$, e.g. at the more extreme temperature differences, or alternatively over the whole thermal deflection of the VIG unit.

In one or more embodiments of the present disclosure, the gaskets 40 and/or further gasket(s) 50a, 50b material has a shore A value between 30 and 130. For example, In one or more embodiments of the present disclosure, The further gaskets 50a, 50b (if used) and/or the gasket 40 may have a Shore A value between 30 and 60 or between 33 and 95.

In one or more embodiments, the gasket 40 may at least at some areas have a shore A value above the shore A value of the further gasket(s) 50a, 50b.

Figure 7A:
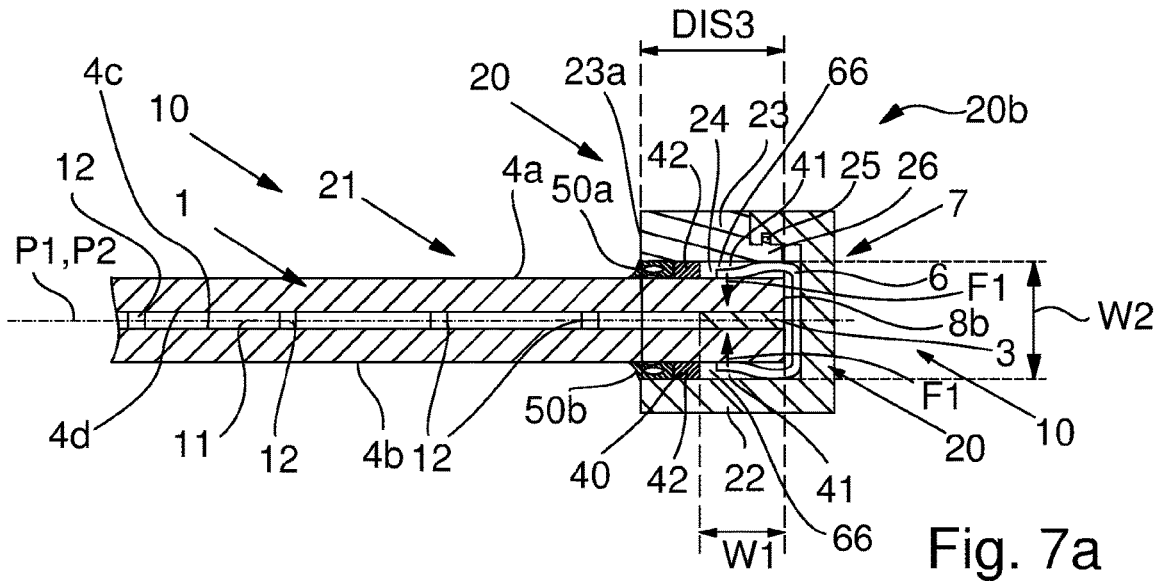

FIG. 7a illustrates schematically an example of a cross sectional view of a frame 20 profile 20b according to embodiments of the present disclosure in a cutting plane A-A shown in FIG. 7. As can be seen in FIG. 7a, the glazing member 23 is connected and fixed to the base member 22 by means of a connection 25. This connection 25 is a tongue and groove connection, but it may also be a snap connection and/or the like. Alternatively or additionally, the glazing member 23 may be connected to the base member 22 by means of other mechanical fastening means such as screws, clips or nails, and/or by means of chemical fastening means such as an adhesive.

In embodiments of the present disclosure, the fixation arrangements 6, such as a clamp 6 or the like, may help to keep the glazing member in place relative to the base member, e.g. by pressing towards a part 26 of the glazing member 23 arranged between the base member 22 and fixation arrangement 6 as illustrated in FIG. 7a. This may help to provide a holding force or keep a connection arrangement 25 such as a tongue or groove the glazing member in place relative to a groove or tongue in the base member.

As illustrated in FIG. 7a, the fixation arrangements 6 may in embodiments of the present disclosure provide a fixation of the VIG unit in the recess 24 at the discrete fixation points 7 of the VIG unit 1 at a location substantially located at the edge seal 3 of the VIG unit so that the edge seal 3 is arranged between parts of the fixation arrangement 6 at the point 7. Accordingly, forces or a torque transferred to the VIG unit in response to the thermal deflection of the VIG unit and the fixation functionality provided by the fixation arrangements 6 may be transferred substantially directly into the edge sealing.

In the example of FIG. 7a, the fixation arrangements 6 are clamping devices which subject oppositely directed clamping forces F1 to the VIG unit 1 at the discrete fixation points 7. The VIG unit is thus held in the frame recess 24 relative to the frame by the clamping devices.

The clamping force F1 provided by the clamping devices 6 is in embodiments of the present disclosure provided by an inherent resiliency of the clamping device design and material.

Additionally or alternatively, the whole or a part of the clamping force F1 may in embodiments of the present disclosure be provided by the frame assembly 20. The Frame assembly may thus transfer a clamping force F1 from a part of the frame assembly 20, such as by the base member 22 and/or the glazing member 23, to the clamping device 6.

In embodiments of the present disclosure, when the glazing member 23 is released/disconnected from the base member 22, this may expose a part of the fixation arrangements 6, e.g. so that the VIG unit 1 can be replaced in the frame assembly 20.

FIG. 7a additionally illustrates a cross sectional view of a VIG unit 1 comprising two glass sheets 2a, 2b separated by an evacuated gap 11 between major surfaces 4c, 4d of the VIG glass sheets 2a, 2b facing the gap. The gap may for example be 0.05-0.5 mm. A plurality of support structures 4 such as pillars are distributed in the gap 11 and extend between the surfaces 4c, 4d. The pillars may be from metal, glass or polymer and be arranged in a grid or another pattern. The gap 11 has been evacuated to e.g. a pressure below $10^{-3}$ bar, such as below $10^{-4}$ bar, e.g. to about or below $10^{-3}$ mbar, and then sealed. The edge seal 3 seals the gap and may be a fused seal which joins the VIG panes. For example made from e.g. a metal material or a glass material, for example a solder glass material such as a low melting point solder glass.

One or more seals may be present. The VIG unit's thickness, measured between the outwardly facing surfaces of the VIG unit may in embodiments be between 4-15 mm such as between 4-12 mm, e.g. 4-10 mm It is generally understood, that in embodiments of the present disclosure, the frame 20 may overlap the VIG unit edge by a certain amount/distance DIS3. This may help to provide an improved insulation performance of the VIG unit frame assembly 20, as the edge seal 3 material such as a metal material or a solder glass material, for example a low melting point solder glass, may provide a cold bridge. This may also help to reduce the stresses at the edges.

The distance DIS3 may in embodiments of the present disclosure be at least two times the width W1, such as at least three times the width W1 of the edge seal 3, measured along an inner surface facing the gap of one of the VIG glass sheets in a direction perpendicular to the nearby edge 8b. In embodiments of the present disclosure, the distance DIS3 is between two and five times the edge seal width W1.

For example, the overlap DIS3 may in embodiments of the present disclosure be between 10 mm and 50 mm, such as between 20 mm and 40 mm.

The distance may be measured along an outer surface 4a, 4b from the edge 8b to the position where the frame assembly 20 allows a view through the VIG unit 1 glass sheets. In the present example, it may be measured between the edge 8b and the surface 23a of the frame facing the frame opening 21 or between the edge 8b and edge of the gasket 50a most distal to the edge 8b.

It is understood that in further embodiments of the present disclosure (see e.g. embodiments of FIGS. 14, 19, 25, 26), the outwardly facing surface 4b (i.e. a surface to face away from a temperature controlled room such as a room in a building) of the VIG unit may either be less overlapped by the frame than the surface 4a to face the room, or not overlapped at all. This may e.g. be provided at one or more sides of the VIG unit at e.g. the bottom edge, top edge and/or side edges of the VIG unit. Or it may be provided at all sides of the VIG unit.

It is generally understood that in one or more embodiments of the present disclosure, the frame 20 comprises frame profiles. These profiles, such as the base member 22 and the glazing member 23, and/or other profiles of the frame 20 (see e.g. ref. 28 later on) may be elongated profiles made by means of e.g. an extrusion manufacturing process, a pultrusion manufacturing process, a moulding manufacturing process and/or the like. The material of the profile(s) may e.g. be a plastic material such as a PVC (polyvinyl chloride) or PP (polypropylene) plastic material, it may be composite material such as a glass or carbon fibre material, and the profiles may be made from a plastic material with fibres embedded to obtain a more strong/rigid profile and/or the like. Also, in one or more embodiments, one or more of the profiles of the frame may be made from a metal such as aluminium, and/or a wood material such as glued laminated wood material. These profiles may 30 extend continuously between the corners of the frame 20. One frame example can be an aluminium profile with polymer interconnection between the interior and exterior to add a thermal break. Another frame example according to the present disclosure may be a polymer profile with hollow chambers and reinforcements inside the hollow chambers for adequate strength. Another frame example is a compound frame of wood combined with a non-wood profile.

Figure 8:
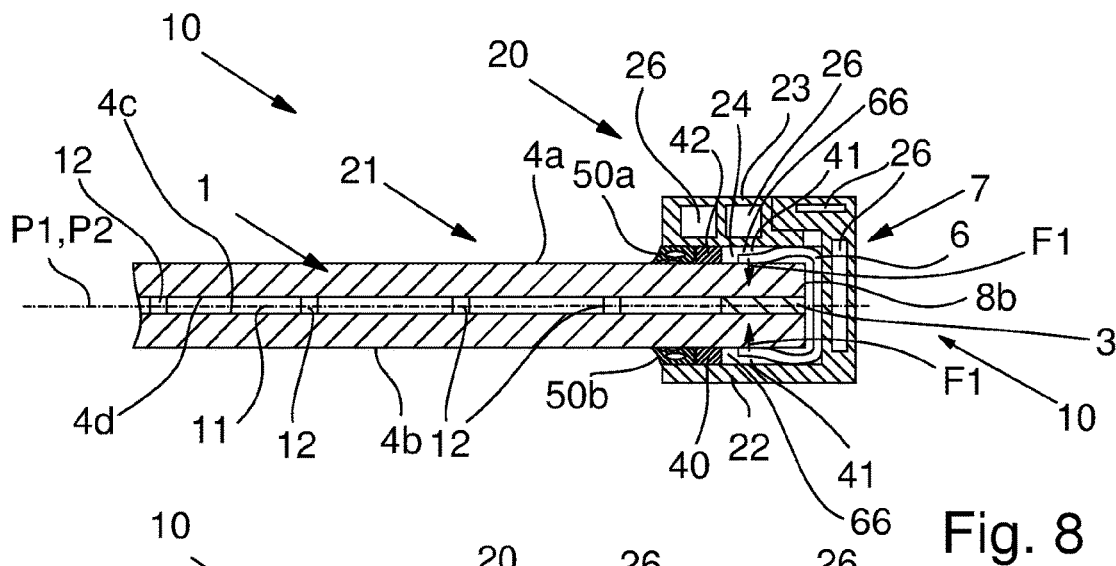

One or more of the frame profiles, 22, 23 of the frame 20 may either be substantially solid see e.g. FIG. 7a, or comprise internal insulating cavities, see e.g. FIG. 8, illustrating schematically a cross sectional view of a part of the frame 20 holding the VIG unit according to embodiments of the present disclosure.

In FIG. 8, both the glazing member 23 and the base member 22 comprises such cavities 26.

The cavity or cavities 26 may in embodiments of the present disclosure either be left 15 empty to comprise a gas such as air, or a selected gas pumped into the cavity 26. Alternatively one or more of the cavities 26 may comprise an insulating material such as an insulating foam, an expanded polystyrene material, a glass fibre insulation such as glass wool or mineral wool, it may comprise an aerogel insulating material and/or the like.

Figure 9:
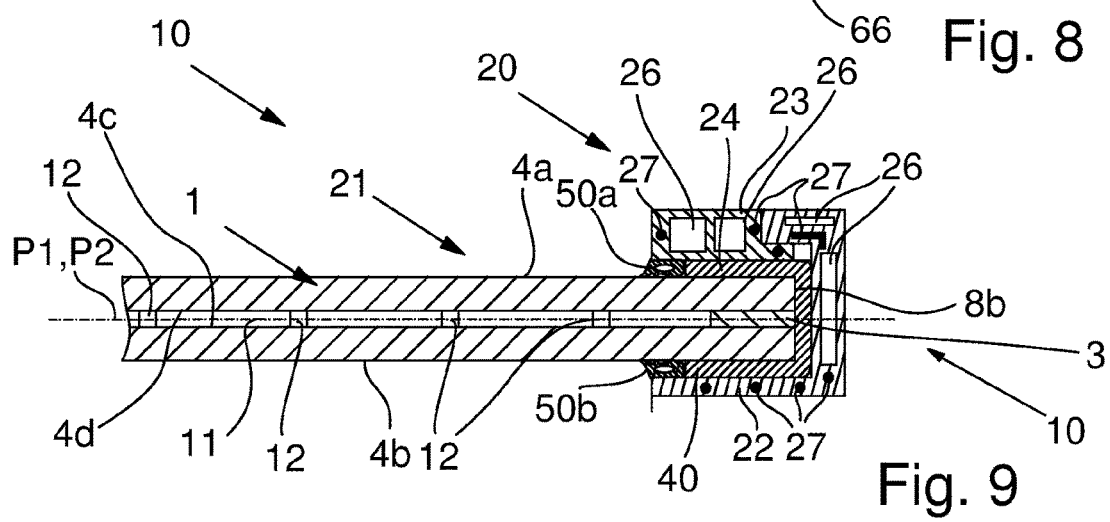

FIG. 9 illustrates a cross sectional view of a frame profile of the frame 20 at a position distant from one of the fixation points 7, according to embodiments of the present disclosure. As can be seen, the gasket 40 may extend/fold all the way around the end surface of the edge 8b, and thus be arranged to be placed between the outer 25 surfaces 4a, 4b of both VIG unit glass sheets 2a, 2b and a part of the frame 22, 23.

FIG. 9 moreover illustrates a further embodiment of the present disclosure, wherein the frame profiles 22, 23 comprises strengthening/reinforcing members 27 embedded 30 in the profiles 22, 23, e.g. by means of a co-manufacturing such as co-extrusion or co-pultrusion. These may have any suitable shape, extends in the longitudinal direction of the profiles and helps to improve/increase the rigidity and strength of the frame members 22, 23.

The further sealings/gaskets 50a, 50b may in embodiments of the present disclosure be separate and removable from the frame 20, but in other embodiments of the present disclosure (not illustrated), the sealings/gaskets 50a, 50b may be co manufactured such as co-extruded or co-pultruded together with the base member and/or the glazing member.

As illustrated in FIG. 7-9, the glazing member 23 and the base member 22, or the base member 22 alone may be substantially rigid to provide a counter force F1 (se FIG. 7a), and the width W2 of the recess 24 provided between members 22, 23 may thus substantially not change when the VIG unit edge thermally deflect to describe an edge deflection curve. The width W2 is larger than the thickness of the part of the VIG unit edge extending into the recess 24, and hence, a predefined space 66 may in embodiments of the present disclosure (ref no. 66 however not illustrated in FIG. 9 to avoid confusion) be provided between the outer surface 4a, 4b of the glass sheets 2a, 2b of the VIG unit 1, and a frame profile member 22, 23.

The VIG unit 1 can thermally deflect in these space 66 so as to describe the previously described "deflection curve" DC of the edge in the recess.

In embodiments of the present disclosure, the spaces 66 may configured to be larger than 4 mm, such as larger than 6 mm, e.g. larger than 8 mm when the VIG unit is kept at a constant temperature such as 20° so that the glass sheets of the VIG unit are at the same temperature. In embodiments, the spaces 66 may be configured to be between 4 mm and 12 mm, such as between 4 mm and 10 mm, e.g. between 5 mm and 8 m when the VIG unit is kept at a constant temperature such as 20° so that the glass sheets of the VIG unit are at the same temperature.

The recess 29 may in aspects of the present disclosure provide the space 66. Said space 66 may provide a minimum distance between an outer major surface 4a, 4b of the vacuum insulated glass unit and said frame is at least 4 mm such at least 5 mm, for example at least 6 mm at a temperature difference between the two glass sheets 2a, 2b of the vacuum insulated glass unit of substantially 0° C.

It is generally understood that even though the gasket 40 may be provided as e.g. illustrated and/or described in relation to various embodiments above or below, e.g. in one or more of FIGS. 7-9, FIGS. 12-16 and 19-21, it is understood that the gasket 40 may be omitted at one or both sides of the VIG unit, in other embodiments of the present disclosure see e.g. one or more of FIG. 1-6, 11e, 25 or 26. One or more gaskets or seals, such as gasket 50a, 50b as described in more details above or below may be used for a water and/or air tightening of a recess in the frame into which the VIG unit edges extend.

In other embodiments of the present disclosure, the gasket 40 may provide a sufficient tightening, hence making the further sealing strips 50a, 50b at one or both sides of the VIG unit dispensable, and one or both gaskets/sealings 50a, 5b may hence be omitted.

Figure 10:
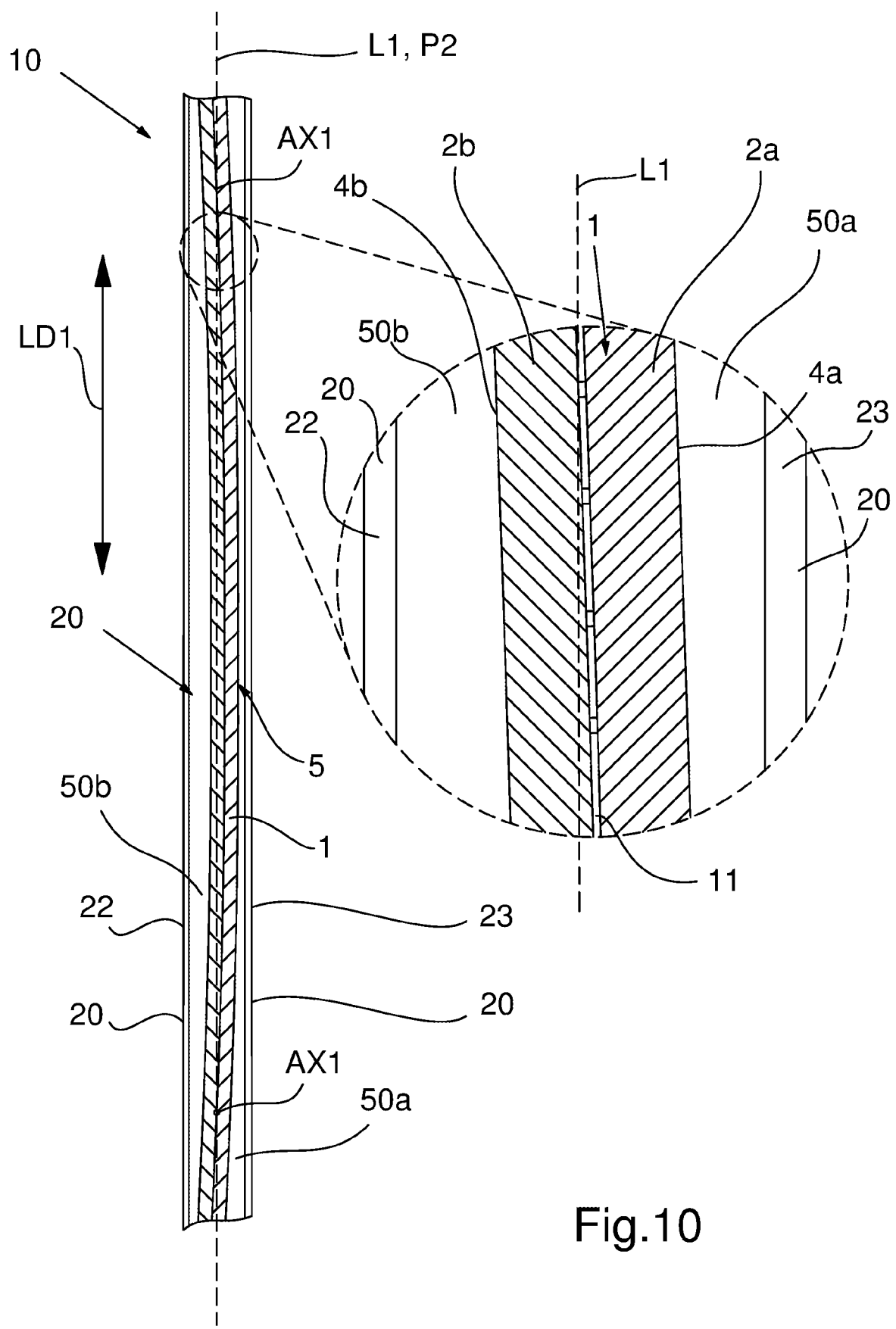

FIG. 10 illustrates a cross sectional view of a VIG unit 1 placed in a frame 20, seen in a direction parallel to the frame opening 21 provided by the frame.

As can be seen, the VIG unit thermally deflects/bends relative to the frame profiles 22, 23, so that the distance between the outer major surfaces 4a, 4b of the VIG unit and the frame profiles 22, 23 at/near the edge of the VIG unit changes. This causes the seals or gaskets 50a, 50b (see previous description) to expand or be compressed by the VIG unit due to the thermal deflection along the longitudinal direction LD1 of the frame profiles 22a, 22b and the VIG unit. Hence, as the amount and even direction of the thermal deflection of the VIG unit may change over time due to a change in the temperature difference between the VIG glass sheets 2a, 2b as e.g. previously described, the amount of compression of the seals/gaskets 50a, 50b may also change over time.

In embodiments of the present disclosure, the resilient gasket 50a. 50b may have a thickness above 4 mm, such as above 5 mm, for example above 6 mm at a temperature difference between the VIG unit glass sheets of substantially 0° C. This thickness may in further embodiments be between 4 mm and 30 mm, for example between 4 mm and 13 mm, such as between 4 mm and 10 mm, for example between 5 and 10 mm, at a temperature difference between the two glass sheets of the vacuum insulated glass unit of substantially 0° C. The thickness is measured in a direction perpendicular to the outer major surface of the VIG unit.

FIGS. 11a-11e illustrates schematically various embodiments of holding arrangements 6 for holding the VIG unit 1 relative to the frame 20 at a fixation point 7, according to various embodiments of the present disclosure.

Figure 11A:
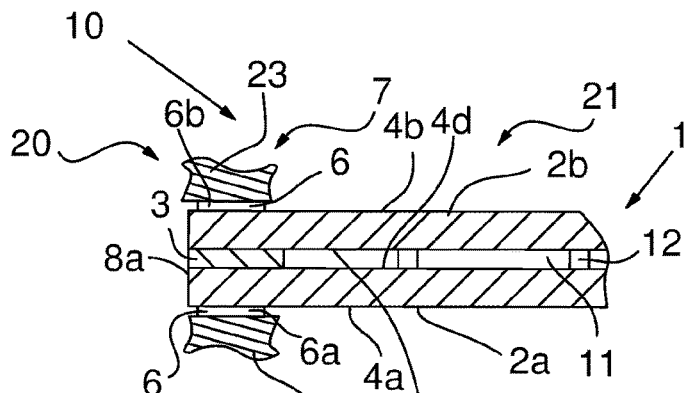

In FIG. 11a, the holding arrangement 6 comprises two parts 6a, 6b, where a part 6a, 6b is placed at each outer major surface 4a, 4b between frame members 23, 22 of the frame and the VIG unit surfaces 4a, 4b. These parts 6a, 6b are not connected directly to each other in FIG. 11a. Instead, the parts of the holding arrangement extend between a part 22, 23 of the frame 20 and the VIG unit surface 4a, 4b, and thereby hold the VIG unit at the fixation point 7, at a position relative to the frame 20. These parts 6 outer forces such as forces provided by wind gusts, objects striking the VIG unit and/or the like to the frame 20.

In one or more further embodiments, one or both of the holding parts 6a, 6b of the fixation arrangement 6 may be an integrated part of the frame 20, such as a protrusion fixed, such as deformed, glued or welded to a part of the frame, or manufactured together with that frame part, e.g. provided during the manufacturing of the part(s) of the frame.

Figure 11B:
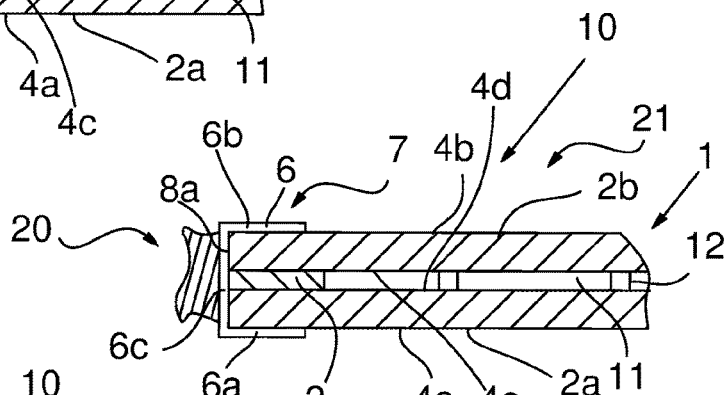

In FIG. 11b, the fixation arrangement 6 is a fixation device having two parts 6a, 6b, where the holding part 6a is arranged at the outer major surface 4a, of the VIG unit, and the other holding part 6b is arranged at the outer major surface 4a, of the VIG unit. An interconnection member 6c, such as a wall, of the fixation device 6a, 6b connects the parts 6a, 6b. The fixation device 6 is connected to the frame 20, thereby holding the VIG unit at the fixation point 7, at a desired position relative to the frame 20, and transfers outer forces acting on the VIG unit, to the frame 20.

Figure 11C:
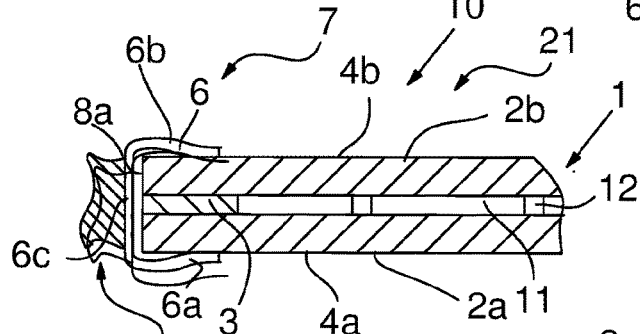
Figure 11D:
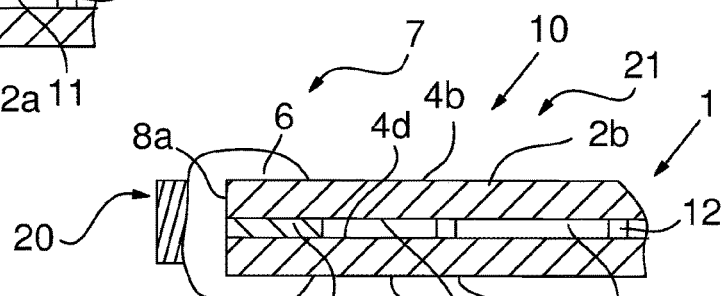
Figure 11F:
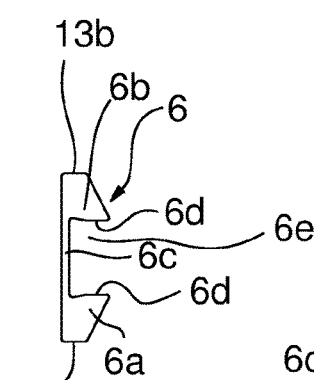
Figure 11E:
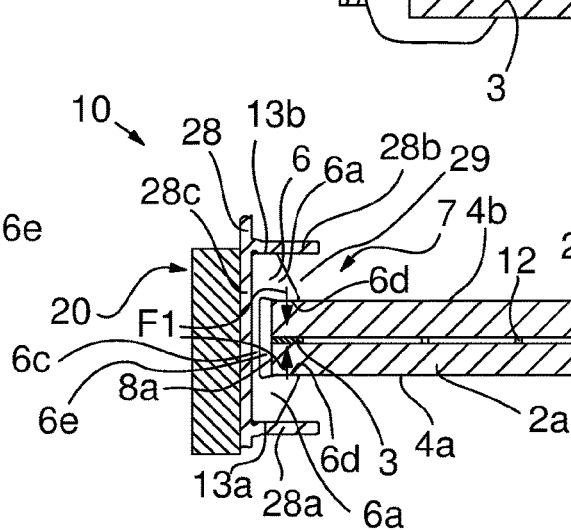

In FIG. 11b, it is the interconnection member 6c that is connected to the frame to transfer the outer forces, but the holding parts 6a, 6b of the fixation arrangement may also in embodiments of the present disclosure be connected to the frame as e.g. illustrated in relation to FIG. 11e and/or FIG. 12.

In FIG. 11b, the fixation device 6 is substantially rigid, and may in embodiments of the present disclosure be arranged so that it, at one or more certain temperatures or temperature differences between the surfaces 4a, 4b of the VIG subjects substantially no clamping forces towards the surfaces 4a, 4b. However, as the rate of thermal deflection may vary with different temperature differences, this may cause the fixation device 6 to exert a force on the VIG unit due to e.g. a rotational movement of the edge around an axis as e.g. explained previously in this document, but the device 6 it is either resilient enough due the design and/or material of the fixation device 6 to allow this rotation.

In FIG. 11e, the fixation arrangement 6 is a fixation device in the form if a clamp. The clamp comprises two parts 6a, 6b, where the holding part 6a is arranged at the outer major surface 4a, of the VIG unit, and the other holding part 6b is arranged at the outer major surface 4a, of the VIG unit. An interconnection member 6c, such as a wall, of the fixation device 6a, 6b connects the parts 6a, 6b. The clamp 6 is connected to the frame 20, thereby holding the VIG unit at the fixation point 7, at a position relative to the frame 20, and transfers outer forces acting on the VIG unit, to the frame 20. The clamp 6 is configured so as to continuously provide a clamping force at the VIG unit 6 when arranged at the position 7, and this clamping force is in the embodiment of FIG. 11c provided by the resiliency of a structure of the clamp. For example, the clamp may be made from a plastic, metal, rubber such as synthetic rubber and/or composite material having a resiliency that will provide the clamping force. This resiliency may be provided by the interconnection member 11c, a resiliency in the parts 6a, 6b, or a combination thereof. Also, the resiliency of the clamp 6 may in one or more embodiments help to allow a rotational movement of the VIG unit edge 8a at the point 7 when the VIG unit edge deflects thermally due to a temperature difference between surfaces 4a, 4b.

In one or more embodiments of the present disclosure, the fixation arrangement 6 may be attached to the VIG unit and/or a part of the frame 20 by means of an adhesive. In other embodiments, clamping forces may be provided by the fixation arrangement and/or the frame assembly 20, so as to attach the fixation arrangement 6 to the frame and/or the frame. In still further embodiments, screw, snap connections, nails or the like may be used to connect the fixation arrangement to a part of the frame 20.

In FIG. 11d, the fixation arrangement 6 in a fixation point 7 comprises a moulded material that has been attached to the VIG unit at the fixation point 7, e.g. in a liquid/soft state and then subsequently cured. This moulded material adhere to the VIG unit at the surfaces 4a, 4b, and to the edge 8a in FIG. 11d. In other embodiments of the present disclosure, the material may adhere to just one or two surfaces 4a, 4b, 8a of the VIG unit. The material may 6 may e.g. be a plastic material having adhesive properties that is heated and applied and then cooled to adhere to the VIG unit, it may be a silicone material or any other suitable, adhesive material.

In the embodiment of FIG. 11d, the material 6 is connected directly to a part of the frame 6 to transfer outer forces acting on the VIG unit to the frame 20. In other embodiments of the present disclosure (not illustrated), the arrangement 6 may comprise a connector member that is moulded, screwed, glued/adhered or in other ways connected to the material 6, and the material 6 may be connected to the frame 20 through/by means of this connector member.

In one embodiment of the present disclosure the fixation arrangement 6 may be an integral part the frame. For example by moulding, working or deforming a protrusion or stud.

In still further embodiments of the present disclosure, the fixation arrangement 6 may comprise an adhesive tape for connecting the VIG unit at the fixation point 7 to a frame part such as a frame profile of the frame 20.

In the embodiment of FIG. 11d, the fixation arrangement may e.g. be injected in between frame profile members/walls of a frame profile (not illustrated in FIG. 11d, see e.g. ref. 28a, 28b) and the VIG unit, and then be allowed to cure.

In FIG. 11e, the fixation arrangement 6 at a fixation point 7 is arranged in a space/recess 29 between two support members 28a, 28b, e.g. legs, of an elongated frame profile member 28 of the frame assembly 20.

FIG. 11f illustrates the fixation arrangement 6, used in FIG. 11e which is a fixation device 6 in the form of a clamp, but it may also be another fixation arrangement as e.g. disclosed above.

The fixation device 6 comprises the holding parts 6a, 6b which are interconnected by an interconnection member 6c, and the holding parts provide a recess 6 configured to receive the VIG unit edge 8a. Connection surfaces 6d of the holding parts 6a, 6b faces the recess 6e provided between the holding parts, and are configured to connect to the VIG unit. In one or more embodiments of the present disclosure, a resilient material such as a rubber material, an adhesive layer and/or the like (not illustrated) may be placed at one or both surfaces 6d between the surfaces 6d and the VIG unit surfaces 4a, 4b.

As can be seen in FIG. 11e, the fixation device 6 is placed in a recess/space 29 between two fixation device support members 28a, 28b of a frame profile member 28 at the fixation point 7.

The fixation device support members 28a, 28b are connected by a wall part 28c of the frame profile member 28 arranged opposite to the narrow edge 8a of the VIG unit 1, and the interconnection member 6c is placed between the VIG unit 1 edge 8a and the wall part 28c.

The fixation device support members 28a, 28b, such as legs, define a space/recess 29 into which the VIG unit edge 8a extends.

Accordingly, outer surfaces 13a, 13b of the fixation device 6 support at the surfaces 15 of the fixation device support members 28a, 28b facing the space 29, and the fixation device support members 28a, 28b helps to provide a clamping force F1 to the VIG unit to keep the VIG unit in a fixed position at the point 7. This may e.g. be provided due to the resiliency in the material and/or construction of the fixation device support members 28a, 28b and/or the wall 29c.

When an outer force such as a wind gust, a foreign objects or the like strikes the VIG unit 1, the fixation arrangements 6 at the fixation points 7 transfers these forces to the frame through the frame profile member 28, such as by means of the fixation device support members 28a, 28b and/or the wall member 28c.

It is generally understood that the fixation device 6 in embodiments of the present disclosure may be wedged between the fixation device support members 28a, 28b, and/or it may be glued to one or both members 28a, 28b and/or to the wall 28c.

The fixation device 6 provides a clamping pressure F1 to the edge opposite to the edge seal 3 of the VIG unit in the embodiments illustrated in FIGS. 11a-11e. This is provided at a location so that the VIG unit edge seal 3 is placed between the connection surfaces 6d of the fixation device 6.

However, it is generally understood that in further embodiments of the present disclosure, a part or the whole of the fixation device's 6 connection surfaces 6d may be arranged to be connected to a part of the surfaces 4a, 4b of the VIG unit, where between the VIG unit gap 11 is placed.

The clamping force F1 provided by the clamping device 6 may e.g. be provided by an inherent resiliency of the clamping device, and/or it may be transferred from a part 28a, 28b of the frame arrangement 20, through the clamping device 6 and to the vacuum insulated glass unit 1.

As can be seen in FIG. 11e, the fixation device support members 28a, 28b may be legs 28a, 28b which extend from the member 28 to provide a C-profile portion. The member 28 may for example be moulded, extruded, bent, roll shaped or pultruded to provide a profile having this shape.

The fixation arrangement 6 and the interconnection part 6c is arranged close to the frame profile wall 28c, e.g. to substantially abut the wall 28c so as to help to provide an increased stiffness and thus a larger holding or clamping force provided by the holding parts 6a, 6b of the fixation device 6 compared to if the device 6 was placed closer to the free ends of the members 28a, 28b distal to the wall 28c.

It is generally understood that the clamping arrangements 6 may be made from any suitable material or combination of materials. For example, the fixation devices 6 may be made from a metal such as steel, e.g. stainless steel and/or spring steel, but any other suitable material or materials such as a rubber material, a plastic material, a composite material such as glass fibre or carbon fibre and/or the like may be used for the clamping devices 6, e.g. since these materials may have a lower thermal conductivity, which may help to reduce the risk or degree of cold bridges. In still further embodiments of the present disclosure, the fixation arrangements 6 may be made from or comprise a glue, a soldering material and/or the like as e.g. shown in FIG. 11d.

In one or more embodiments of the present disclosure, the fixation arrangements 6 may be realisably connected to the frame assembly and/or the vacuum insulated glass unit. This may e.g. allow a replacement of the VIG unit 1 later on, or help to provide a retro-fitting solution.

FIG. 12 illustrates an embodiment substantially similar to FIG. 11e according to embodiments of the present disclosure. However, here, a gasket member 40 as previously described is used, see e.g. FIG. 6-9 and the description thereto. The gasket member 40 is placed in the space 29 between the fixation device support members 28a, 28b, and between the VIG unit surfaces 4a, 4b.

The gasket member 40 may be arranged to be pre-compressed in the space 29 between the members 28a, 28b, and may be further compressed or expand along the VIG unit when the VIG unit thermally deflects, so as to provide a water tightness, a heat insulation and/or a certain resistance towards thermal bending/deflection of the VIG unit 1 so that the VIG unit does not thermally deflect as much as if the gasket 40 was not present. The latter functionality is however mostly accomplished at positions of the gasket 40 away from the cut-outs 41.

FIGS. 13, 13B-B and 13C-C illustrates schematically a gasket 40 for use in a VIG unit frame assembly 10 according to embodiments of the present disclosure. FIGS. 13B-B and 13C-C illustrates a cross sectional view of the cutting planes B-B and C-C, respectively, as illustrated in FIG. 13.

As can be seen from FIGS. 13B-B and 13C-C, the gasket 40 has a C-profile providing a recess 43 for receiving the VIG unit edges 8a-8d (not illustrated in FIGS. 13-13B-B). However, at the area/location of the (expected) fixation points 7, the previously mentioned cut-outs 41 are provided (see FIG. 13C-C) for the fixation arrangements.

The gasket 40 comprises four elongated gasket strips 40a-40d, one for each VIG edge 8a-8d. Two, or as in the present example three, or four of these elongated gasket members 40a-40d may be folded around the corners of the VIG unit so that the narrow edges of the VIG unit extend into the recess 43 of the C-profile gasket.

The fourth gasket member 40d may however be disconnected from the other as illustrated in order to be fitted appropriately at a bottom frame profile of the frame assembly 20 when installing or exchanging the VIG unit in the frame 20. However, in other embodiments, the fourth gasket 40d may be connected to one or more of the other gasket members 40a-40d.

An end wall member 44 of the gasket 40 at the recess 43 bottom connects the gasket side walls 45a, 45b and is configured to be placed opposite to the VIG unit edges 8a-8d, e.g. so as to abut the VIG unit edges 8a-8d, and the gasket side walls 45a, 45b will thus extend in over the outer surfaces 4a, 4b of the VIG unit 1.

FIG. 14 illustrates schematically a cross sectional view of several embodiments of the present disclosure where the VIG unit frame assembly 10 is a window.

The VIG unit frame assembly 10 is substantially alike the embodiment of FIG. 12. However, further gaskets arrangements 50a, 50b beyond the first gasket/seal 40 are placed to provide a water tightening and an air tightening respectively.

The gasket arrangement 50a is arranged to provide an air tightening at the surface 4a of the VIG unit 1 for facing the interior of the building, and comprises two elongated flaps/lips 60a, 60b each deflected by the VIG unit surface 4a compared to a free state, and in contact with/abutting the VIG unit surface 4a. These tightening flaps/lips 60a, 60b help to protect against condensation at the VIG unit edge 8a area 30 due to a cold bridge provided between VIG unit glass sheets by the edge sealing 3.

A space 62 defined between the flaps/lips 60a, 60b and enclosed by the VIG unit surface 4a helps to provide an air pocket and/or heat insulation.

The gasket arrangement 50a thus follow the VIG unit edge 8a movement when the VIG unit's thermal deflection changes due to a temperature difference variation, due to the resilient properties of the gasket arrangement 50a, so as to provide an air tightening functionality. The gasket arrangement 50a thus follows the change in the edge deflection curve caused by thermal deflection.

The gasket arrangement 50b is arranged to provide a water tightening at the outer surface 4b of the VIG unit 1 to face away from the interior of the building. This gasket arrangement 50b also comprises an elongated flap/lip 61 deflected by the outer surface 4b of the VIG unit 1. This flap/lip 61 follow the VIG unit edge 8a movement when the VIG unit's thermal deflection changes due to a temperature difference variation, due to the resilient properties of the gasket arrangement 50b, so as to provide a water tightening functionality, e.g. to protect the interior of the frame such as the space 60 and recess 29 from moist, dew, rain water and/or the like. The gasket arrangement 50b thus follows the difference in the edge deflection curve caused by thermal deflection.

Generally, as one of the gasket arrangements 50a, 50b hence become less deflected by the VIG unit as the thermal deflection of the VIG unit changes, the lips/flaps of the other gasket will at the same location of the VIG edge 8a simultaneously become more deflected, see also FIG. 10 i.e. when one gasket is compressed the opposite gasket expands correspondingly and vice versa.

The gasket arrangements 50a, 50b extend in the longitudinal direction of the edge 8a and may be made from a silicone, rubber, foam and/or a combination thereof, in embodiments of the present disclosure.

As can be seen, the outer gasket 50b may in embodiments of the present disclosure be connected to the frame by being inserted in a dedicated gasket recess 64 for receiving a connection part 63 of the elongated gasket arrangement 61. This gasket recess or groove 64 is defined between the support member 28b which support the fixation arrangement 6, and a further gasket support member 28*d* which as illustrated may be part of the member 28.

The recesses 29 and 64 extends parallel in the longitudinal direction of the frame profile arrangement 20*a*, along the longitudinal direction of the edge 8*a* of the VIG unit.

FIG. 14 illustrates a further embodiment of the present disclosure, wherein the frame profile member 28 is attached to a sash profile 70. The sash profile 70 may be a wood material profile, or alternatively a plastic profile such as a PVC profile, a composite profile such as a fibre reinforced profile or aluminium profile and/or the like. The inner sash profile 70 may in one or more embodiments of the present disclosure be hollow (not illustrated in FIG. 14) to e.g. comprise one or more compartments for heat insulation. One or more these compartments may be filled with an insulating arrangement such as an insulating foam, a polystyrene material, a glass fibre insulation such as glass wool or mineral wool, it may comprise an aerogel insulating material and/or the like.

The profile member 28 comprises a sash connection part 28*e* extending from the part of the profile 28 comprising the recess 29 for receiving the VIG unit edge, and for holding the fixation arrangement(s) 6. As can be seen, the sash connection part 28*e* may together with the support members 28*a*, 28*b* in embodiments of the present disclosure provide an F-shaped profile.

The sash connection part 28*e* may be an elongated part such as a plate profile extending in the longitudinal direction of the VIG unit edge 8*a* or a plurality of elements projecting from the part of the profile member 28*e* comprising the recess 29 for receiving the VIG unit edge 8*a* and distributed in the longitudinal direction of the VIG unit edge 8*a*. The sash connection part 28*e* may be connected (at connection area 71) to the inner sash profile 70 by means of mechanical fasteners (not illustrated) such as screws or nails, one or more snap connections, one or more tongue and groove connections and/or the like. The sash connection part 28*e* may also or alternatively be connected to the inner sash profile 70 by means of an adhesive.

The inner sash profile 70 is configured to face the interior of the building. The inner sash profile 70 comprises a groove 71 in a surface 72 of the sash profile 70 facing the VIG unit major surface 4*a*. This groove 71 receives a connection part 65 of the gasket arrangement 50*a*, so that the gasket arrangement 50*a* extend placed between the sash profile surface 72 and the VIG surface 4*a*. Also or alternatively, the groove 72 may be arranged in a surface 73 of the profile extending away from the VIG surface 4*a*.

It is naturally to be understood that in other embodiments of the present disclosure, the gasket arrangements 50*a*, 50*b* may be attached/connected to the frame by any other suitable means such as by deformed portions, by means of glue, nails, screws or the like and/or be attached/connected to the frame at other location than the ones illustrated and described in relation to FIG. 14.

One or more surfaces of the inner sash profile 71, such as the surface 73 may in embodiments of the present disclosure be designed and arranged to be visible to the end user.

The sash profile 70 may in embodiments of the present disclosure be connected to one or more hinge or slide connections so as to allow the sash profile and thus the VIG unit 1 to be moved and opened and closed relative to a fixed frame arrangement (not illustrated in FIG. 14).

FIG. 14 moreover illustrates an embodiment of a VIG unit frame assembly 10 where a weather protective cover arrangement 80 is arranged to cover the frame profile member 28. This protective cover 80 may be connected directly or indirectly to a fixed part such as a fixed frame part and, the sash arrangement 28, 70 may thus move relative to the cover when opened or closed. The outer cover surface 81 may and/or a channel 82 in or provided by the gasket arrangement 50*b* may help to provide a weather proof connection.

As illustrated in FIG. 14, the width W2 of the recess 29 between profile members 28*a*, 28*b* is larger than the thickness of the part of the VIG unit edge 8*a* extending into the recess 29, and hence, a predefined space 66 is provided between the outer surface 4*a*, 4*b* of the glass sheets 2*a*, 2*b* of the VIG unit 1, and frame profile members 28*a*, 28*b*, and the surface 72 of the member 70 facing the VIG unit. The VIG unit 1 can thermally deflect in this space between the walls 28*a*, 28*b* so as to describe the previously described "deflection curve" of the edge in the recess. The fixation arrangements 6 maintain the space 66 by keeping the VIG unit edge substantially centred in the space 66. The VIG unit edge 8*a* may thus deflect in the space 66 between the walls 28*a*, 28*b* and the VIG unit.

The gasket flap/lips 60*a*, 60*b*, 61 seals this space 66. And thus comprises a surface facing the exterior of the frame arrangement 20.

FIG. 15 illustrates schematically a cross sectional view of a VIG unit frame assembly 10 at a fixation point 7, according to embodiments of the present disclosure. The VIG unit frame assembly may be used in a window or a door such as a fixed window or openable window or a door, or a refrigerator or freezer door. Some of the same design concepts as illustrated in FIGS. 11, 12 and/or 14 and described in relation to these figures are used in the embodiment of FIG. 15.

The fixation arrangement 6 at the fixation point 7 is arranged between two support members 28*a*, 28*b*, e.g. elongated legs, of a frame profile member 28 of the frame assembly 20. In the present embodiment, the frame profile member 28 is a base member 22 and the base member may either be fixed to a building structure or a fixed frame arrangement 30 (not illustrated in this figure). The fixation device support members 28*a*, 28*b* are connected by a wall part 28*c* of the frame profile member 28 arranged opposite to the narrow edge 8*a* of the VIG unit 1, and the interconnection member 6*c* of the fixation arrangement is placed between the VIG unit 1 edge 8*a* and the wall part 28*c*.

Gasket arrangements 50*a*, 50*b* substantially as described in FIG. 14 are used for providing a further sealing beyond the sealing provided by the gasket member 40, but is understood that in further embodiments of the present disclosure either the gasket member 40 only or the gasket arrangements 50*a*, 50*b* only may be used, and this may apply for one or both sides of the VIG unit 1 edge.

The recesses 29 and gasket recesses 64 extends parallel in the longitudinal direction of the frame profile arrangement 20*a*, along the longitudinal direction of the edge 8*a* of the VIG unit 1.

The edge 8*b* can thermally deflect in the spaces 66 between the walls 28*a*, 28*b*, and the gaskets 50*a*, 50*b* extends in over the free edges of the walls 28*a*, 28*b* to the VIG unit surface.

It is generally understood that in one or more of the above and/or below mentioned embodiments of the present disclosure, the VIG unit 1 may be arranged so as to slide/move relative to one or more of the above mentioned gaskets 40, 50*a*, 50*b*, relative to the frame profile s 22, 23, 28 and/or relative to the fixation arrangements 6. This may help to allow a VIG unit to thermally deflect in the frame assembly 20 as one of the VIG glass sheets expands or contracts relative to the other glass sheet(s) when the VIG unit is subjected to a temperature difference variation. And this may induce a slight movement of the VIG unit edges in the direction of the VIG unit edges as the temperature difference varies. This may also help to accommodate for CTE (coefficient of thermal expansion) difference due to that the parts of the frame assembly is/are made from materials different from the glass sheets of the VIG unit.

It can be seen form several of the figures such as FIGS. 11e, 12 and 14 described above that the edge 8a of the VIG unit 1 in embodiments of the present disclosure may be kept with a distance between the VIG unit edge 8a and the interconnection member 6c of the fixation arrangement 6 or the wall member 28c of the frame profile 28, 22, thus providing a space 90. Hence, the VIG unit edge 8a may move/slide into or away from this provided space 90 due to differences in CTE between the glass sheets 2a, 2b and the material of the frame profile 22, 28, and/or the material of the fixation arrangement 6. Also, or alternatively, the VIG unit edge 8a may move/slide into or away from this provided space 90 as the temperature difference between the VIG surfaces 4a, 4b varies, hence causing a change in the amount and/or direction of the thermal deflection of the VIG unit 1. The VIG unit may also slide in its longitudinal direction as a consequence of the VIG unit thermal deflection and/or material CTE differences. If the fixation arrangement 6 is a glue or a solder material according to embodiments of the present disclosure, this material may in aspects of the present disclosure be flexible or resilient to at least allow some degree of displacement between VIG unit edge and the frame profile(s) 28, 22, 23.

Figure 16:
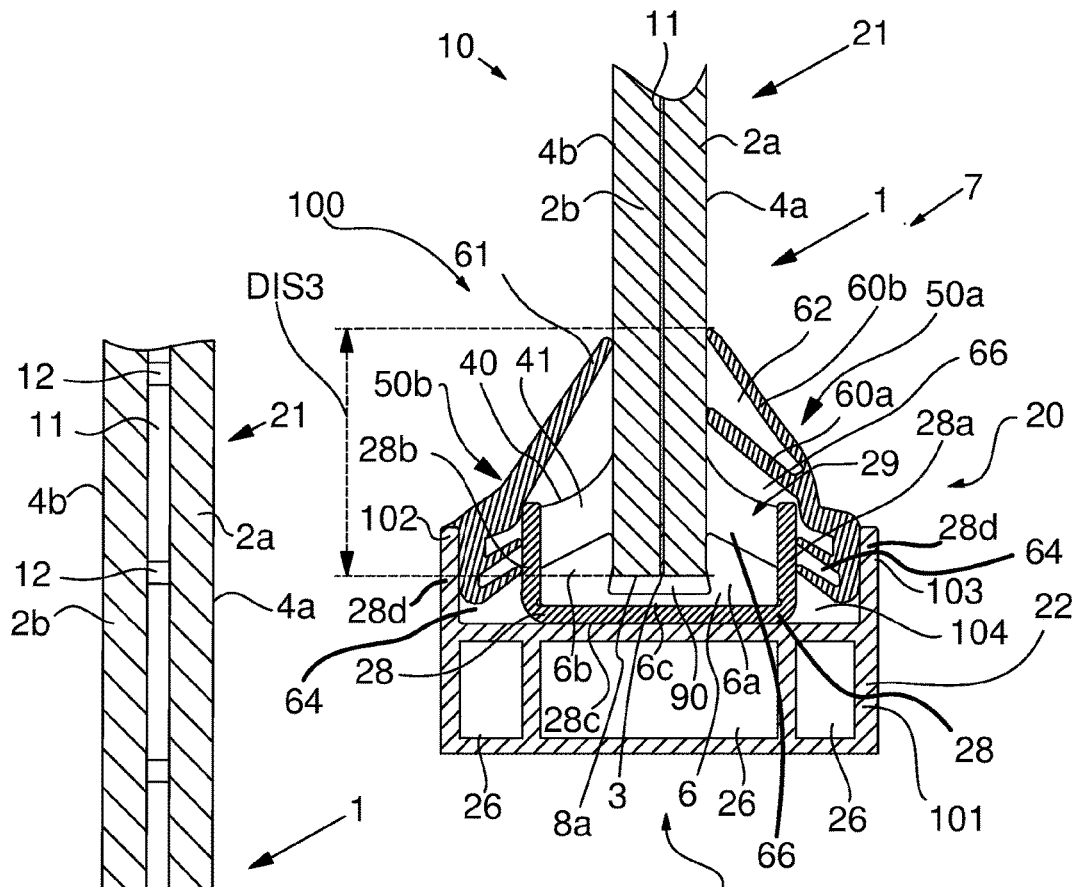

FIG. 16 illustrates schematically a cross sectional view of a retro-fitting solution 100 according to embodiments of the present disclosure for retrofitting a vacuum insulated glass unit 1 to a frame 101 originally designed for insulated glass panes of larger thickness than the vacuum insulated glass unit. The frame 101 may either be a frame provided at a frame part manufacturing site, or may be an existing frame where a gas filled and thicker glass pane is replaced.

Figure 17:
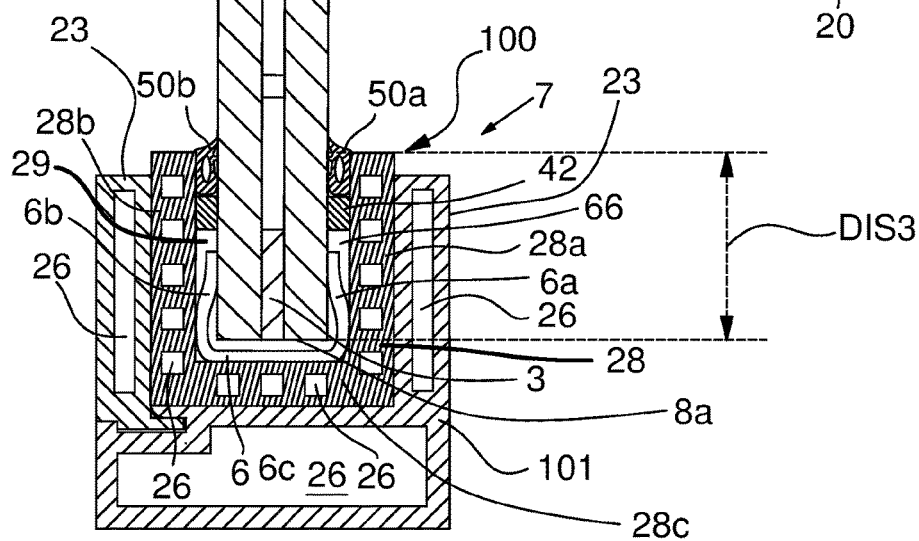

The retro fitting solution 100 comprises resilient, elongated tightening seals or gasket arrangements 40, 50a, 50b, 60a, 60b, 61 as described in relation to one or more of the embodiments described in relation to one or more of the FIGS. 1-15 and/or the figures described after FIG. 16-17.

In the embodiment of FIG. 16, the part 42 of the gasket 40 between the gasket cut-out 41 and frame opening is omitted, but it is understood that in further embodiments of the present disclosure, it may be present.

In the present example of FIG. 16, the gasket parts/lips 60, 61a, 61b are configured to deflect to follow a deflection of the vacuum insulated glass unit edge when it thermally deflect and describes the bending curve as described above, to provide a substantially watertight and/or airtight tightening of a space 66 between the one or more frame profiles 28a, 28b and the outer surfaces 4a, 4b of the vacuum insulated glass unit 1 when installed at the existing frame 101.

The frame 101 comprises a recess 104 provided between two walls 102, 103 of the frame 101. A profile member 28 of the retro-fitting system 100 providing a U-shape is placed in this recess/slit 104 and is fixated to the frame 101 for example by means of mechanical fasteners such as screws, fixation clips, a snap connection or the like, by means of an adhesive or by means of a wedging force (not illustrated in FIG. 16).

The edge of the VIG unit extend into the recess 29 provided by the U-shape of the profile 28 of the retro fitting system, and fixation arrangements 6 as previously described in relation to various embodiments of the present disclosure is placed in the recess 29. The fixation arrangement 6 fixate the vacuum insulated glass unit 2 at a fixation point 7 (discrete to other fixation points distributed along the edges 8a-8d of the vacuum insulated glass unit). The fixation arrangement 6 is attached to the frame profile 28 as e.g. described previously.

Gaskets 50a, 50b are placed between the walls 102, 103 of the existing frame 101 and the elongated profile members 28a, 28b of the profile 28, and comprises resilient lips 60a, 60b, 61 extending to the VIG unit surfaces 4a, 4b. The lip 61 may be configured to provide a water tightening so as to reduce or prevent e.g. rain water from entering the mentioned recesses 28 in the profile 28 attached to the existing frame 101. The lips 60a, 60b may help to provide an air tightening.

As illustrated, the further gasket 40 as previously explained may be placed between the profile members 28a, 28b to e.g. help to provide a thermal insulation, a reduced thermal deflection of the VIG unit edge and/or to provide a further water tightening.

In FIG. 16, the profile walls 102, 103 of the frame 101 are an integrated part of a frame profile but one or more of the walls 102, 103 may also be separate members.

As can be seen, the profile 28 provides three parallel recesses in the existing frame 101 after it has been installed, i.e. the recesses 64 between the wall 102, 103 of the exiting frame and the walls 28a, 28b of the profile 28, and the recess 29 provided between the walls 28a-28b. These recesses extend in the longitudinal direction of the profiles 28, 101, and thus also in the longitudinal direction of the VIG 1 edge. The recesses 64 are in the present example used for attachment of gasket arrangements 50a, 50b, but one or both of the recesses 64 may alternatively in further aspects of the present disclosure also be used for attachment of a glazing profile 23, e.g. to provide a glazing profile solution as disclosed in one or more of FIGS. 7a-9 at one or both sides of the VIG unit.

FIG. 17 illustrates schematically a cross sectional view of a retro-fitting solution 100 according to further embodiments of the present disclosure, for retrofitting a vacuum insulated glass unit 1 to a frame 101 which may originally be designed for insulated glass panes of larger thickness than the vacuum insulated glass unit. The frame 101 may e.g. either be a frame provided at a frame part manufacturing site, or may be an existing frame where the gas filled and thicker glass pane is replaced.

Also in this embodiment, a U-shape in a profile 28 is provided. This profile 28 may as illustrated in one or more embodiments comprise one or more insulating cavities 26, embedded in one or more of the profile 28 walls 28a, 28b, 28c. These 26 may e.g. have been provided during moulding, pultrusion or extrusion of the profile 28, and may comprise insulating material e.g. previously explained or be kept empty.

However, in other embodiments, one, more or all of these walls 28a-28c may also be substantially massive. In one or more alternative embodiments, the profile 28 may comprise recesses/slits in the outer surfaces facing the parts 22, 23 of the frame 101, so as to provide insulating cavities between the walls 23 and 28b and/or between 28a and 23 when the profile 28 is placed in the frame.

It is generally to be understood that the insulating properties provided by the retro fitting system at the side of the VIG unit to face the exterior of the building in embodiments of the present disclosure may be configured to be lower than at that side to face the interior of the building.

The frame 101 is of the type comprising a releasable elongated glazing member profile 23 that is configured to connect to the elongated base member 22.

The glazing member 23 may thus be removed and the retro fitting system 100 is placed. The original glazing member 23 may in embodiments of the present disclosure be either attached to the base member 22 again, it may be discarded, or it may be replaced with another glazing member that is configured to increase or decrease the width of the recess 104 provided between the glazing member 23 and base member 22 walls forming the recess 104, dependent on the size or constitution of the retro fitting system such as the width of the profile 28.

As can be seen, the retro fitting system may be provided so that the gasket arrangements 50a, 50b facing the frame opening and/or the fixation arrangements 6 is/are already installed in the retro fitting system 100 so as to be directly installed at the existing frame. Accordingly, the recess 29 in the profile 28 comprises the fixation arrangements at the points 7, and the seal 40 is placed in the recess 29. Additionally, the gaskets 50a, 50b are placed to provide air and/or water tightening.

As illustrated in FIGS. 16 and 17, the retro fitting system/kit may be configured to provide that the distance DIS3 the frame extend in over/overlap the VIG unit glass sheet surface(s) with a predefined amount, see e.g. more about this in relation to the description of FIG. 7a. The Overlap D1 may e.g. be at least 20 mm such as 25 mm or more, such as between 20 mm and 50 mm measured from the edge 8a and to the free edge/surface of the frame facing the frame opening.

Figure 18A:
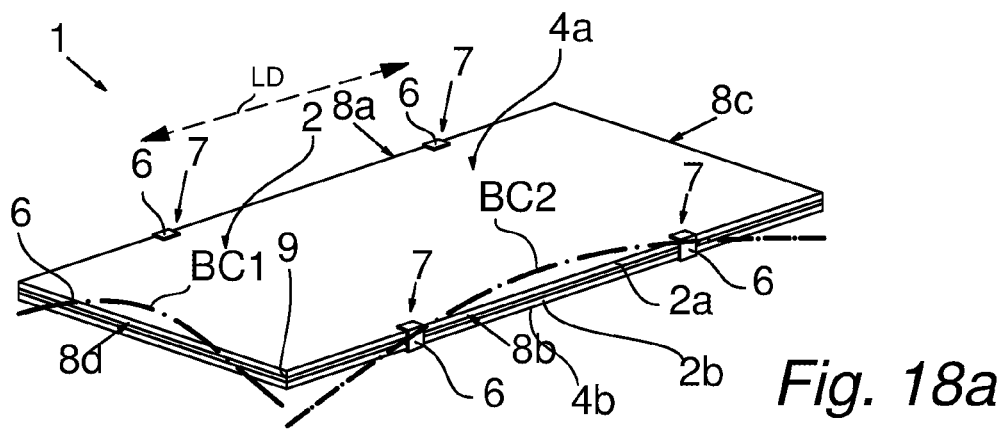
Figure 18B:
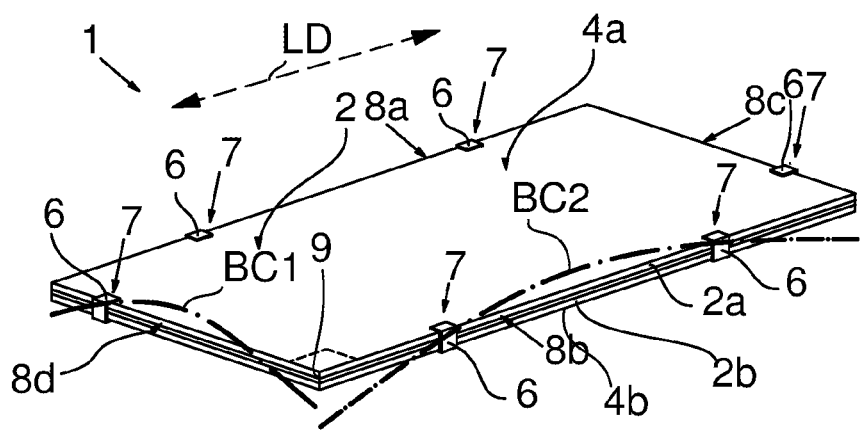

FIGS. 18a-18b illustrates in perspective and schematically various embodiments of the present disclosure, relating to the number of fixation points 7 used.

In FIG. 18a, with a rectangular VIG, the longer, parallel edges 8a, 8b of the VIG unit 1 are selected to comprise two fixation points 7 each, for a fixation arrangement 6, whereas the shorter edges 8c, 8d are not fixed at discrete fixation points, as the longer edges may be experiencing the largest edge bending curves due to thermal deflection. Hence, four fixation arrangements 6 as previously described in relation to various embodiments of the present disclosure, and not more, are used for the VIG unit 1.

In FIG. 18b, two further fixation points 7 are selected, one at each shorter edge 8c, 8d. These further fixation points 7 may be arranged in a diagonal configuration to be closer to each their long edge 8a, 8b than to the other long edge as illustrated, or may alternatively be substantially opposite and closer to the same long edge 8a, 8b than the other long edge. Hence, six fixation arrangements 6 as previously described in relation to various embodiments of the present disclosure, and not more, are used for the VIG unit 1.

As illustrated in other embodiments of the present disclosure, see e.g. FIGS. 1, 6 and 7, two fixation points, and not more, may be selected for each edge 8a-8d of the VIG unit 1.

FIGS. 19 and 20 illustrates a laminated VIG unit arranged in a frame assembly according to various embodiments of the present disclosure, but where the VIG unit is laminated.

The frame solution 20 in FIG. 19 substantially corresponds to the frame solution according to FIGS. 11, 12 and/or 15, however where the VIG unit 1 is laminated with a lamination glass sheet 14, such as an annealed glass sheet or a tempered glass sheet. This is laminated to an outer major surface 4a of the VIG glass sheet 2a providing a major surface between which the support structures 12 extend in the gap 11. The lamination glass sheet 14 is laminated to the VIG glass sheet 2a by means of a lamination layer 16 such as a polyvinyl butyral (PVB) or ethylene-vinyl acetate (EVA) layer. The lamination glass sheet 14 thus provides the outer major surface 15 of the glass sheet.

The fixation arrangement 6, gasket 40 and further possible gasket arrangements 50a, 60a, 60b, may thus be arranged to abut the outer surface of the laminated glass sheet.

The fixation arrangements 6, in the present case clamps 6, and the profile 28 is thus adjusted to the increased VIG unit 1 thickness provided by the lamination glass sheet 14 and the lamination layer 16.

The lamination glass sheet 14 may in embodiments of the present disclosure, as illustrated, be configured to face the interior of the building. However, in other embodiments, it may be arranged in the frame to face the exterior of the building.

The frame solution 20 in FIG. 20 substantially corresponds to the frame solution according to e.g. FIG. 7a, 8 or 9, where a glazing member 23 and a base member 22 of one or more of the frame profile arrangements 20a-20d are connected by connection 25 and/or by means of screws, nails or the like. These 22, 23 form a recess 24 24 for receiving the edge of the VIG unit 1. Again, the VIG unit in FIG. 20 is laminated by a lamination glass sheet 14 as e.g. explained above.

The fixation arrangement 6 in this embodiment support the VIG unit 1 at an outer surface 4b of a VIG glass sheet 2b such as a tempered glass sheet, e.g. a thermally tempered glass sheet. The support structures 12 in the gap 11 support at the major surface of this glass sheet 2b facing the gap 11 to maintain the gap 11 between the glass sheet 2b and a further (e.g. also tempered) glass sheet 2a between which the gap 11 is provided. Also, the fixation arrangement 6 support the VIG unit 1 at the oppositely directed outer surface 15 of the laminated glass sheet, so that the VIG unit edge 8b extend into the recess 6e provided by the fixation arrangement.

The size of the lamination glass sheet 14, i.e. the width and/or height may be substantially equal to the size of the glass sheet 4a of the VIG unit to which it is attached by the lamination layer 16.

Though, in further embodiments of the present disclosure, the size (width and/or height) of the lamination glass sheet 14 may be reduced compared to the width and/or size of the VIG unit glass sheet to which it is attached. This is illustrated in a cross sectional, schematic view in FIG. 21.

Here, the fixation arrangement 6 is configured to hold the VIG unit 1 at the VIG unit glass sheet 2a, 2b outwardly facing major surfaces 4a, 4b of the glass sheets 2a, 2b providing the major surfaces 4c, 4d facing the gap 11. The lamination glass sheet's 14 edge 17 between the major surfaces of the lamination glass sheet, and faces the frame 20 surface 23a, in the present embodiment it faces the glazing member 23. The edge 17 thus is arranged opposite to the edge/surface 23a of the frame facing the frame opening 21.

In the present example, the surface of the frame 18 facing in the same direction as the lamination glass sheet surface 15 is substantially flush with the surface 15, but in other embodiments, this may not be the case, and the lamination glass sheet surface 15 may either extend beyond the frame surface 18 facing away from the frame opening plane, or the surface 15 may not extend all the way to the level of surface 18. The part of the frame at the side of the lamination glass sheet 15 may thus be considered counter sunk compared to the outer surface 15 of the lamination glass sheet 14, with a depth corresponding to the lamination glass sheet thickness and possibly also the lamination layer thickness (as illustrated in the present embodiment). The lamination glass sheet 14 of reduced size may help to reduce the thickness of the frame compared to if the fixation arrangement should extend over the entire thickness of all glass sheets 2a, 2b, 15 and the gap 11 and lamination layer 16.

As can be seen, a gasket such as a rubber gasket, a silicone sealing or the like 19 may be placed between the lamination glass sheet and the frame, in the present example the glazing member 23. The gasket 50a may thus either be maintained to improve water and/or air tightness, or be omitted if the gasket 19 is considered sufficient.

FIG. 22, illustrates schematically a cross sectional view of the frame assembly 10 according to embodiments of the present disclosure. The fixation arrangement 6 holds the VIG unit at one glass sheet 2a of the VIG unit, e.g. by a clamping force F1 as illustrated, substantially in the same way as disclosure in relation to various embodiments disclosed above.

However, the glass sheet 4a is larger than the glass sheet 4b, hence providing an exposed major surface 4d of the glass sheet 2a which also faces the evacuated gap 11 at the other side of the sealing 3. Accordingly, the fixation arrangement 6 is connected to the VIG unit 1 at the opposite surfaces 4a, 4d, but still so that the VIG unit edge 8a can deflect thermally as disclosed previously. Even though gasket arrangements 40, 50a, 50b, 61, 60a, 60b are not disclosed in FIG. 22, these may naturally also be provided as e.g. previously disclosed in relation to various embodiments of the present disclosure.

It is naturally to be understood that an embodiment as disclosed in FIG. 21 may also be used for an un-laminated VIG unit as disclosed in FIG. 22, in further embodiments of the present disclosure, so that the frame surface 23a facing the frame opening 21 extends to face the end edge of the VIG unit 1 glass sheet 2b which is not held by the fixation arrangement. The VIG glass sheet 2b of reduced size may thus help to reduce the thickness of the frame compared to if the fixation arrangement should extend over the entire thickness of all glass sheets 2a, 2b and the gap 11.

Figure 23:
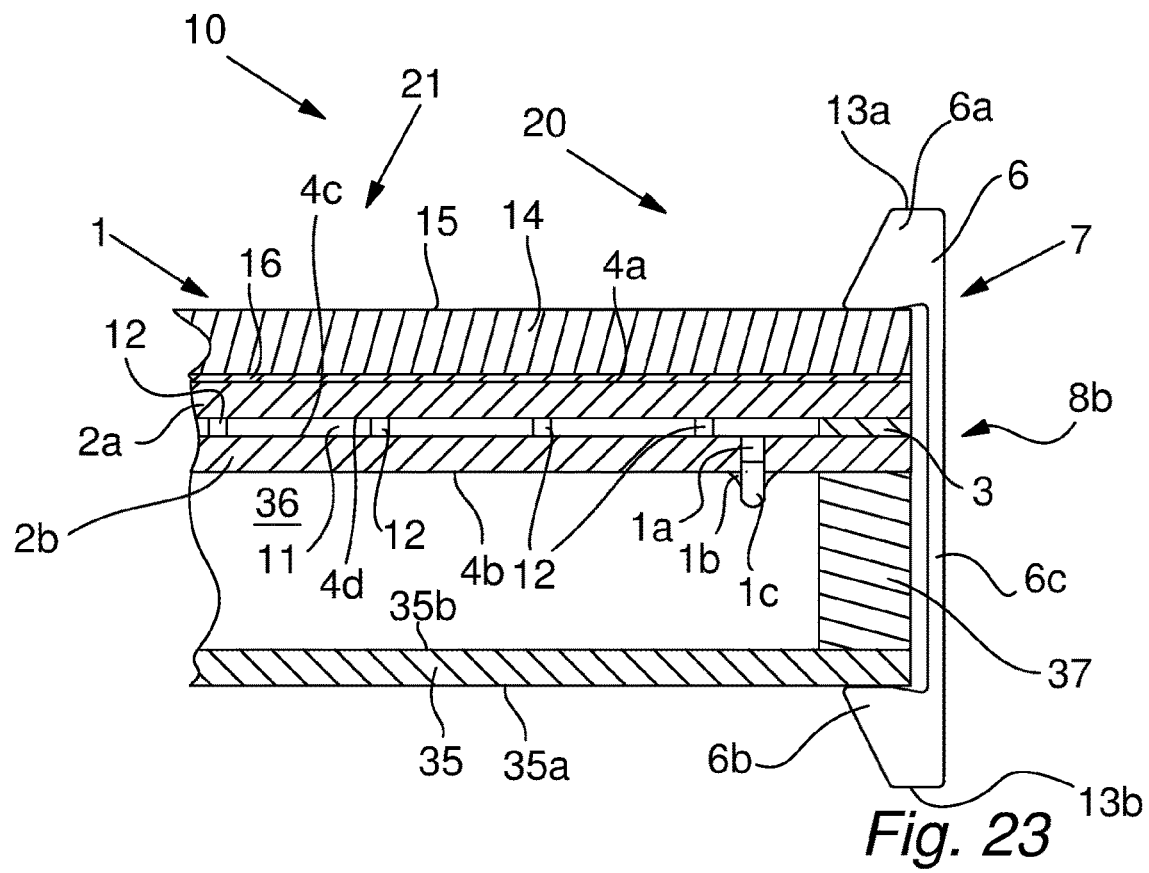

FIG. 23 illustrates an embodiment of the present disclosure where the VIG unit 1 is a so to say Hybrid VIG unit comprising three glass sheets 2a, 2b, 35. This VIG unit comprises glass sheets 2a, 2b paired to provide an evacuated gap 11 comprising distributed support structures between these glass sheets 2a, 2b as explained above in relation to e.g. FIG. 7a. The hybrid VIG unit 1 moreover comprises a further glass sheet 35 providing a further gap 36 between the major surface 4b of the glass sheet 2b facing away from the evacuated gap 11, and this gap 36 is sealed by means of a gas-space edge seal 37. The VIG glass sheets 35, and 2b respectively thus forms an IG (Insulated glass) unit where a gas such as Argon or any other suitable gas may be provide in the space 36 for insulating properties to slow the transfer of heat through the VIG unit.

As can be seen, an evacuation hole 1a in glass sheet 2b comprises a sealing system 1b, 1c in the form of a sealed evacuation port such as a tube 1c, and a sealing material 1b such as solder glass or metal solder for sealing the connection between tube 1c and glass sheet 2b. The tube 1c has been used to evacuate the gap 11. This system 1b, 1c may in embodiments of the present disclosure extend into the space 36, and is hence protected.

As can be seen from FIG. 23, a lamination glass sheet 15 may be laminated 16 to the glass sheet 2a of the VIG unit in embodiments of the present disclosure, see e.g. description of FIGS. 19, 20 and/or 21.

The fixation arrangement 6 holds the VIG unit 1 at the outer surface 15 of the lamination glass sheet 14 and the outer surface 35a of the glass sheet providing an inner major surface 35b to the gas-filled space 36. In the disclosure of FIG. 23, the fixation arrangement 6 is a clamp arranged at the fixation point 7, but it may be any other suitable fixation arrangement as e.g. previously described. In further embodiments of the present disclosure, a solution where e.g. the glass sheet 36 or lamination glass sheet 14 is smaller in width and/or height than the VIG unit glass sheets 2a, 2b may be utilized, e.g. as illustrated in FIG. 21 or 22. Hence, the frame may extend into the space provided due to this reduced size.

A coating, for example low-e coating (not illustrated), may in embodiments of the present disclosure be placed at one or more of surfaces 4c, 4d, 4b and/or 36b.

It is noted that even though parts of the frame 20 assembly have been omitted from FIG. 21 for simplicity, a frame solution as described in relation to any of the previous figures may be used in one or more aspects of the present disclosure.

Figure 24:
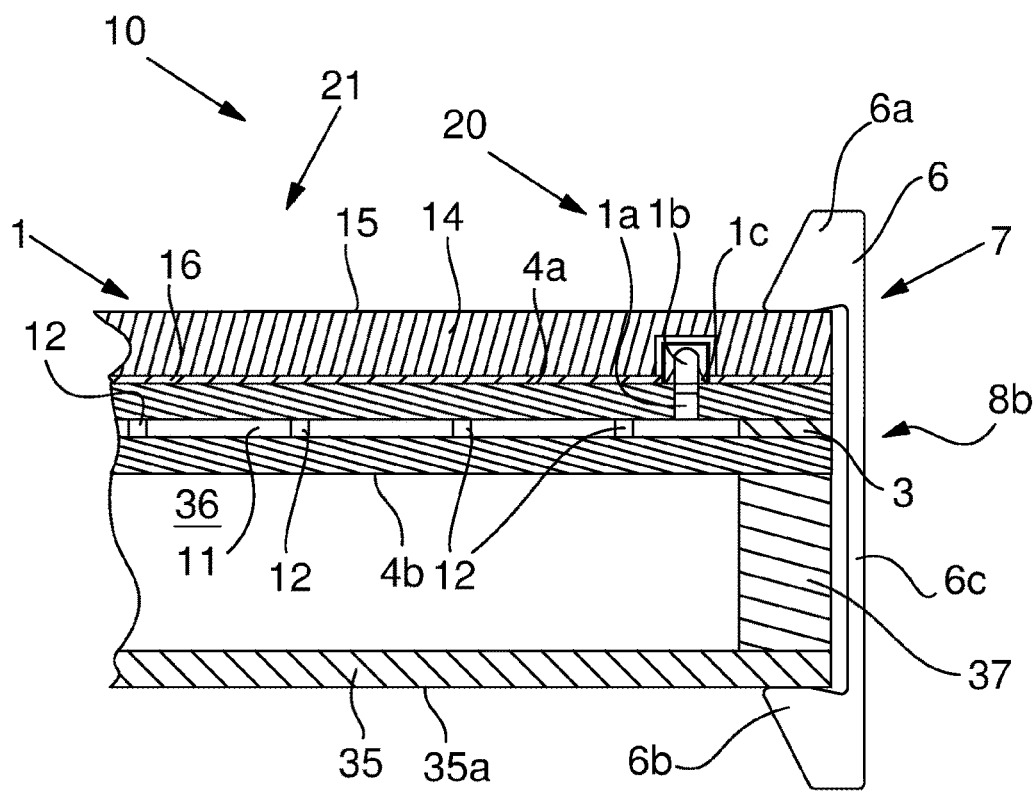

FIG. 24 illustrates an embodiment of the present disclosure where the sealing system 1b, 1c extend into a hole/recess in the lamination glass sheet, and is hence protected by the lamination glass sheet. This hole in the lamination glass sheet may be a through hole or a blind hole as illustrated. This may be provided in a Hybrid VIG solution as described above, or a laminated VIG solution such as described in relation to FIGS. 19, 20 and/or 21.

Figure 25:
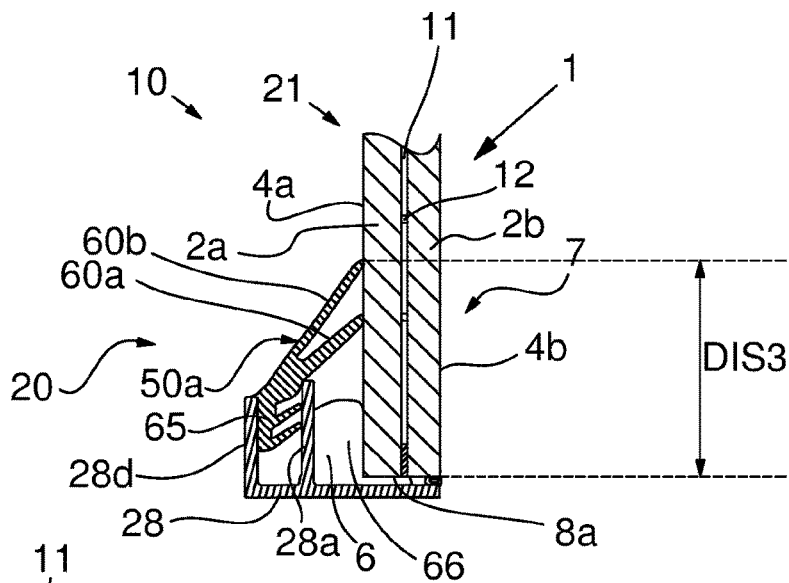

FIG. 25 illustrates an embodiment of the present disclosure, where the frame arrangement only extend in over one of the VIG unit glass sheet major surface(s) with a distance DIS3 as preciously explained. The fixation arrangement 6 here is a glue or an adhesive tape solution that adhere to the VIG unit surface 4a at the fixation point. The outer surface 4b of the other VIG glass sheet opposite to and facing away from the frame is exposed and no base member, glazing member or profile extend in over the surface 4b. Thus fixation arrangement 6 may be provided at one or more of the frame profile arrangements 20a-20d (see e.g. FIG. 4 or 7).

Figure 26:
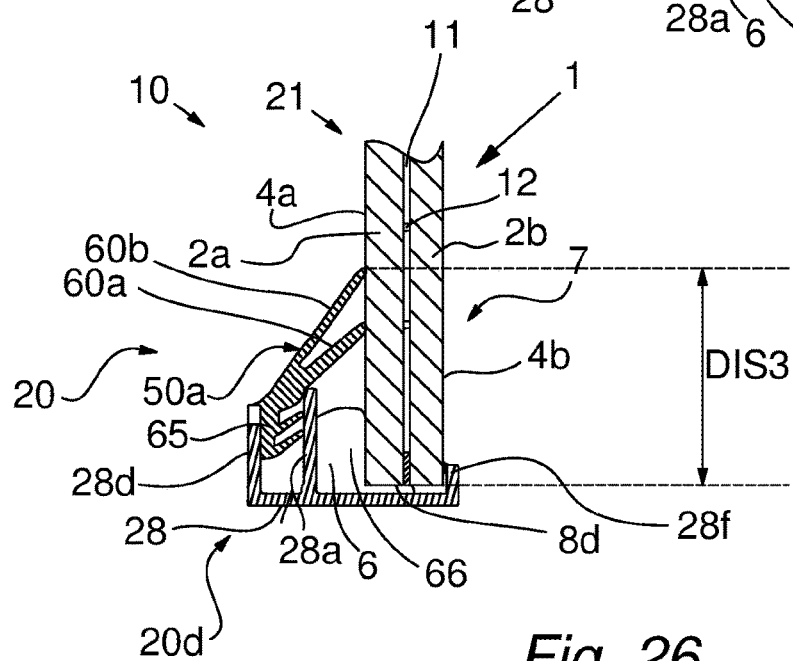

FIG. 26 illustrates an embodiment of the present disclosure substantially corresponding to FIG. 25. However, the frame profile 28 here comprises a small bend profile 28f extending in over the outer VIG surface 4b. It may e.g. extend between 2 mm and 20 mm, such as between 4 mm and 10 mm in over the surface 4b from the edge 8d. This may e.g. be relevant as a safety precaution for at the bottom frame profile arrangement 20d as a further precaution beyond e.g. fixation arrangement 6, and/or at one or more of the other frame profile arrangements of the frame 20. In one example the small bend profile 28f may be provided at or by the fixation arrangement(s) 6 only.

Figure 27:
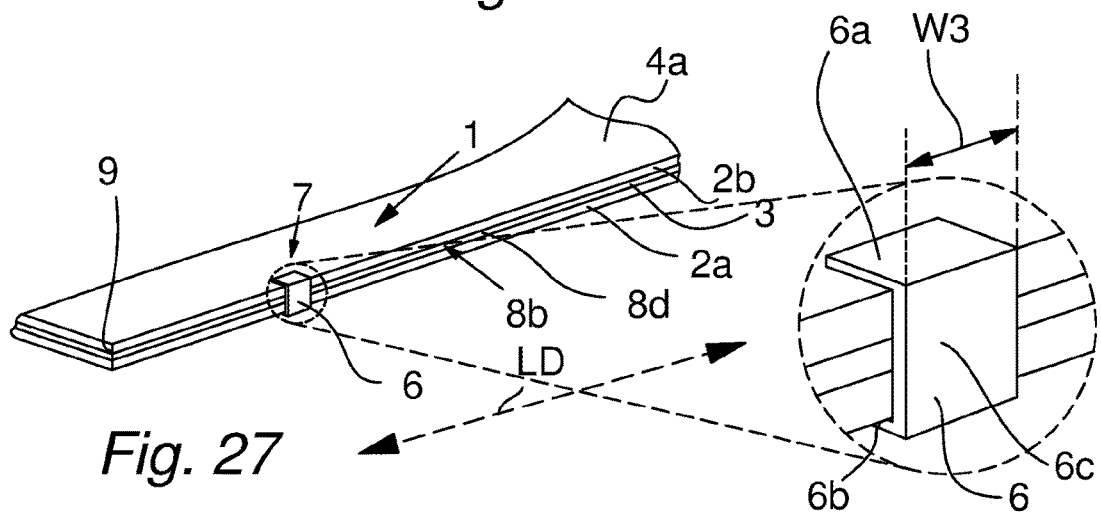

As can be seen in FIGS. 26 and 27, the glue/adhesive may also extend in between the frame profile and the edge 8a, 8d, but in other embodiments, it may be kept at the surface 4a alone. A space such as the previously explained space 90 may be provided between the VIG edge and the profile wall placed opposite to the VIG edge 8a, 8d, so as to allow the VIG unit to move/slide into this space during thermal deflection of the VIG unit.

FIG. 27 illustrates schematically and in perspective the width W3 of a fixation arrangement 6 according to embodiments of the present disclosure. The fixation arrangement 6 for fixating the VIG edge 8a in the fixation point 7 may have a width between 4 mm and 70 mm, such as between 6 mm and 30 mm, such as between 10 mm and 40 mmmm in embodiments of the present disclosure. The width W3 is measured in the longitudinal direction LD of the edge of the VIG unit.

It is generally to be understood that in further embodiments of the present disclosure, a gasket 50a or 50b to be deflected as e.g. illustrated in one or more of FIG. 14, 15, 16, 19, 25 or 26 may be replaced by a suitable glazing member/profile 23 as described in relation to various further embodiments of the present disclosure. The glazing member 23 may thus be fixed to the frame in the recess 64, and a gasket to be compressed may in further embodiments of the present disclosure be placed between the glazing member 23 and the VIG unit surface, see e.g. one or more of FIGS. 7a-9, 16 and/or 17.

It is generally to be understood that in various embodiments of the present disclosure, the VIG unit's outer major surfaces 4a, 4b, 4c, 4d, 15 and/or 35a, 35b may be provided by one or more further layers or coatings providing advantages/features improving or providing optical properties (such as tinted/tinting effects, frosting effects, colouring effects and/or the like), mechanical protection advantages and/or advantages with regard to improving (lowering) the $U_g$-value of the VIG unit (e.g. by means of one or more low-e coatings).

FIG. 28 illustrates a visualized computer simulation of a "free" thermal deflection of a VIG unit 1 used for a frame as disclosed according to embodiments of the present disclosure, which has been provided by one of the present inventors. The VIG unit 1 simulated was based on a VIG unit model defined to have the following characteristics:

The VIG unit is laminated and hence comprises a lamination glass and a lamination interlayer
Length L1 of shorter edges 8d, 8c: 114 cm
Length of the longer edges: 8a, 8b: 140 cm
Glass sheets 2a, 2b type: Thermally tempered glass sheets each having a thickness of 4 mm.
Lamination glass: annealed float glass of a thickness of 4 mm
Edge seal material: solder glass edge seal material
The VIG is arranged with the surfaces S1, S2 horizontally and is thus simulated so that gravity acts on the VIG unit.
Temperature difference between T1 and T2: about 60° C.
The hotter side (S2) was set to be the lamination glass side and hence the lamination glass sheet provides the outer major surface S2 in FIG. 28.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 8b would be 7.82 mm from the plane P1 (DIS4).

Moreover, under these conditions, the simulation results defined that the distance DIS4 from the centre part 52 of the shorter edge 8d would be 5.15 mm from the plane P1.

FIGS. 29 and 30 are images of a test of a thermal deflection of a laminated VIG unit 1 having substantially the parameters as defined above with regard to FIG. 28. The VIG unit 1 was placed horizontally to support on support surfaces 300a of a plurality of support rods 300 of a support frame 301. The VIG unit 1 supported initially, when the temperature difference ΔT=T1− T2 was substantially 0° C., on substantially all support surfaces of the frame 301 on which the VIG unit was arranged.

An infrared heat radiation arrangement 302 was arranged above the upper glass sheet, i.e. the lamination glass sheet, and covered the upper glass sheet to a bit beyond the side edge surfaces of the VIG unit 1. Then the heating arrangement 302 started to heat the upper glass sheet 14 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference ΔT=T1− T2, when compared to the temperature difference ΔT=T1− T2 of substantially 0° C. The distance DIS4 was determined by a first reference point defined by a support surface 300a (that was used as a reference for the plane P1), and the lower surface of the VIG unit 1, in a direction substantially perpendicular to the plane P1.

The maximum edge deflection DIS4 of the long edge 8b (FIG. 29) was measured to be approximately 7.4 mm, or more precisely 7.43 mm at the forced temperature difference, when compared to the temperature difference ΔT=T1− T2 of substantially 0° C.

FIG. 30 illustrates the edge deflection of the shorter edge 8d of the same VIG unit as tested in FIG. 29. Here, in a similar way, the shorter edge 8d described an edge deflection curve DC due to the forced heating and the temperature difference between T1 and T2. Additionally, the maximum edge deflection DIS4 of the shorter edge 8d was measured to be approximately 5.3 mm, or more precisely 5.33 mm, at the forced temperature difference, when compared to the temperature difference ΔT=T1− T2 of substantially 0° C.

Accordingly the maximum tested edge deflection DIS4 vs the simulated edge deflection resulted in the values of table 1 below.

TABLE 1

|  | Simulated edge deflection DIS4 | Edge deflection test (FIGS. 29-30) DIS4 |
| --- | --- | --- |
| Longer edge 8b | 7.82 mm | 7.43 mm |
| Shorter edge 8d | 5.15 mm | 5.33 mm |

The inventors concluded that the test illustrated in FIGS. 29-30 validated the computer simulations, and thus confirmed that the VIG unit computer simulations was sufficiently precise and reliable.

Additionally, the test approved that the edges of larger size laminated VIG units having rigid edge seals such as provided by fused edge seal material such as solder glass or a metal solder, when subjected to a larger temperature difference, will tend to provide/describe an edge deflection curve DC (see e.g. FIG. 3) that causes a substantial edge deflection DIS4 in an un-constricted situation where no "outer" mechanical forces constrains the edge deflection. This applies both in laminated VIG units and, according to simulations, VIG units which are not laminated.

It is understood that the vacuum insulated glass unit frame assembly disclosed above in relation to various embodiments of the present disclosure may be used for glazing. For example a building aperture cover such as a window, e.g. a vertical window, a horizontal window or a roof window arranged at an angle between 5° and 85°, or a door. In further embodiments of the present disclosure, the vacuum insulated glass unit frame assembly may be used in or as curtain walls, gates/doors or walls of heating arrangements such as heating ovens such as house hold ovens, and/or it may be used in or as walls or gate/doors cooling appliances such as freezers or refrigerators, such as refrigerators for storing food for human consumption at a temperature below 7° C. such as below 5° C., e.g. below 0° C. such as around or below −18° C.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

FIGURE REFERENCES

1: Vacuum insulated glass unit
1a: Evacuation opening in glass sheet for evacuating gap in VIG
1b: Tube such as glass tube arranged in or at evacuation opening for sealing after the evacuation
1c: Sealing system for sealing between tube and glass sheet
2a, 2b: VIG glass sheets
3: Edge seal
4a, 4b: Major, outer surfaces of VIG unit glass sheets enclosing VIG gap.
4c, 4d: Major surfaces of VIG glass sheets facing the evacuated gap
5: Centre portion of VIG edge
6: Fixation arrangement
6a, 6b: Holding parts of fixation arrangement
6c: Interconnection member of fixation device
6d: VIG unit connection surface of fixation arrangement
6e: Recess between holding parts
7: Discrete fixation points/areas
8a-8d: Edge of VIG unit
9, 51: VIG corner
10: VIG unit frame assembly such as a window sash.
11: Evacuated gap in VIG unit defined between major surfaces of VIG glass sheets facing the evacuated gap
12: Support structure in VIG unit gap
13a, 13b: Outer surfaces of the fixation device 6
14: VIG unit lamination glass sheet
15: Outer surface of VIG unit lamination glass sheet
16: Lamination layer.
17: Narrow Edge/surface of lamination glass sheet facing frame
18: Surface of frame
20: Frame arrangement enclosing and holding a VIG unit
20a-20d: Frame profile arrangements.
21: frame opening enclosed by frame profiles.
22: Base member
23: Glazing member
23a: frame surface facing the frame opening
24: Recess in frame into which VIG edge extends
25: Connection between glazing member and base member
26: insulating cavity in frame profile
27: strengthening/reinforcing members in frame profile
28: Frame profile member
28a, 28b: Support members for supporting fixation arrangement in space between the members
28c: Wall part connecting support legs/walls
28d: Gasket support member
28e: Sash connection part
28f: Bend extending over outer surface
29: Space between support legs
30: Fixed building aperture cover frame
35: Glass sheet oh enclosing gas filled cavity between this glass sheet and the evacuated gap in VIG unit
35a: Outwardly facing surface of glass sheet enclosing gas filled space of hybrid VIG unit
36: Gas-filled space of Hybrid VIG unit
27: Edge seal enclosing gas filled cavity
40: Gasket between frame and VIG unit surface
40a-40d: Elongated gasket strips
41: Cut-out or spaces in Gasket member 40
42: Part of gasket 40 between gasket cut-out and frame opening
43: Recess in C-profile gasket member 40
44: End wall member of gasket 40
45a, 45b: Gasket side walls
50a, 50b: Resilient sealing or gasket for providing a water tight seal
60a, 60b, 61: Gasket flap/lip
63, 65: connection part of elongated gasket arrangement
64, 71: Gasket receiving recess or groove
66: Space between frame profile member and VIG unit glass sheet surface
70: inner sash profile
80: Protective cover
81: Outer surface of protective cover
82: Channel provided by gasket arrangement for leading water away.
90: Space at VIG edge into which the VIG edge may slide during thermal bending.
100: Retro-fitting system
101: Existing frame
102, 103: Wall of existing frame
104: recess in existing frame
DC, DC1, DC2: deflection curve
L1: Common line extending through pane fixation points at a VIG edge
T1, T2: Temperature at outer major surface of VIG unit.
F1: Clamping force
W1: Edge seal width
W2: Width of recess into which the VIG unit extends.
W3: fixation arrangement width
D1, D2: VIG Edge deflection direction
DIS1, DIS2: Deflection distance/length
DIS3: Distance the frame extend in over the VIG unit glass sheet surface(s)

LD: Longitudinal direction LD of VIG unit edge
P2: Frame opening plane
P1: Holding plane defined by fixation arrangements at different VIG two or more different VIG unit edges.

The invention claimed is:

1. A vacuum insulated glass unit frame assembly, wherein said vacuum insulated glass unit frame assembly comprises:
    a rectangular vacuum insulated glass unit comprising two glass sheets separated by a gap between said glass sheets, wherein a plurality of support structures are distributed in said gap and wherein said gap is sealed, and
    a frame arrangement comprising elongated frame profile arrangements which frames said vacuum insulated glass unit in a frame opening extending in a frame opening plane defined between the elongated frame profile arrangements, and wherein said frame arrangement comprises a fixation system fixating the vacuum insulated glass unit at the frame arrangement,
    wherein said fixation system is arranged so as to allow edges of said vacuum insulated glass unit to thermally deflect in a deflection direction perpendicular to said frame opening plane due to a temperature difference between the two glass sheets,
    wherein said fixation system is configured so as to allow the magnitude of said thermal deflection is configured to vary along the edge between the corners where the respective edge terminates;
    wherein said fixation system comprises a plurality of fixation arrangements, wherein said plurality of fixation arrangements fixates said vacuum insulated glass unit at discrete fixation points distributed along the edges of the vacuum insulated glass unit, and wherein said plurality of fixation arrangements are attached to or between one or more frame members of said frame assembly, whereby the thermal deflection of the edges is substantially at its minimum at the discreet fixation points; and
    wherein said fixation points are placed so that the corners of the vacuum insulated glass unit, where the respective edge terminates, are configured to deflect in a first direction relative to a straight, common line extending through two of said discrete fixation points of the respective edge, and so that a centre portion of the same edge is configured to deflect in an opposite direction than said first direction, relative to the straight, common line, when the vacuum insulated glass unit thermally deflects.

2. The vacuum insulated glass unit frame assembly according to claim 1, wherein the largest total edge deflection in said deflection direction of any of the edges of the vacuum insulated glass unit at a temperature difference between the two glass sheets of 65° C. as compared to the vacuum insulated glass unit at a temperature difference of 0° C. is in the range of 2 to 40 mm.

3. The vacuum insulated glass unit frame assembly according to claim 1, wherein the largest total edge deflection in said deflection direction of any of the edges of the vacuum insulated glass unit at a temperature difference between the two glass sheets of 40° C. as compared to the vacuum insulated glass unit at a temperature difference of 0° C. is in the range of 1 to 25 mm.

4. The vacuum insulated glass unit frame assembly according to claim 1, wherein the largest total edge deflection in said deflection direction of any of the edges of the vacuum insulated glass unit at a to a temperature difference between the two glass sheets of 40° C. as compared to the vacuum insulated glass unit at a temperature difference of 0° C. is in the range of 0.15% to 3% of the length of the deflecting edge.

5. The vacuum insulated glass unit frame assembly according to claim 1, wherein all four edges of said vacuum insulated glass unit are allowed to thermally deflect in a deflection direction perpendicular to said frame opening plane due to a temperature difference between the two glass sheets.

6. The vacuum insulated glass unit frame assembly according to claim 1, wherein each of at least two parallel edges of the vacuum insulated glass unit are attached to said frame assembly by two, and no more, of said discreet fixation arrangements distributed in the longitudinal direction of each of said edges.

7. The vacuum insulated glass unit frame assembly according to claim 6, wherein each of said two discreet fixation arrangements of an edge is placed between 8% and 25% of the length of the respective edge from the respective corner of the vacuum insulated glass unit where the edge terminates.

8. The vacuum insulated glass unit frame assembly according to claim 1, wherein at least four of said discrete fixation points define a common holding plane extending in or parallel to said frame opening plane.

9. The vacuum insulated glass unit frame assembly according to claim 1, wherein one or more of said fixation arrangements are clamping devices configured so as to provide a clamping force onto oppositely directed, outer major surfaces of said vacuum insulated glass unit, and wherein the clamping force provided by said clamping devices is provided by an inherent resiliency of the clamping device, and/or is transferred from a part of the frame arrangement, through the clamping device and to the vacuum insulated glass unit.

10. The vacuum insulated glass unit frame assembly according to claim 1, wherein one or more of said edges of the vacuum insulated glass unit extends into a recess provided by support members, and wherein said fixation system is placed in said recess.

11. The vacuum insulated glass unit frame assembly according to claim 10, wherein the vacuum insulated glass unit edges are allowed to thermally deflect relatively to said recess.

12. The vacuum insulated glass unit frame assembly according to claim 10, wherein said frame profile members comprise:
    elongated walls integrated in and part of a frame profile connecting said walls by means of a connection wall extending between the walls to provide a U-shape forming said recess, and/or
    a base member and a glazing profile member which is releasably connected to said base member, and wherein said base member and glazing member when connected provide a U-shape forming said recess.

13. The vacuum insulated glass unit frame assembly according to claim 10, wherein the distance between the frame profile members, and thus the width of said recess provided by the frame profile members is substantially fixed during said thermal deflection when the temperature difference is less than 40° C.

14. The vacuum insulated glass unit frame assembly according to claim 10, wherein a first gasket arrangement, is placed in said recess between said frame profile members and the outer surfaces of the vacuum insulated glass unit.

15. The vacuum insulated glass unit frame assembly according to claim 1, wherein said fixation system is arranged so as to allow a shift in the direction of the thermal deflection of the corners and/or centre parts of the edges of the vacuum insulated glass unit in response to a change in the temperature difference between the two glass sheets of the vacuum insulated glass unit.

16. The vacuum insulated glass unit frame assembly according to claim 1, wherein the length of the longer opposing edges is in the range of 500 to 3000 millimetres.

17. The vacuum insulated glass unit frame assembly according to claim 1, wherein each of the two opposing longer edges are attached to said frame assembly by two and no more of said fixation arrangements distributed in the longitudinal direction of said longer edges and none of said fixation arrangements fixates the shorter opposing edges to the frame assembly.

18. The vacuum insulated glass unit frame assembly according to claim 1, wherein a minimum distance in a space between an outer major surface of the vacuum insulated glass unit and walls of said frame is at least 4 mm at a temperature difference between the two glass sheets of the vacuum insulated glass unit of substantially 0° C.

* * * * *